US009225760B2

(12) United States Patent
Ralston et al.

(10) Patent No.: US 9,225,760 B2
(45) Date of Patent: Dec. 29, 2015

(54) SYSTEM, METHOD AND APPARATUS OF VIDEO PROCESSING AND APPLICATIONS

(71) Applicant: Straight Path IP Group, Inc., Glen Allen, VA (US)

(72) Inventors: John D. Ralston, Portola Valley, CA (US); Steven E. Saunders, Cupertino, CA (US)

(73) Assignee: Straight Path IP Group, Inc., Glen Allen, VA (US)

( * ) Notice: Subject to any disclaimer, the term of this patent is extended or adjusted under 35 U.S.C. 154(b) by 0 days.

(21) Appl. No.: 13/652,407

(22) Filed: Oct. 15, 2012

(65) Prior Publication Data
US 2013/0039433 A1 Feb. 14, 2013

Related U.S. Application Data

(63) Continuation of application No. 11/820,478, filed on Jun. 18, 2007, now abandoned.

(51) Int. Cl.
*H04L 29/06* (2006.01)
*G11B 27/034* (2006.01)
*G11B 27/036* (2006.01)

(52) U.S. Cl.
CPC ............ *H04L 65/602* (2013.01); *G11B 27/034* (2013.01); *G11B 27/036* (2013.01)

(58) Field of Classification Search
USPC ....................................... 375/240.26, E07.026
See application file for complete search history.

(56) References Cited

U.S. PATENT DOCUMENTS

| 6,747,707 B2 * | 6/2004 | Saito et al. | 348/722 |
| 8,150,235 B2 * | 4/2012 | Hamilton | 386/278 |
| 8,577,204 B2 * | 11/2013 | Lin et al. | 386/278 |
| 2003/0202119 A1 * | 10/2003 | Masters | 348/441 |
| 2007/0052804 A1 * | 3/2007 | Money et al. | 348/143 |

* cited by examiner

*Primary Examiner* — Beemnet Dada
(74) *Attorney, Agent, or Firm* — Davidson Berquist Jackson & Gowdey, LLP

(57) ABSTRACT

Systems, methods, and apparatuses of providing and processing video data for delivery to mobile devices.

7 Claims, 57 Drawing Sheets

Figure 33a

Video Template List Screen

Script: [Droplet ▼]

User can select the script here.

Add — Click "Add" button and go to the "Add Video" screen to add video(s).

▲ Select a video file and move it up.

▼ Select a video file and move it down.

▶ Select a video file and play, go to the "Play Video" screen.

■ Select a video file and remove it from the list.

Trim — Select a video file and trim, go to the "Video Trim" screen.

Untrim — Remove the trim in the video and the trimmed icon ✗ after the video name.

Trim/Untrim: The rule of this button is that when user selects an untrimmed video, it displays "Trim", and when a trimmed video is selected, it displays "Untrim".

Title: [Name your movie]

User can enter the video here.

Friends.avi ✗

When a file has been trimmed, the trimmed icon will mark behind to show it is a trimmed video.

Upload

Upload the videos in the "Video Clip List" and go to the "Upload" screen. If no video is added, this button will be gray.

Home

Go to the "Title" screen.

Use Case

1. User selects a script. Then the gray text (e.g. Video clip scene 7) in the "Video Clip List" will tell user how many videos can be added in this script.

2. User adds some videos by clicking the "Add" button.

3. User edits the clip list with "Up/Down/Play/Remove" button.

4. User selects a video file, and clicks the "Trim" button to trim it. Or user selects a trimmed video and clicks "Untrim" button to untrim it.

5. User enters the title for the movie.

6. User clicks "Upload" button to upload the movie.

Use Case

1. Video starts playing, the two triggle will move with the indicator. User click [Set Start] to set the start point, the left triggle stops to show the start point while the right one still move with the indicator.

the "Set Start" button changes to "Set Stop".

3. When user clicks "Cancel" button, a warning message will be shown. User can click "Yes" to cancel, "No" to continue.

When user clicks "Cancel" button, a warning message will be shown.
User can click "Yes" to cancel, "No" to continue.

Figure 46

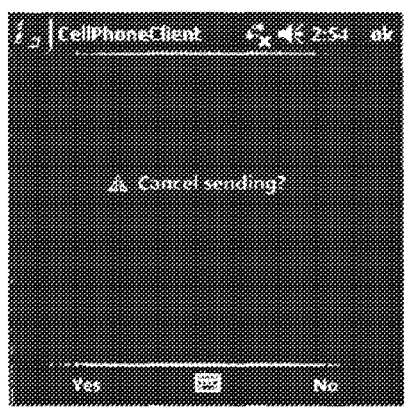

Recipients List Screen

Recipients: David@example.com ▼ [Add]

A combo box will allow user to select a name or enter an email address, then add it to the "Recipients List".

[Remove]

User can select and remove a recipient from the "Recipients List".

[Send]

When uploading completes and user finishes filling the "Recipients List", user can send out the movie.
If the movie is sent successfully, it will go to the "Summary and History" screen.

[Cancel]

This will cancel sending and will popup a warning dialog as below.

When user clicks [Cancel] button, a warning message will be shown.
User can click [Yes] to cancel, [No] to continue.

SYSTEM, METHOD AND APPARATUS OF VIDEO PROCESSING AND APPLICATIONS

CLAIM OF PRIORITY

This application is a continuation of U.S. patent application Ser. No. 11/820,478, entitled "System, Method and Apparatus of Video Processing and Applications" filed, on Jun. 18, 2007, which claims priority to U.S. patent application Ser. No. 60/814,383 entitled "Video Processing and Applications Server", which was filed on Jun. 16, 2006, the contents of which are expressly incorporated by reference herein.

TECHNICAL FIELD

The present disclosure relates generally to a system, apparatus, and method of video processing and applications.

CROSS-REFERENCE TO RELATED PATENT APPLICATION

This application is related to a copending U.S. patent application Ser. No. 11/357,661, entitled "MOBILE IMAGING APPLICATION, DEVICE ARCHITECTURE, SERVICE PLATFORM ARCHITECTURE AND SERVICES", filed 16 Feb. 2006 with the same assignee as the present disclosure. The applicants of that application are also applicants of this application. The disclosure of the above identified copending application is incorporated in its entirety herein by reference.

This application is related to a copending U.S. patent application Ser. No. 11/232,165, entitled "COMPRESSION RATE CONTROL SYSTEM AND METHOD WITH VARIABLE SUBBAND PROCESSING", filed 20 Sep. 2005 with the same assignee as the present disclosure. The applicants of the above applications are also applicants of this application. The disclosure of the above identified copending applications is incorporated in its entirety herein by reference.

This application is further related to a copending U.S. patent application Ser. No. 11/232,726, entitled "MULTIPLE TECHNIQUE ENTROPY CODING SYSTEM AND METHOD", filed 21 Sep. 2005 with the same assignee as the present disclosure. The applicants of the above applications are also applicants of this application. The disclosure of the above identified copending applications is incorporated in is entirety herein by reference.

This application is further related to a copending U.S. patent application Ser. No. 11/232,725 entitled "PERMUTATION PROCRASTINATION", filed 21 Sep. 2005 with the same assignee as the present disclosure. The applicants of the above applications are also applicants of this application. The disclosure of the above identified copending applications is incorporated in its entirety herein by reference.

This application is further related to a copending U.S. patent application Ser. No. 11/249,561 entitled "MOBILE IMAGING APPLICATION, DEVICE ARCHITECTURE, SERVICE PLATFORM ARCHITECTURE", filed 12 Oct. 2005 with the same assignee as the present disclosure. The applicants of the above applications are also applicants of this application. The disclosure of the above identified copending applications is incorporated in its entirety herein by reference.

This application is further related to a copending U.S. patent application Ser. No. 11/250,797 entitled "VIDEO MONITORING APPLICATION, DEVICE ARCHITECTURE, AMD SYSTEM ARCHITECTURE", filed 13 Oct. 2005 with the same assignee as the present disclosure. The applicants of the above applications are also applicants of this application. The disclosure of the above identified copending applications is incorporated in its entirety herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

SUMMARY

Directly digitized images and video are resource intensive; thus, images and video can be compressed for storage, transmission, and other uses. For example, compression can be characterized by a three-stage process: transform, quantize, and entropy-code. Most image and video compressors share this basic architecture, with variations.

The transform stage in a video compressor can be to gather the energy or information of the source picture into as compact a form as possible by taking advantage of local similarities and patterns in the picture or sequence of pictures. Compressors typically compress different inputs with different compression levels. For example, compressors, may be designed to work well on "typical" inputs and ignore their failure to compress "random" or "pathological" inputs. Many image compression and video compression methods, such as MPEG-2 and MPEG-4, use the discrete cosine transform (DCT) as the transform stage.

Quantization may discard information after the transform stage, therefore, in some instances, the reconstructed decompressed image may not be an exact reproduction of the original. Entropy coding is generally a lossless process: this process takes the information remaining after quantization and codes it so that it can be reproduced in the decoder. Thus the design decisions about what information to discard are not affected by the following entropy-coding stage.

DCT-based video compression/decompression (codec) techniques, in some instances, having been developed for, for example, broadcasting and streaming of studio-generated video content, are associated with the encoding of video content in a studio environment, for example, where high-complexity encoders can be run on computer workstations. Such computationally complex encoders enable computationally simple and relatively inexpensive decoders (players) to be installed in consumer playback devices.

However, as depleted in FIG. 1, the asymmetricity in encode/decode technologies may result in difficulties in support of the compression of full television-sized video content using the processor capacity available in mobile multimedia devices, such as camcorder phones, in which video messages are captured and compressed in real time in the mobile device itself, as well as played back. As a result, video in mobile devices may be limited to much smaller sizes and much lower frame rates than in other consumer products, as deleted in FIG. 2.

Video editing with DCT-based techniques and other video processing applications may require full or partial decoding of compressed video input data prior to editing or other processing of the fully or partially decoded video, followed by compression of the edited or otherwise processed video data for output and subsequent distribution. Therefore, the computational complexity of DCT-based video editing and other processing applications may exceed the computational capacity of many standard server computers based on general-purpose personal computer (PC) central processing units (CPUs).

Rather, video editing and other processing applications typically utilize specialized video applications server computers, in which video processing may be carried out using a combination of specialized data processing elements, including, but not restricted to: digital signal processors (DSPs), application specific integrated circuits (ASICs), multimedia processors, and reconfigurable processing devices (RPDs). The number, cost, and power consumption of such specialized video data processing elements lead to much higher cost and power consumption for specialized video servers, in comparison to standard server computers based on general purpose PC CPUs. However, the commercial deployment of emerging mobile video services requires that such video editing and other processing be provided for large numbers of concurrent service subscribers, and that the costs of deploying and maintaining the corresponding video applications servers be as low as possible.

Various embodiments of the present disclosure may include, one or more various, video processing, and other processes, such as, and including one or more of the following:

Compression;
Full or partial decompression;
Editing of fully or partially decompressed video, including, but not limited to, cutting, trimming, inserting transitions, reordering, adjusting exposure, compensating for backlighting, compensating for limited low light sensitivity of the camera imaging element (typically, a CMOS, CCD or similar element), compensating for distortions coming from the camera module's lenses, compensating for camera jitter occurring during video recording, modifying image background, and fixing red-eye;
Transcoding, including conversions between the video format of the present disclosure and other standards-based and/or proprietary video formats;
Transrating, including modification of video compression level, bit rate, frame rate, image size, and compressed format for playback compatibility between different devices and screen sizes;
Tagging and embedding meta data for video search applications;
Digital watermarking for security and rights management;
Video storing (including in a data base), searching, retrieving;
Recognition, measurement, and classification of image and video content, including music beats, video cuts, scene change, point-of-view change, exposure and contrast properties, rate of motion, direction and coherence of motion, lighting (sun vs. fluorescent etc.), faces, red eyes, stock scenes, and watermarks;

In some embodiments of the present disclosure video applications designed to run on video applications servers and support various combinations of the video processing functions listed above may include, but are not limited to, one or more of:

Compression;
Decompression;
Editing, including cutting, trimming, inserting transitions, adjusting exposure, correcting for backlighting, fixing red-eye, synchronizing to beat of soundtrack, inserting stock titles and scenes, applying templates, correcting for camera motion, improving composition;
Transcoding, including conversions between video format of the present disclosure and ether commonly-deployed standards-based and proprietary video formats;
Transrating, including modification of video compression level, bit rate, frame rate, image size, and compressed format for playback compatibility between different devices and screen sizes;
Tagging and embedding meta data for video search indexing, or other editing applications;
Video storing (including in a data base), searching, retrieving;
Digital rights management (DRM);
RSS (Really Simple Syndication) applications to broadcast user created video to other subscribers through a feed, RSS applications may include an aggregator and a feed reader, and may allow user-created video to be viewed on computers and hand-held devices;
Recognition, measurement, and classification of image and video content;

In some embodiments, video services supported by combinations of the video applications listed above running on video applications servers and supporting various combinations of the video processing functions listed above may include, but are not limited to, one or more of the following:

Video messaging, sharing, and blogging: non-real-time, i.e. store and forward, including via RSS feeds;
Video IMS: instant messaging services over IP networks—real time video transmission and streaming;
Video calling: real time over IP, ATM, or circuit-switched networks;
Video mail, analogous to voice mail, i.e. leave a video mail if the party being called does not answer their phone;
Video conferencing, for example peer-to-peer between multiple parties;
Manual or automated editing, on handset or on a network- or web-based server, of video clips capture on handset;
On-line video storage, albums, blogs, etc.;
Sharing of captured/edited/stored video clips and albums;
Managing access, defining who has access and when, discovering who has seen or requested the material;
Tagging; database storage, searching, and retrieving; previewing, downloading (soft copy), ordering hard copy (DVD) of video;
Personal multi-media market place services, including:
  Preview, share, buy, sell "soft" copies (download) or "hard" copies (DVD);
  Media "tagging" for indexing, RSS feeds;
  Interfaces to existing online market places (e.g., E-bay, Google, Yahoo, Microsoft, other portals);
Comparison, contrast, juxtaposition with material purchased, from friends, and from public sources;

In some embodiments, video systems to deploy one or more of the video services identified above supported by combinations of the video applications listed above running on video applications servers and supporting various combinations of the video processing functions described above may include, but are not limited to, one or more of the following:

Circuit-switched mobile cellular network, fixed wireless network, landline telephone network, landline cable network, landline security network, or satellite network;
IP-based mobile cellular network, mobile mesh network, mobile ad-hoc network, fixed wireless network, landline telephone network, landline data network, or satellite network;
Converged fixed/mobile wireless networks;
Other wireless or wireline data networks; ATM, etc.;

Some embodiments of the present disclosure may include, methods, devices, applications, systems, and services for one or more of the following: video image recording, transmitting, storing, editing, processing, transcoding, searching, retrieving, sharing, distributing, and marketing, including mobile devices and video processing/applications servers, corresponding mobile device and video processing/applications server architectures, service platform architectures, and methods and services for transmitting, storing, editing, processing, transcoding, searching, retrieving, sharing, distributing, and marketing still images and video images over wireless and wired networks and systems, and viewing them on display-enabled devices, as well as network and other system services in relation to the foregoing.

Embodiments of the present disclosure further comprise image recording and processing techniques, and corresponding improvements in the architectures of mobile devices, video processing/applications servers, and service platforms. The present disclosure further include end-to-end functionality and performance of mobile video services. These may be enabled by passing information, such as anti-shake camera motion compensation information, captured in the imager module in a mobile device, to one or more of: a subsequent video codec in the handset devices, a video processing applications server in the mobile network, and/or a receiving video playback device.

Such information can then be used to further reduce the computational requirements of the video codec, for example by providing additional motion compensation information that may otherwise be extracted by the video codec from the input video data. Such information can also be used to further compensate for camera motion, which occurs during video capture in the mobile device, during editing and further video processing that is subsequently carried out in a video processing applications server in the mobile network. Such information can also be used to recreate the effects of camera motion, which may have been previously removed via video preprocessing in the camera module in the mobile device, during editing and further video processing that is subsequently carried out in a video processing applications server in the mobile network, and/or in a receiving video playback device.

Aspects of the present disclosure may further comprise, one or more of the following:
1. Software video codecs/camcorder device applications for compressing and/or decompressing video or still images;
2. Software video processing applications for compression, decompression, editing, transcoding, tagging and embedding metadata for search applications, storing, databasing, searching, retrieving, and distributing video;
3. Infrastructure products, methods and processes, including mobile multimedia service (MMS) infrastructure server computers and applications, for deploying video messaging and sharing services in conjunction with software video codec/camcorder applications for mobile handsets as well as software processing applications;
4. Methods, processes and business processes for establishing, enabling, distributing and operating innovative MMS services, including mobile video messaging, sharing, and blogging; video streaming and video calling; and personal media producer services that support creation and marketing of video content created by mobile users on mobile devices;

BRIEF DESCRIPTION OF FIGURES

FIG. 33a depicts an example embodiment of a screenshot.

DETAILED DESCRIPTION

Figure 1:
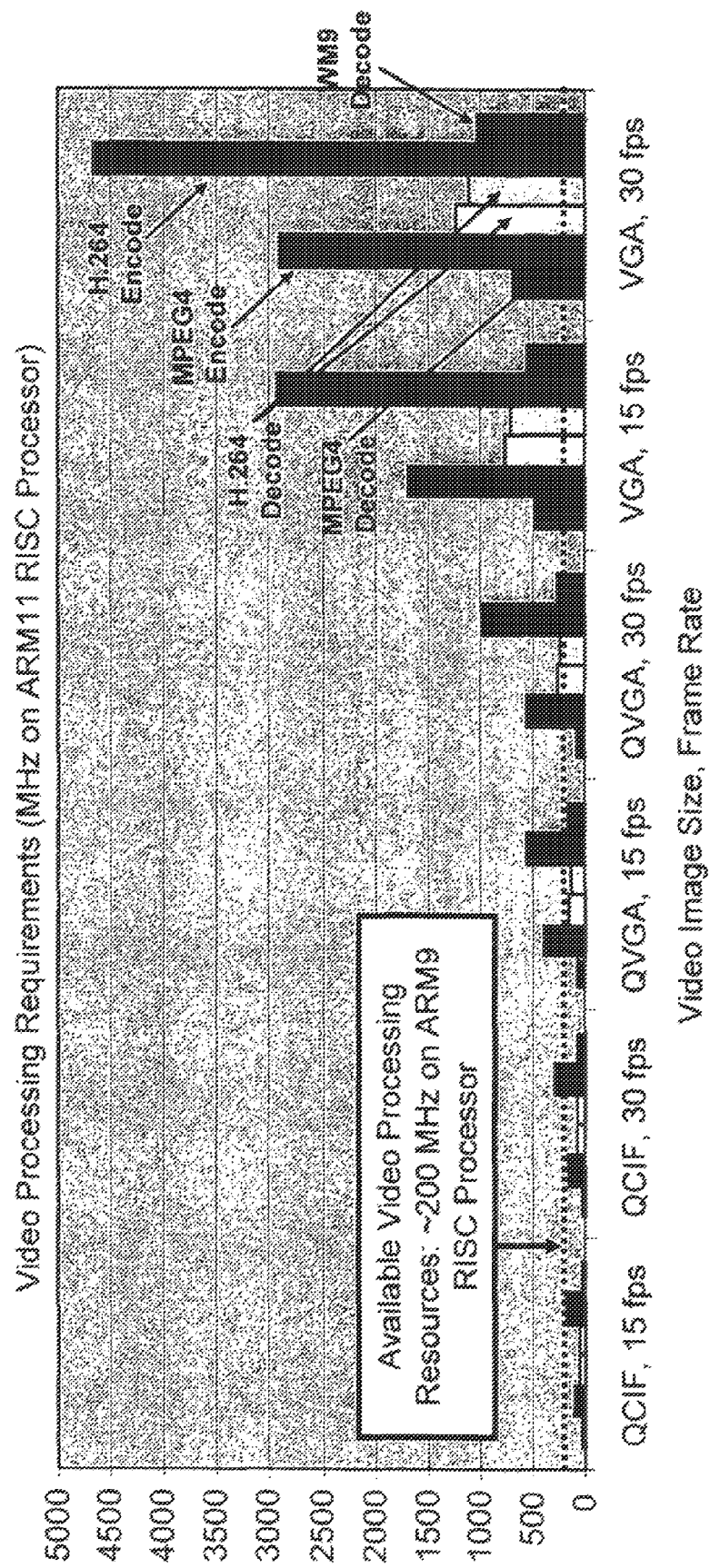
FIG. 1 depicts video codec computational requirements, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Image Processing

A wavelet transform may comprise the repeated application of wavelet filter pairs to a set of data, either in one dimension or in more than one. For still image compression, a 2-D wavelet transform (horizontal and vertical) can be utilized. Video codecs according to the present disclosure may use a 3-D wavelet transform (horizontal, vertical, and temporal). Symmetrical 3-D wavelet-based video compression/decompression (codec) device may be used to reduce the computational complexity and power consumption in mobile devices well below those required for DCT-based codecs, as well as to enable simultaneous support for processing still images and video images in a single codec.

Simultaneous support for still images and video images in a single codec may eliminate or reduce the need for separate MPEG (video) and JPEG (still image) codecs, or greatly enhance compression performance and hence storage efficiency with respect to for example, Motion JPEG codecs. A symmetrical 3-D wavelet-based video processing device is used to reduce the computational complexity and power consumption in, and to increase the number of concurrent mobile subscribers that can be supported by, MMS infrastructure equipment utilized to support automated or manual editing of user-created video, as well as database storage, search, and retrieval of user-created video.

Mobile Imaging Services and Service Platform Architecture

Aspects of one embodiment provide a new generation of innovative MMS video services, including mobile video messaging, sharing, and blogging; video streaming and video calling; and personal "media producer" services that support creation and marketing of video content created by mobile users on mobile devices. Components of a mobile imaging service platform architecture according to aspects of the present disclosure (see FIG. 3) may include, one or more of:
    Mobile Handsets;
    Mobile Base stations (BTS);
    Base station Controller/Radio Network Controller (BSC/RNC); Mobile Switching Center (MSG);
    Gateway Service Node (GSN);
    Mobile Multimedia Service Controller (MMSC);

Typical functions included in the MMSC according to aspects of the present disclosure (see FIG. 3) may include, one or more of:
    Video gateway;
    Telco server;
    MMS applications server;
    Storage server;

The video gateway in an MMSC, according to aspects of the present disclosure, may serve to transcode between the different video formats that are supported by the imaging service platform. Transcoding is also utilized by wireless operators to support different voice codecs used in mobile telephone networks, and the corresponding voice transcoders can be integrated into the RNC.

Figure 3:
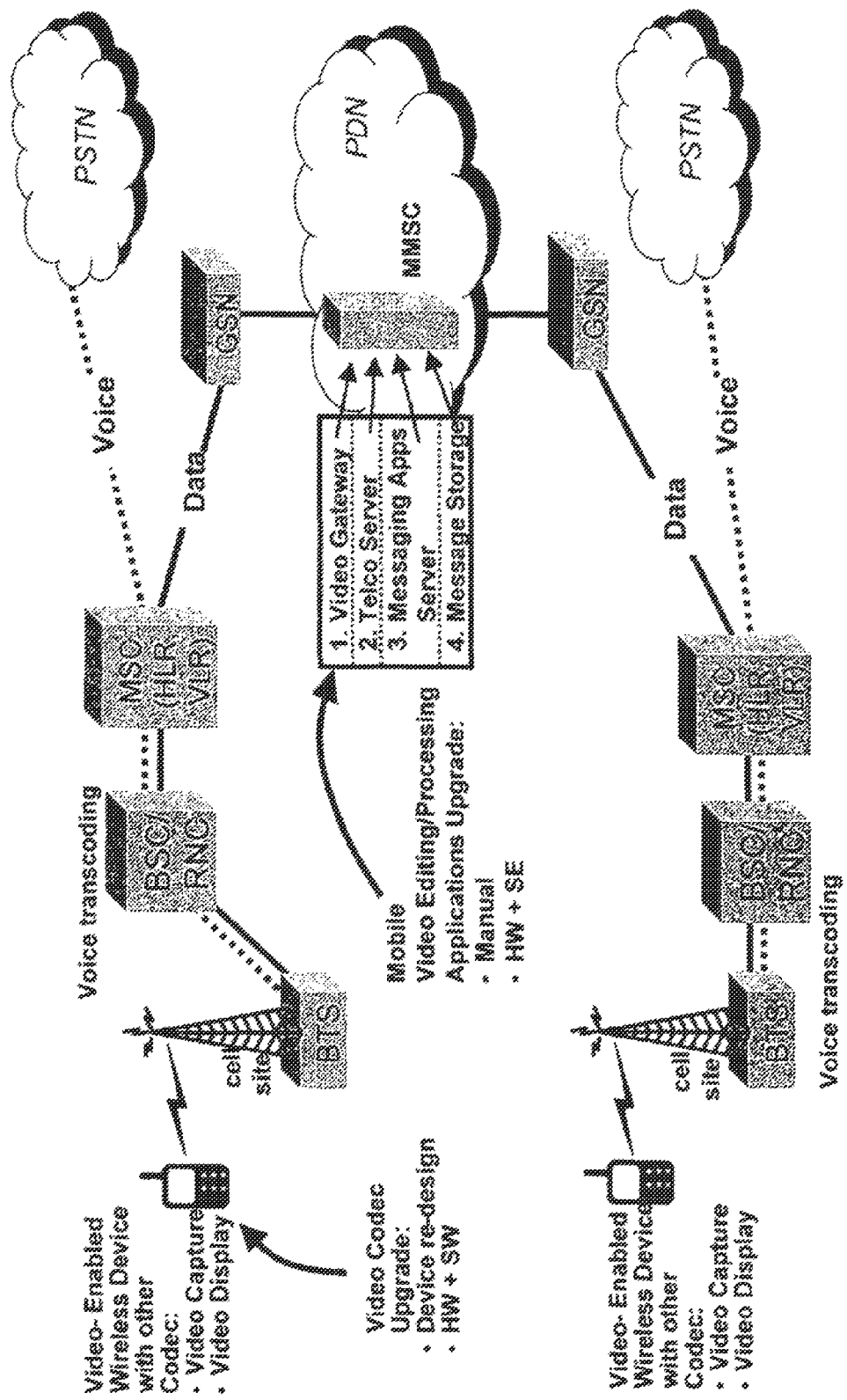
FIG. 3 depicts a mobile imaging service platform architecture, according to one embodiment.

Upgrading such a mobile imaging service platform with the architecture shown in FIG. 3 may include deploying new handsets, and manually adding new hardware to the MMSC video gateway. In some mobile video messaging and sharing applications, cost and complexity associated with transcoding may be eliminated. One aspect of the current disclosure is the ability to embed a software decoder with each transmitted video stream, enabling "self-playing" functionally on common handset and PC video players.

The MMS applications servers in an MMSC may support applications such as automated or manual editing of user-created video, as well as database storage, search, and retrieval of user-created video. The computational complexity associated with implementing such video editing functions and other processing applications with DCT-based video exceeds the computational capacity of many standard server computers based on general-purpose personal computer (PC) central processing units (CPUs).

The commercial deployment of potential new mobile video services may include providing video editing and other processing for large numbers of concurrent service subscribers, and that the costs of deploying and maintaining the corresponding video applications servers be as low as possible, according to aspects of the present disclosure. Upgrading MMSC infrastructure is also costly if new or specialized hardware is required. A SW applications and service platform would be preferable in order to enable automated over-the-air (OTA) software upgrade of handsets, over-the-network (OTN) software upgrade of MMSC video gateways, and support for mobile video applications using standard PCs and servers.

Aspects of the present disclosure comprise new methods, services and systems relating to innovative capture, compression, transmission, editing, storing and sharing video content associated with mobile devices. Aspects of the present disclosure may apply to telecom (both wireless and wireline providers) and Internet, cable and other data and multimedia operators including fixed and mobile wireless service providers. Aspects of the present disclosure may provide for richer content, higher bandwidth usage and higher average revenue per user (ARPU).

Mobile multimedia service (MMS) according to aspects of the present disclosure, include innovative video messaging, sharing, blogging, and personal "media producer" applications that enable a target audience to communicate personal information. Mobile image messaging and sharing may require the addition of digital camera functionality (still images) and/or camcorder functionality (video images) to mobile handsets, so that subscribers can both capture (encode) video messages that they wish to send, and play back (decode) video messages that they receive.

According to aspects of the present disclosure, mobile devices may be enabled to evolve into integrated consumer multimedia entertainment platforms. A substantial investment in industry has been directed toward technologies and platforms that enable re-packaged broadcast television programming (such as news clips, sports highlights, and special "mobisodes" of popular TV programs) and other studio-generated video content (such as film previews and music videos) to be transmitted to and viewed on mobile devices. In this latter case, the mobile subscriber is exploited as a new class of video consumer. However, this latter case utilizes largely video content that has been compressed in large broadcast enterprise servers.

However, according to aspects of the present disclosure, mobile operators worldwide also gain significant new opportunities to support their subscribers as media producers (as enabled by aspects of the present disclosure), rather than just media consumers. As enabled by aspects of the present disclosure, the ability to capture and share photographs and video on mobile devices with the same quality as stand-alone digital cameras and camcorders is a technical cornerstone for such new services, together with the deployment and convergence of higher speed cellular and fixed wireless data networks.

Aspects of the present disclosure further includes enabling significant reductions in the development cost and retail price of both camcorder phones and video messaging/sharing infrastructure equipment, which may be key to large scale commercial adoption of such devices and related mobile multimedia/data services, in both mature and emerging markets.

Figure 2:
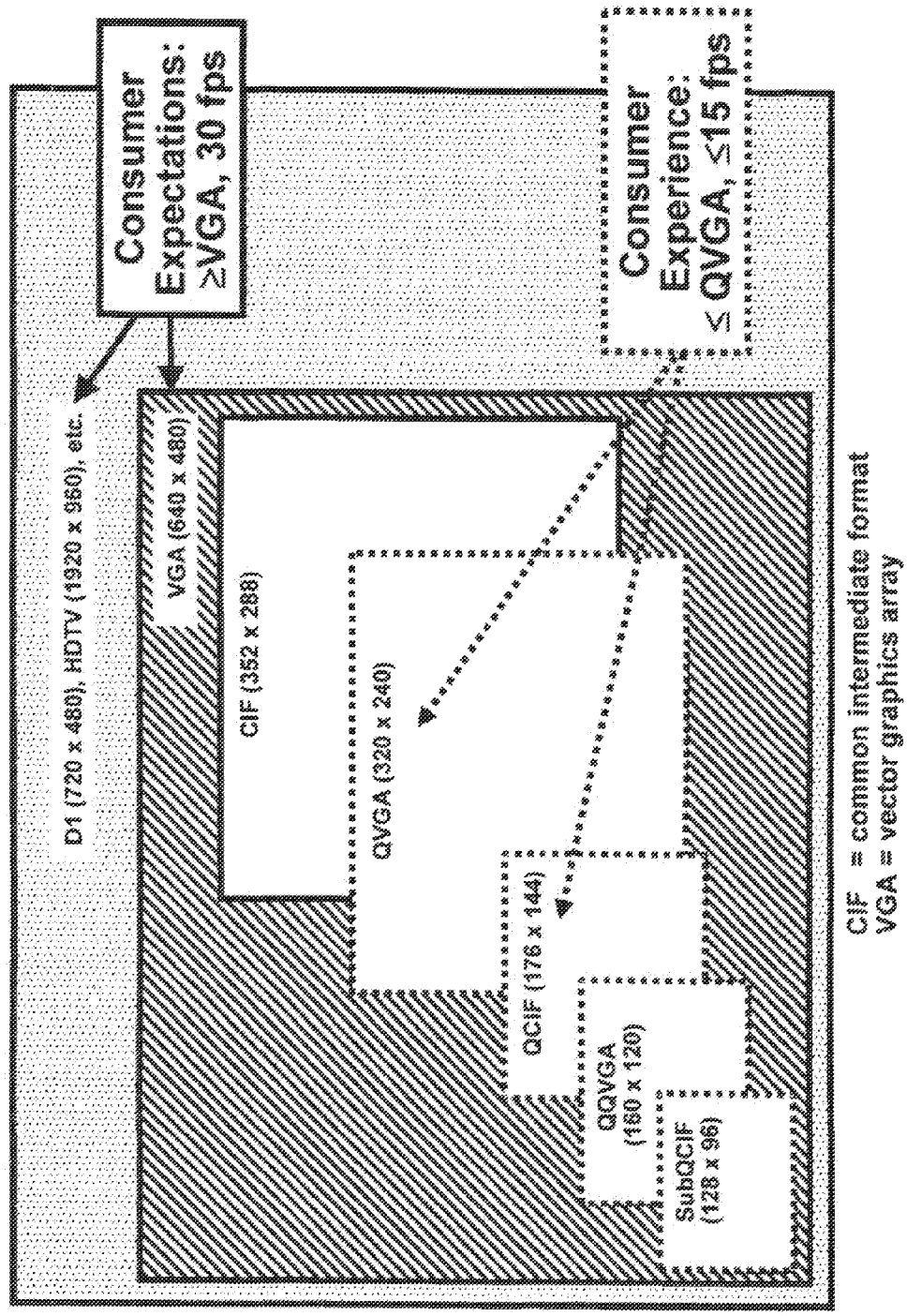
FIG. 2 depicts video image size limitations in mobile devices and services, according to one embodiment.

Mobile image messaging/sharing services and applications may be limited to capturing and transmitting much smaller-size and lower-frame-rate video images than those typically captured and displayed on other multimedia devices (see FIG. 2), such as TVs, personal computers, digital video camcorders, and personal media players. Mobile image messaging services and applications capable of supporting VGA (or larger) video at a frame rate of 30 fps or higher, as provided fey aspects of the present disclosure, would be preferable.

Aspects of the present disclosure, further comprise, a software mobile imaging applications service platform that may include, one or more of:

1. support automated over-the-air (OTA) software upgrade of deployed handsets;
2. support automated over-the-air network (OTN) software upgrade of deployed MMSCs;
3. support the deployment of mobile video applications and services using standard PCs and servers;
4. enable larger numbers of concurrent mobile video service subscribers to be supported by a smaller number of servers;
5. support the deployment of mobile video applications and services without the need for video transcoding in the handset of network;
6. enable mobile video devices, applications, and services that support capturing, and transmitting full-size and full-frame-rate video images similar to those typically captured and displayed on other consumer multimedia devices such as digital camcorders and TVs;

Java implementations of the mobile handset and MMS server applications, according to aspects of the present disclosure, may be used for handset/network robustness against viruses, worms, and other "attacks", allowing mobile network operators to provide the quality and reliability of service required by national regulators, in one embodiment.

Mobile Imaging Handset Architecture

Figure 4:
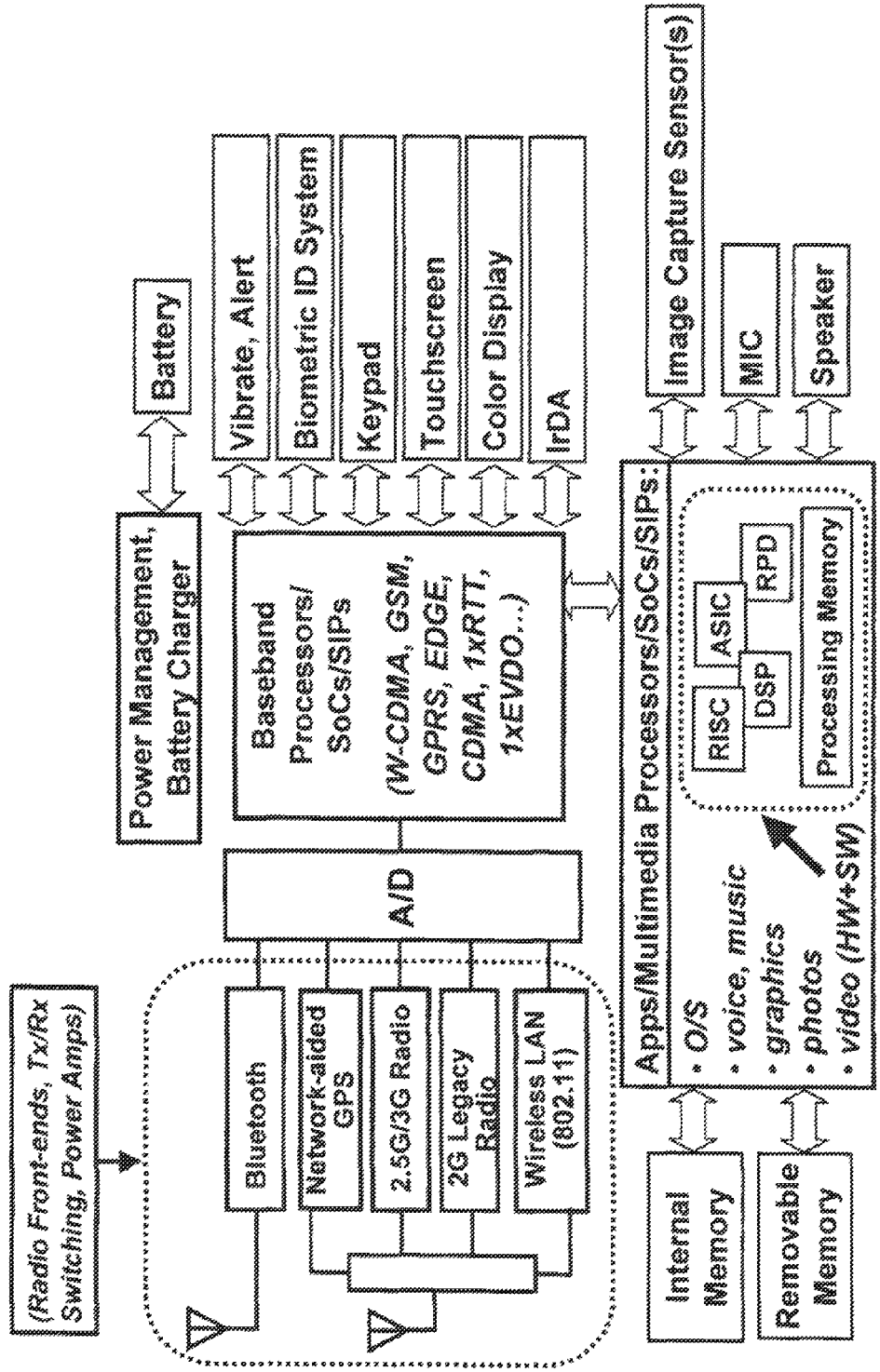
FIG. 4 depicts a mobile imaging handset architecture, according to one embodiment.

In embodiments of the present disclosure, the addition of digital camcorder functionality to mobile handsets is generally associated with adding the following functions, either in hardware, software, or as a combination of hardware and software (see FIG. 4):

imager array (typically array of CMOS or CCD pixels), with corresponding pre-amplifiers and analog-to-digital (A/D) signal conversion circuitry
  image processing functions such as pre-processing, encoding/decoding (codec), post-processing
  buffering of processed images for non-real-time transmission or real-time streaming over wireless or wire line networks
  one or more image display screens
  local image storage on built-in or removable memory.

Using codecs based on DCT transforms, such as MPEG-4, commercially available imaging-enabled mobile handsets are limited to capturing smaller-size and lower-frame-rate video images than those typically captured and displayed on other multimedia devices, such as TVs, personal computers, digital video camcorders, and personal media players. These latter devices typically capture/display video images in VGA format (640×480 pixels) or larger, at a display rate of 30 frames-per-second (fps) or higher, whereas commercially available imaging-enabled mobile handsets may be limited to capturing video images in for example, QVGA format (320×240 pixels), QCIF format (176×144 pixels) or smaller, at a display rate of for example, 15 fps or lower (See, e.g., FIG. 2).

This reduced video capture capability may typically be due to the large computational requirements, processor power consumption, and buffer memory required to complete the number, type, and sequence of computational steps associated with video compression/decompression using DCT transforms.

Using commercially available video codec and microprocessor technologies leads to very complex, power-hungry, and expensive architectures for mobile imaging handsets that target capture of VGA (or larger) video at a frame rate of 30 fps or higher. Such handset architectures utilize codecs having a combination of both software programs and hardware accelerators running on a combination of reduced instructions set (RISC) processors, digital signal processors (DSPs), application-specific integrated circuits (ASICs), and reconfigurable processing devices (RPDs), together with larger buffer memory blocks (typical memory capacity of 1 Mbyte or more).

These codec functions may be implemented using such RISC processors, DSPs, ASICs, multimedia processors, and RPDs as separate integrated circuits (ICs), or may combine one or more of the RISC processors, DSPs, ASICs, multimedia processors, and RPDs integrated together in a system-in-a-package (SIP) or system-on-a-chip (SoC).

Codec functions running on RISC processors or DSPs can be software routines, with the advantage that they can be modified in order to correct programming errors or upgrade functionality. The disadvantage of implementing certain complex, repetitive codec functions as software is that the resulting overall processor resource and power consumption requirements typically exceeds those available in mobile communications devices. Codec functions running on ASICs and multimedia processors are typically fixed hardware implementations of complex, repetitive computational steps, with, typically, the advantage that specially tailored hardware acceleration can substantially reduce the overall power consumption of the codec.

The disadvantages of implementing certain codec functions in fixed hardware include longer and more expensive design cycles, the risk of expensive product recalls in the case where errors are found in the fixed silicon implementation, and the inability to upgrade fixed silicon functions in deployed products in the case where newly developed features are to be added to the imaging application. Codec functions running on RPDs are typically routines that utilize both hardware acceleration and the ability to add or modify functionality in final mobile imaging handset products.

An imaging application that reduces or eliminates complex, repetitive codec functions so as to enable mobile imaging handsets capable of capturing VGA (or larger) video at a frame rate of 30 fps with an all-software architecture would be preferable, in order to simplify the above architecture and enable handset costs compatible with high-volume commercial deployment.

Multimedia handsets are required not only to support picture and video messaging capabilities, but also a variety of additional multimedia capabilities (voice, music, graphics) and a variety of fixed and mobile wireless access modes, including but not limited to 2.5 G and 3 G cellular access, WiBro, HSDPA, WiFi, wireless LAN, and Bluetooth. The complexity and risk involved in developing, deploying, and supporting such products makes over-the-air (OTA) distribution and management of many functions and applications highly beneficial, in order to more efficiently deploy new revenue-generating services and applications, and to avoid costly product recalls.

A SW imaging application would be preferable to enable OTA distribution and management of the imaging application by handset manufacturers, mobile operators, and other MMS service providers. The present disclosure provides these objectives.

Aspects of the present disclosure include, one or more of:
1. Enabling mobile video devices, applications, and services that support capturing and transmitting full-size and full-frame-rate video images similar to typically captured and displayed on other consumer multimedia devices such as digital camcorders and TVs;
2. Supporting automated over-the-air (OTA) software upgrade of deployed handsets;

Java implementations of the mobile handset application, according to aspects of the present disclosure, may be used for handset/network robustness against viruses, worms, and other "attacks", allowing mobile network operators to provide the quality and reliability of service required by national regulators, in one embodiment.

Video Processing and Applications Server Architecture

In one embodiment, MMS video services, include mobile video messaging, sharing, and blogging; video streaming and video calling; and personal "media producer" services that support creation and marketing of video content created by mobile users on mobile devices, automated video editing, video "post-production", and other video processing applications provided on mobile handsets and/or in MMSC application servers. However, the commercial deployment of such capabilities includes providing video editing and other processing for large numbers of concurrent service subscribers, and that the costs of deploying and maintaining the corresponding video applications servers be as low as possible.

Figure 5:
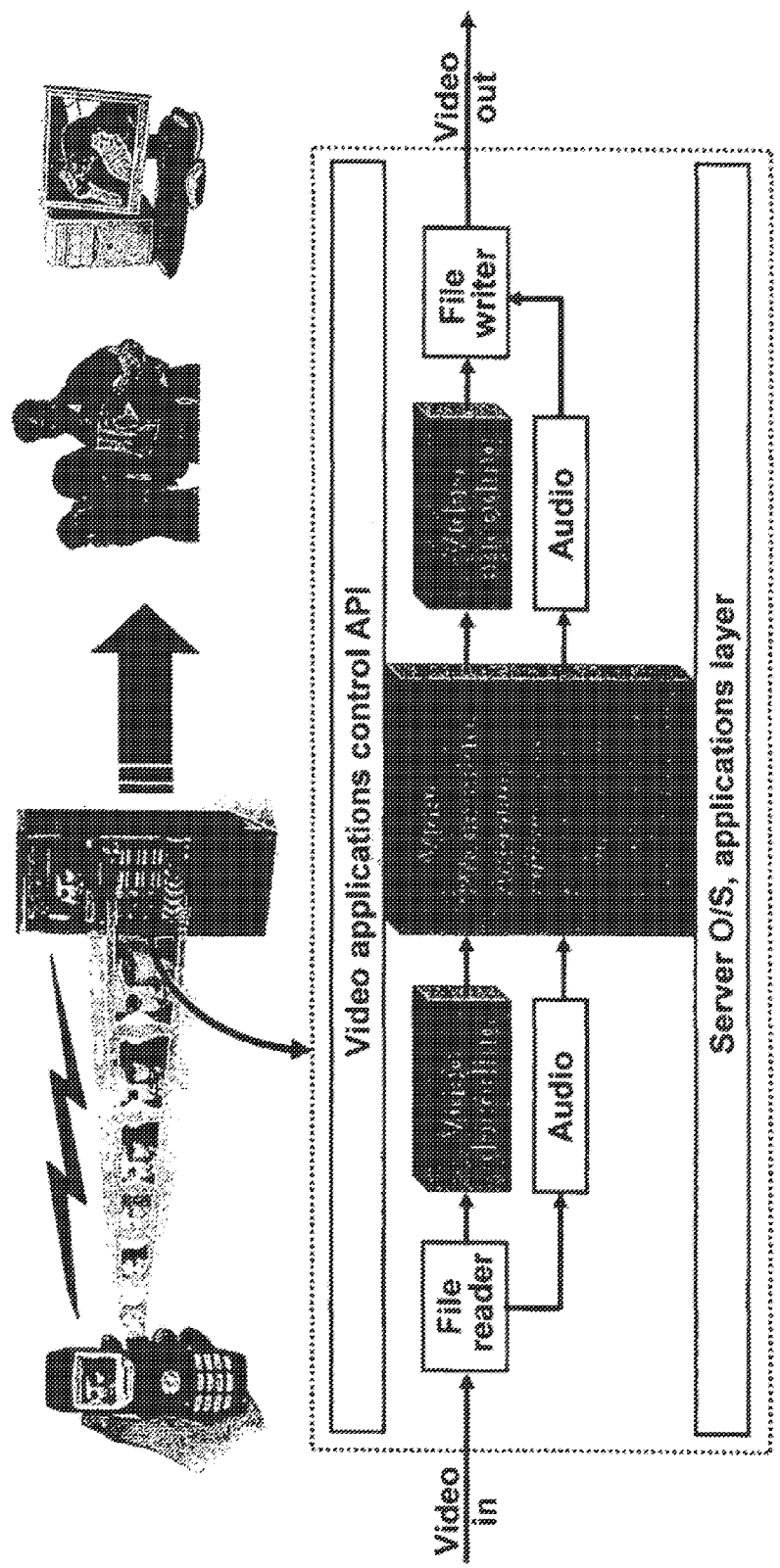
FIG. 5 depicts a video processing and applications server functional block diagram, according to one embodiment.

FIG. 5 depicts a functional block diagram for a video processing and applications server, according to one embodiment. The video input data is typically in a compressed format, and can be fully or partially decoded before implementing video processing algorithms on the video input data. The processed video can be compressed again for output end subsequent transmission and distribution. The video processing functions may include, one or more of:

Compression;
Decompression;
Editing, including sequence edits such as cuts and transitions, and image content edits such as color correction, fades, and jitter removal;
Post-production, such as adding titles or incorporating chosen cuts of the video into a production template;
Transcoding, including conversions between the present wavelet format and other commonly-deployed standards-based and proprietary video formats;
Transrating, including compression level, bit rate, frame rate, image size, and compressed format for playback compatibility between different devices and screen sizes;
Tagging and embedding meta data for search applications;
Storing (including in a data base, searching, retrieving);
Managing the content, including provenance, ownership, and permissions, and auditing compliance with license restrictions;

The computational complexity of DCT-based video editing and other processing applications may exceed the computational capacity of server computers based on general-purpose personal computer (PC) central processing units (CPUs). In some situations, video editing and other processing applications utilize specialized video applications server computers, in which video processing may be carried out using a combination of specialized data processing elements, including, but not restricted to: signal processors (DSPs), application specific integrated circuits (ASICs), multimedia processors, and reconfigurable processing devices (RPDs).

Figure 6:
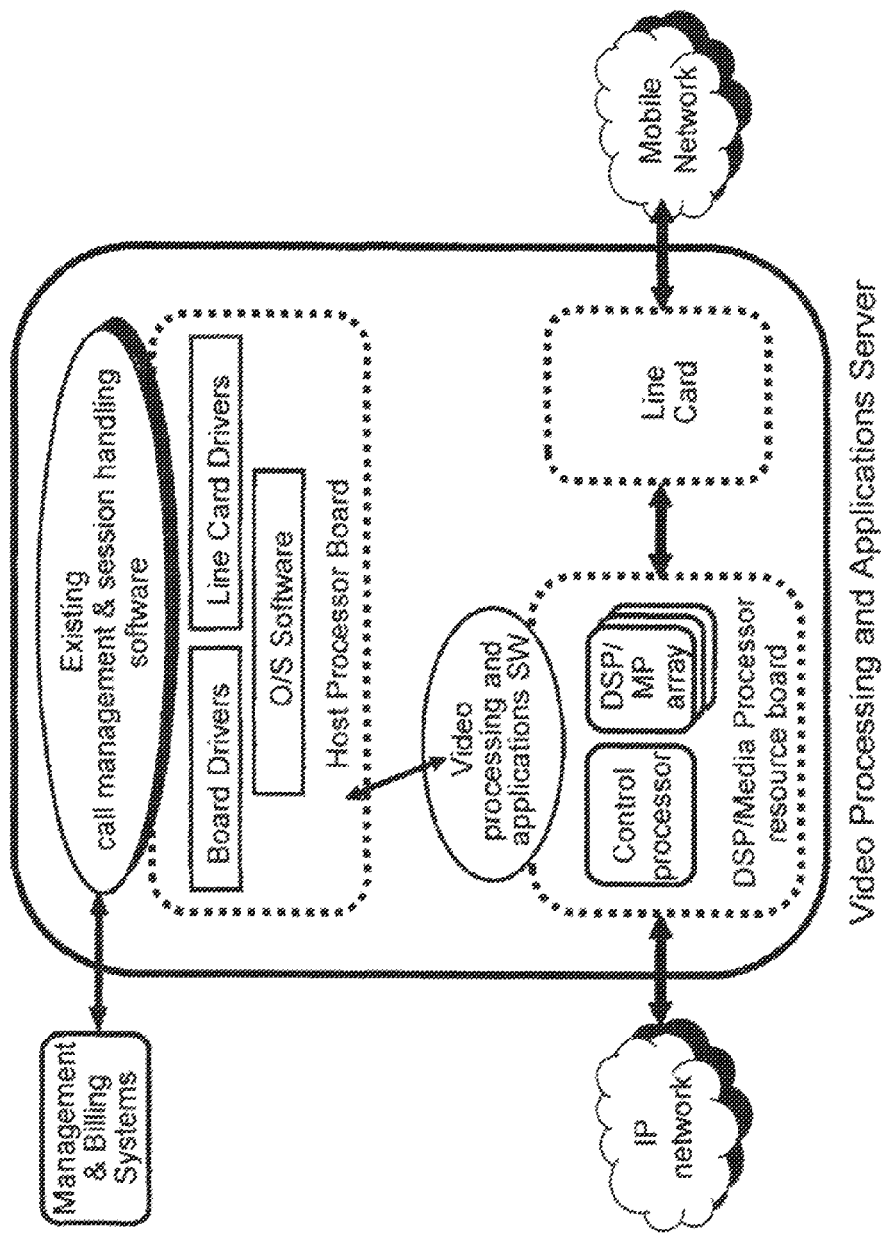
FIG. 6 depicts a video processing and applications server architecture, according to one embodiment.

FIG. 6 depicts a representative video processing and applications server architecture to provide the computational requirements of DCT-based video editing and other processing applications, according to one embodiment. The number, cost, and power consumption of the specialized video data processing elements leads to higher cost and power consumption for specialized video servers, in comparison to standard server computers based on general purpose PC CPUs.

Aspects of the present disclosure may further include, a system having one or more of the following characteristics:
1. Reducing computational complexity for video encode, decode, and editing;

2. Allowing mobile video applications to run on low-cost, low-power, PC CPUs, rather than specialised, expensive, power-hungry DSPs or ASICs;
3. Enabling fewer, less expensive, PC-based servers to replace larger number of specialized video application servers, reducing deployment & operational cost per subscriber;
4. Allowing substantial increase in the number of concurrent mobile subscribers that can be supported by each video application server;
5. Supportings automated over-the network (OTN) software upgrade of deployed MMSCs video application servers;
6. Supports the deployment of mobile video applications and services without the need for video transcoding in the handset or network;

Video Editing, Archiving, and Retrieval Systems

MMS video services such as, mobile video messaging, sharing, and blogging; video streaming and video calling; and personal "media producer" services that support creation and marketing of video content created by mobile users on mobile devices, in one embodiment, provides one or more of, automated video editing, video "post-production", and other video processing applications on mobile handsets and/or in MMSC application servers.

Video production is a distributed process, with resources physically distributed over several sites. For example, in the broadcast industry, broadcasters outsource specific production and post-production phases to specialized studios or upcoming virtual studios. Aspects of the current disclosure further comprise, embodiments to simplify and accelerate the deployment of distributed virtual studio applications for mobile personal "media producer" services.

Figure 7:
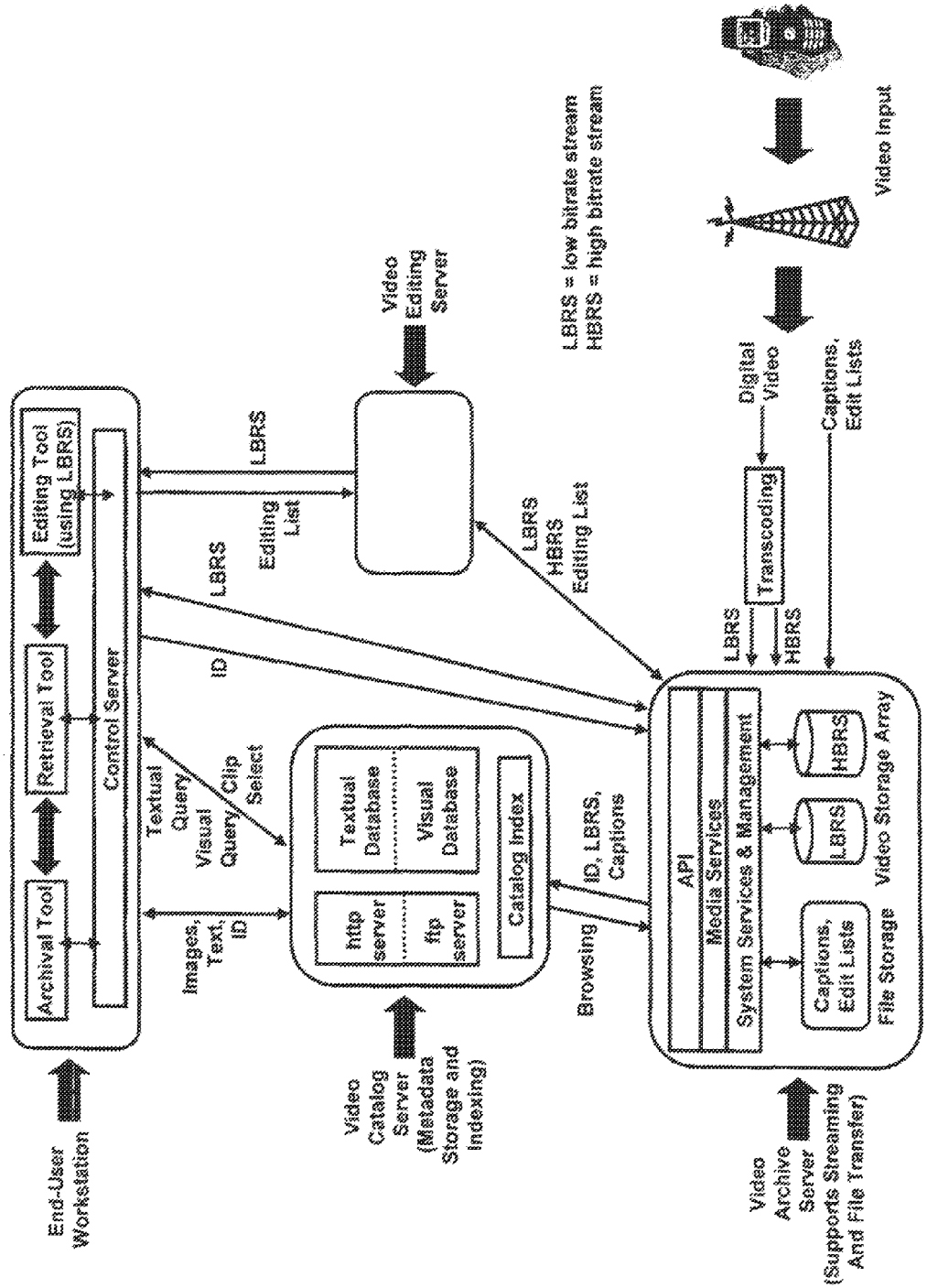
FIG. 7 depicts a distributed video editing system architecture, according to one embodiment.

FIG. 7 illustrates the functions and elements of a distributed video editing system for broadcast applications, including elements that support video archival and retrieval functions, according to one embodiment. Such systems are designed with the goal of providing commercial broadcasters with a complete solution for distributed video post-production, which integrates archival, retrieval, and editing functionalities.

In one embodiment, the system includes an archive server, an editing server, a catalog server, and a client station for the end user. Aspects of the current disclosure further comprise simplifying and accelerating the design and commercial deployment of similar distributed virtual studio systems that can support mobile personal "media producer" services, rather than just commercial broadcast services.

The archive server in FIG. 7 stores videos at both low and high bit-rates, and offers video streaming and file transfer services, according to one embodiment. The catalog server can host a database where video clips' metadata are stored and indexed. The client station allows users to perform archival and retrieval operations, as well as video editing using existing material at low bit-rate. The editing list created by the user is then processed by the editing server and applied to the corresponding high bit-rate material, in order to produce the ready-to-broadcast final video.

The catalog server automatically fetches the low bit-rate version of each new clip in the video archive and preprocesses it, in order to extract metadata. A video clip can be decomposed into smaller segments, by detecting the transition between shots and by analyzing motion properties. For each shot still images (keyframes) can be extracted for display purposes, and to enable automatic image indexing approach. Camera and camera lens motion (e.g., pan, tilt, zoom, stationary) properties can be computed from the motion vectors. These preprocessing steps are performed on the low bit-rate stream (typically MPEG-1), without decompression.

The archival tool in FIG. 7 allows the document list to visualize/edit the results of the clip preprocessing algorithm, and to enter additional textual annotation, according to one embodiment.

Graphical user interfaces enable, for example, a journalist or a program director to retrieve video material from the archive, using the available metadata from the catalog server. Once the items are selected, it is possible to export them to the editing tool. The retrieval tool in FIG. 7 allows one to query the database using textual and visual information, in one embodiment. Textual queries address specific fields entered during the archival process. Visual queues address metadata extracted during the preprocessing phase. The user specifies an example image, and defines the desired type of camera motion.

Embodiments of the present disclosure further comprise:
1. Reduced computational complexity for video encode, decode, and editing, in one embodiment.
2. Performing video editing steps or operations in the wavelet transformed domain, thereby saving both the computation of inverse wavelet transforms and forward wavelet transforms, and also saving computation by accessing and modifying fewer data items than would be required for the conventional operations on pixel data values, in one embodiment.
3. Allows mobile video applications to run on low-cost, low-power, PC CPUs, rather than specialized, expensive, power-hungry DSPs or ASICs, in one embodiment.
4. Fewer, less expensive, PC-based servers can replace larger number of specialized video application servers, reducing deployment & operational cost per subscriber, in one embodiment.
5. Reduces the computing power required to execute all of the real-time functions of an online editing system, and allows a software implementation of these real-time editing functions, in one embodiment.
6. Enables end user support for automated video editing and other processing via a SW client on mobile handsets, personal media players, laptop computers, and personal computers, in addition to end-user workstations, in one embodiment.
7. Enables further improvements in the end-to-end functionality and performance of mobile video services, enabled by passing information, such as anti-shake camera motion compensation information, that can be captured in the imager module in a mobile device, to one or more of: a subsequent video codec in the handset devices, a video processing applications server in the mobile network, and/or a receiving video playback device.

The video editing services, for example the "automated video editing system", can also be used compensate for or correct one or more of: limited low light sensitivity of the camera; imaging element (typically, a CMOS, CCD or similar devices), and/or for distortions coming from the camera module's lenses, compensating for camera jitter occurring during video recording.

Such information can then be used to further reduce the computational requirements of the video codec, for example by providing additional motion compensation information that may otherwise be extracted by the video codec from the input video data, in one embodiment. Such information can also be used to further compensate for camera motion, which occurs during video capture in the mobile device, during editing and further video processing that is subsequently carried out in a video processing applications server in the mobile network. Such information can also be used to recreate the effects of camera motion, which may have bean previously removed via video preprocessing in the camera module in the mobile device, during editing and further video processing that is subsequently carried out in a video processing applications server in the mobile network, and/or in a receiving video playback device, according to one embodiment.

With the embodiments of the present disclosure, mobile video services are being launched into a market that now associates video with home cinema quality broadcast (e.g., full size image formats such as VGA at 30 frames per second). Furthermore, processing of such large volumes of data using exceeds the computing resources and battery power available for real-time video capture (encoding) in mobile handsets.

In some situations, encoding of video content for broadcast and streaming applications may be performed in a studio environment, where high-complexity encoders can be run on computer workstations. Since video messages are captured in real time in the handset itself, they are limited to much smaller sizes and much lower frame rates.

Embodiments of the present disclosure, include lower complexity imaging applications (e.g., video codec client for mobile handsets, video editing and processing applications for MMS application servers) that can be implemented as an application in mobile handsets and MSS application servers, to reduce the complexity of the handset architecture and the complexity of the mobile imaging service platform architecture.

According to embodiments of the present disclosure, a video codec solution reduces or eliminates baseband processor and video accelerator costs and requirements in multimedia handsets. Combined with the ability to install the codec post-production via OTA download, this all-SW solution substantially reduces the complexity, risk, and cost of both handset development and video messaging service architecture and deployment. Reduced camcorder phone development time and increased product platform flexibility provide further camcorder phone cost reductions.

SW video transcoders and editing, storing, searching, retrieval applications according to the present disclosure enable automated over-the-network (OTN) upgrade of deployed MMS control infrastructure, as well as the use of standard PCs and servers to run such applications. Additionally the present disclosure wavelet transcoders provide carriers with complete interoperability between the wavelet video format and other standards-based and proprietary video formats. Embodiments of the present disclosure further includes a software decoder to be embedded with each transmitted video stream, enabling "self-playing" functionality on common handset and PV video players, and eliminating the cost and complexity of transcoding altogether.

In one embodiment, the video platform allows rapid deployment of new MMS services. Some embodiments of embodiments of the present disclosure also leverage processing speed and video production accuracy not available with other existing technologies. Such new MMS services are themselves aspects of the current disclosure.

The present disclosure's wavelet codecs are also unique in their ability to efficiently process both still images and video, and can thus replace separate MPEG and JPEQ codecs with a single lower-cost and lower-power solution that can simultaneously support both mobile picture-mail and video-messaging services. Embodiments of the present disclosure further comprises improving the end-to-end functionality and performance of mobile video services, by sharing information, such as anti-shake camera motion compensation information, that is captured in the imager module in a mobile device, with a subsequent video codec in the handset devices, a video processing applications server in the mobile network, and/or a receiving video playback device.

Improved Wavelet-Based Image Processing

Aspects of the present disclosure further utilize 3-D wavelet transforms in video compression/decompression (codec) devices, for example, with much lower computational complexity than DCT-based codecs.

Figure 8:
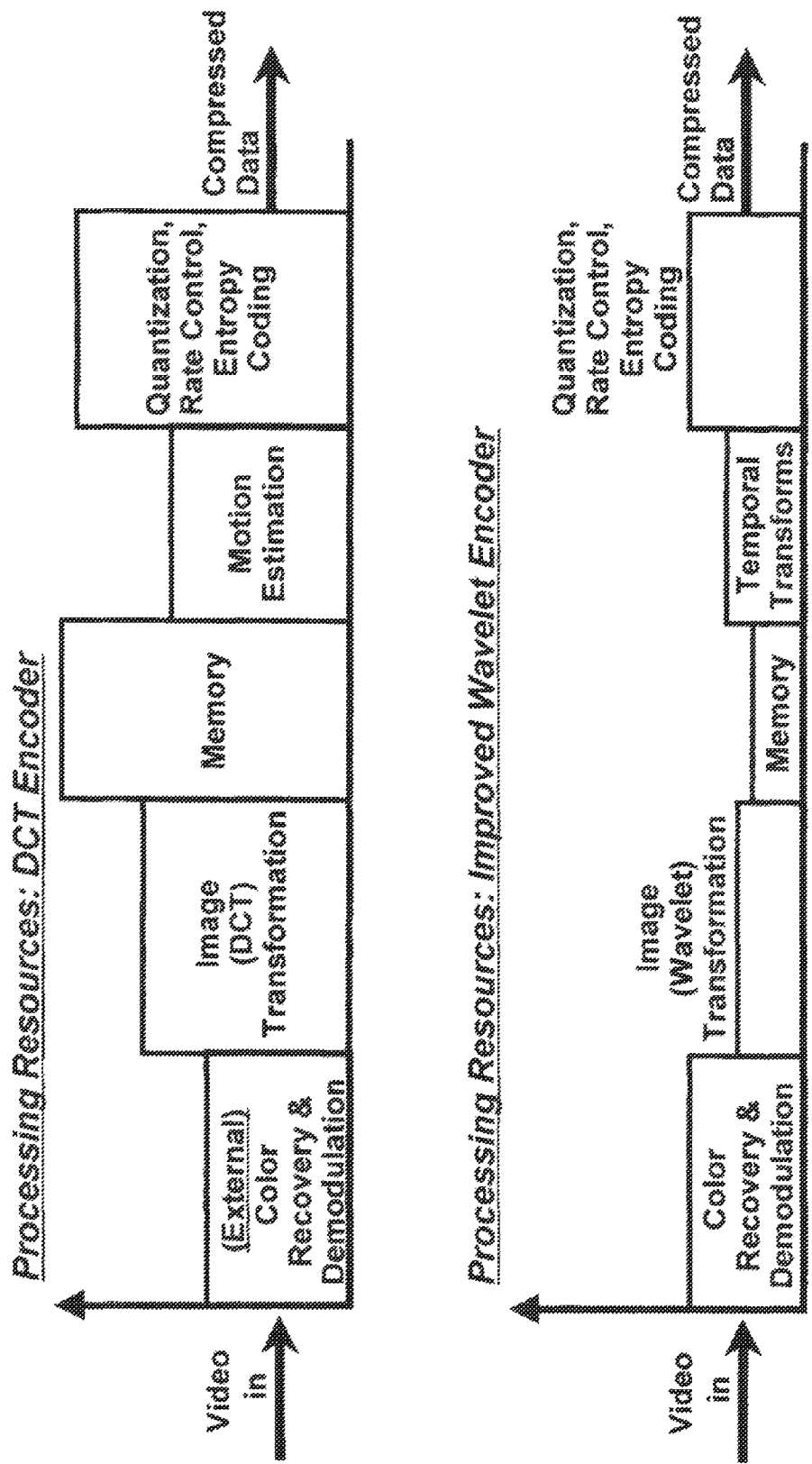
FIG. 8 depicts a comparison of video codec technologies, according to one embodiment.

FIG. 8 provides a comparison of the relative computational requirements of a traditional DCT encoder technology and exemplary technologies of the present disclosure, according to one embodiment. The application of a wavelet transform stage also enables design of quantization and entropy-coding stages with greatly reduced computational complexity.

Figure 9:
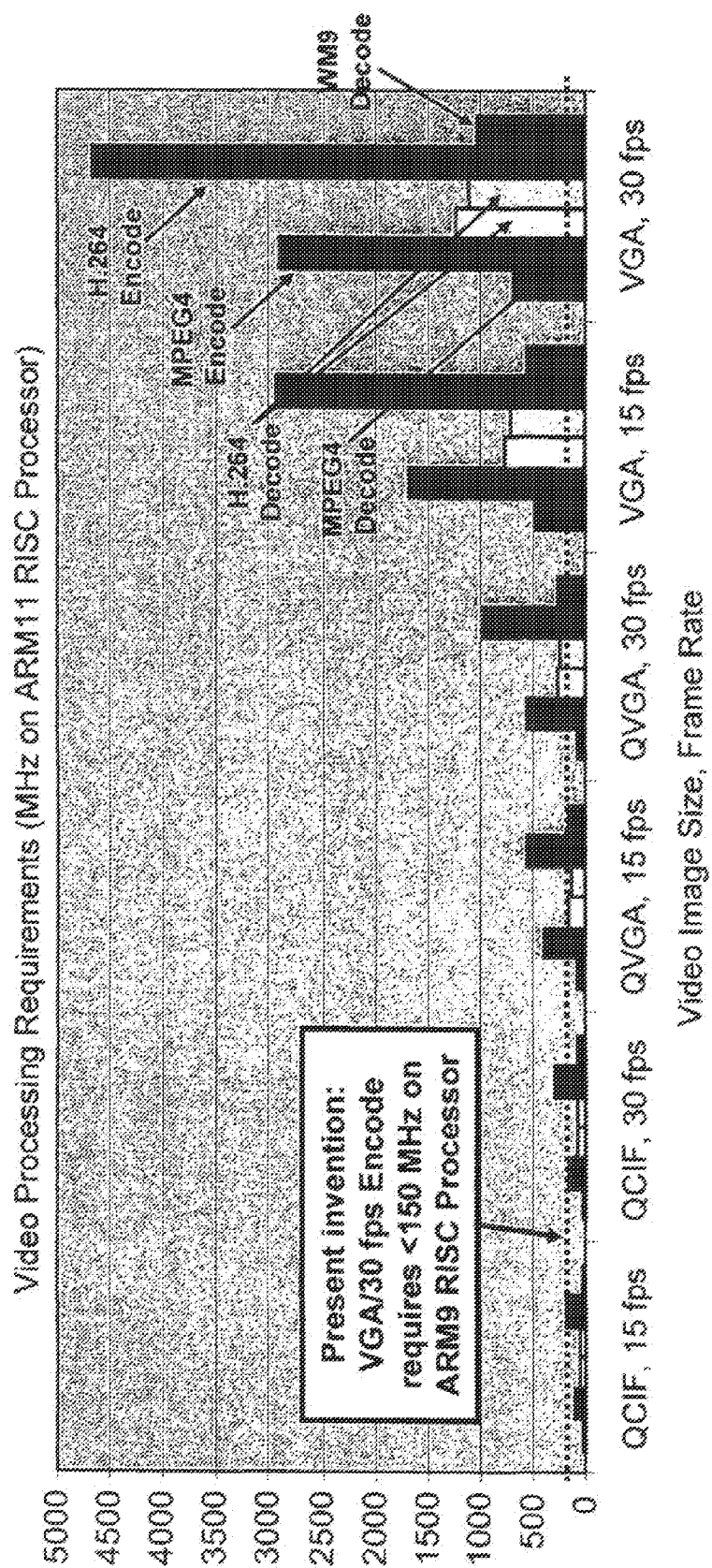
FIG. 9 depicts reduced video codec computational requirements, according to one embodiment.

FIG. 9 depicts the reduction in video codec computational requirements enabled by aspects of the present disclosure, according to one embodiment.

In some embodiments, wavelet codecs (e.g., 3D wavelet codes) may further provide, for mobile imaging applications, devices, and services, one or more of the following:

Symmetric, low-complexity video encoding and decoding;
Lower processor power requirements for both SW and HW codec implementations;
Software encoding and decoding of VGA (or larger) video at a frame rate of 30 fps (or higher) with processor requirements compatible with existing commercial mobile handsets, both as native code and as a Java application;
Lower gate-count ASIC cores for SoC integration;
Lower buffer memory requirements;
Single codec supports both still images (~JPEG) and video (~MPEG);
Simplified video editing (cuts, inserts, text overlays,) due to shorter group of pictures (GOP);
Simplified synchronization with voice codecs, due to shorter GOP;
Low latency for enhanced video streaming, due to shorter GOP;
Fine grain scalability for adaptive rate control, multicasting, and joint source-channel coding;
Low-complexity performance scaling to emerging HDTV video formats;
Compact SW decoder (<40 kB) can be integrated with each transmitted video stream to enable "self playing" video messages compatible with common handset and PC video players;

In some embodiments, application of wavelet transforms utilize short dyadic integer filter coefficients in the lifting structure. For example, the Haar, 2-6, and 5-3 wavelets and variations of them can be used.

In one embodiment, the Lifting Scheme computation algorithm can be used. For example, these filters are computed using the Lifting Scheme, which enables in-place computation. This decreases use of registers and temporary RAM locations, and keeps references local for highly efficient use of caches.

In one embodiment, wavelet transforms in pyramid form with customized pyramid structure can be used. For example, some embodiments of the present disclosure further includes computing each level of the wavelet transform sequence on half of the data resulting from the previous wavelet level, so that the total computation is almost independent of the number of levels. In one embodiment, the pyramid is customized to leverage the advantages of the Lifting Scheme above and further economize on register usage and cache memory bandwidth.

In one embodiment, block structure can be utilised. For example the present disclosure divides the picture into rectangular blocks and processes each block separately from the other thus enabling memory references to be kept local and to do an entire transform pyramid with data that remains in the processor cache, saving a significant amount of data movement within most processors. The present block structure may be beneficial in HW embodiments as it avoids the requirement for large intermediate storage capacity in the signal flow.

In one embodiment, block boundary filters can be used: the present disclosure uses modified filter computations at the boundaries of each block that avoid sharp artifacts as set out in U.S. patent application Ser. No. 10/418,363, incorporated herein by reference.

In one embodiment, chroma temporal removal can be used: for example, using a single field of chroma for a GOP as set out in U.S. patent application Ser. No. 10/447,514, incorporated herein by reference.

In one embodiment, temporal compression using 3D wavelets can be used: Instead certain embodiments of the present disclosure compute a field-to-field temporal wavelet transform. This is much less expensive to compute. Also used are short integer filters with the Lifting Scheme in one aspect.

In one embodiment, the dyadic quantization algorithm can be used: In certain embodiments of the present disclosure, the quantization step of the compression process is accomplished using a binary shift operation uniformly over a range of coefficient locations.

In one embodiment, the piling algorithm can be used. For example, in some embodiments of the present disclosure, the amount of data to be handled by the following entropy coder by doing run-of-zeros conversion is reduced. In certain embodiments, the methods and disclosures disclosed in U.S. patent application Ser. No. 10/447,455 incorporated herein by reference are utilized for counting runs of zeros on parallel processing architectures.

In one embodiment cycle-efficient entropy coding can be used. For example, the entropy coding step of the compression process can be accomplished using techniques that combine the traditional table lookup with direct computation on the input symbol. Because the symbol distribution has been characterized, such simple entropy coders as Rice-Golomb or exp-Golomb or Dyadic Monotonic can be used. The choice of entropy coder details depending on the processor platform capabilities. The methods disclosed in U.S. patent application Ser. No. 10/447,467 incorporated herein by reference, and U.S. patent application Ser. No. 11/232,726 incorporated herein by reference, may be utilized.

Aspects of the present disclosure also enable video editing processes or operations to be accomplished in the wavelet transformed domain, thereby saving both the computation of inverse wavelet transforms and forward wavelet transforms, and also saving computation by accessing and modifying fewer data items than would be required for the conventional operations on pixel data values. Examples of such video editing processes accomplished in the wavelet transform domain with reduced computation further include, but are not limited to:

1. Fade to Black

In one embodiment, starting with wavelet transform data (coefficients rather than pixel data values), decrease the Luma DC coefficient of a picture (or of each block if there are blocks) by some amount in each time step, thus making the overall brightness level decrease smoothly to black. The decrease stops when the DC level has reached full black, or can be continued beyond full black to assure that all parts of the picture have reached black. Note that about 1/256 of the data is accessed and/or modified at each time step, in the case of block transforms as used in Droplet's current commercial codecs, or about 1/300,000 of the data in the case of a non-blocked full-transform wavelet implementation.

2. Fade to White

This is similar to Fade to Black except that the DC coefficients are increased progressively toward the full-brightness level, according to one embodiment.

3. Blur Out

Starting with the same wavelet transform data coefficients, at each successive time step we replace the next coefficient in order of fine-to-coarse spatial detail, in one embodiment. This order corresponds to the "reverse zigzag scan" order of coefficients in JPEG and MPEG encoding. At the final time step we replace the DC coefficient with the value representing middle gray. The replacements are done within each block of the picture, in the case of block transforms. This process has the effect of blurring the image until no information remains. Note that about 1/256 of the date is accessed and/or modified at each time step.

4. Cheshire Fade (Fade to Fine Detail)

Starting with the same wavelet transform data coefficients, at the first time step we replace the DC coefficient with the value representing middle gray, in one embodiment. At each successive time step we replace the next coefficient in order of coarse-to-fine spatial detail. This order corresponds to the "zigzag scan" order of coefficients in JPEG and MPEG encoding. The replacement is done within each block of the picture, in the case of block transforms. Note that about 1/268 of the data is accessed and/or modified at each time step.

5. Color Correction

Starting with the same wavelet transform data coefficients, we modify the Chroma DC coefficients only. This has the effect of modifying color balance across the entire image, and only needs to access and modify about 1/258 or fewer of the data elements.

Improved Mobile Imaging Handset Architecture

Figure 10:
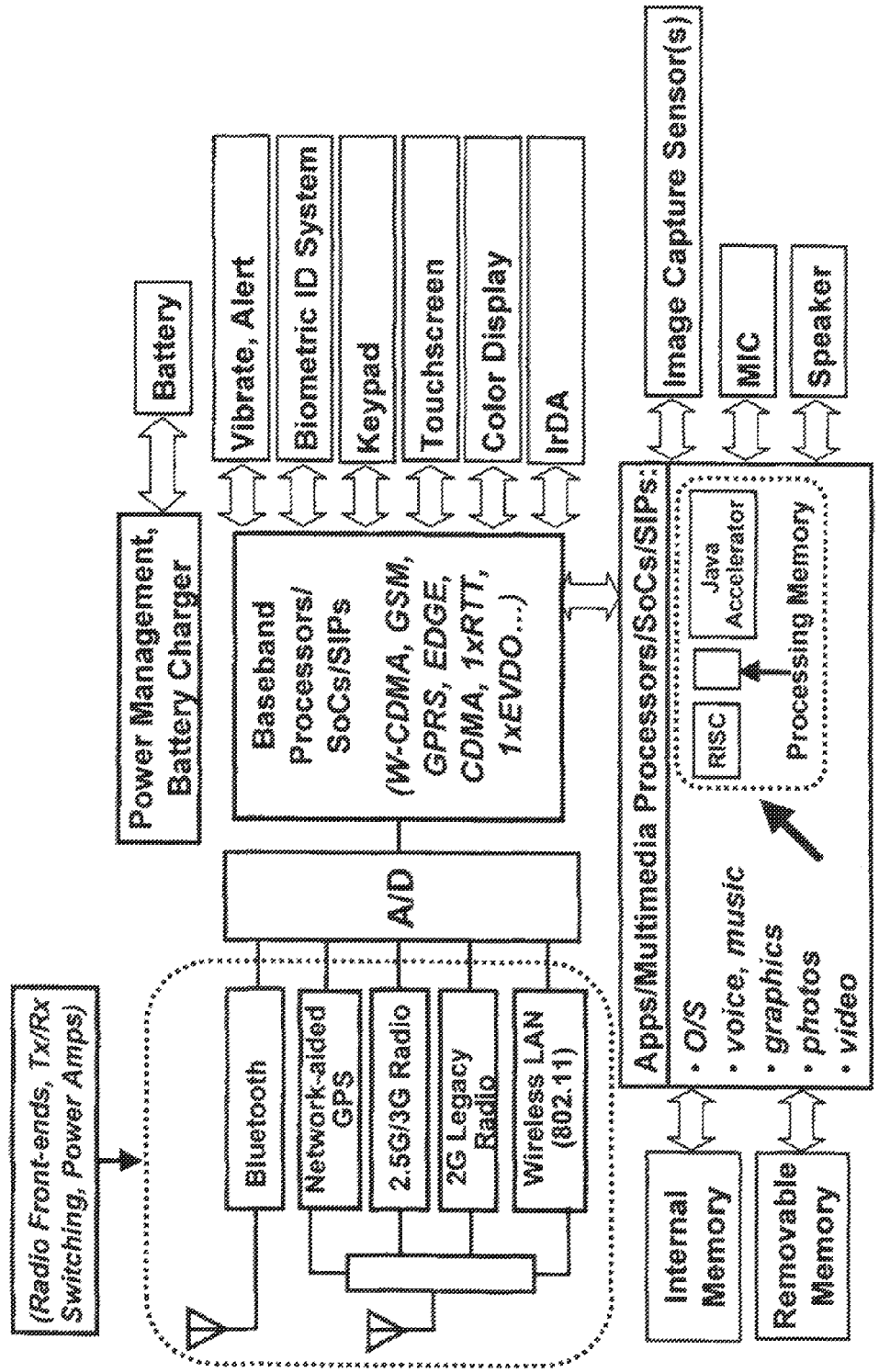
FIG. 10 depicts an improved mobile imaging handset architecture, according to one embodiment.

FIG. 10 depicts a mobile imaging handset architecture enabled by aspects of the present disclosure, according to one embodiment.

Improved Video Processing and Applications Server Architecture

Figure 11:
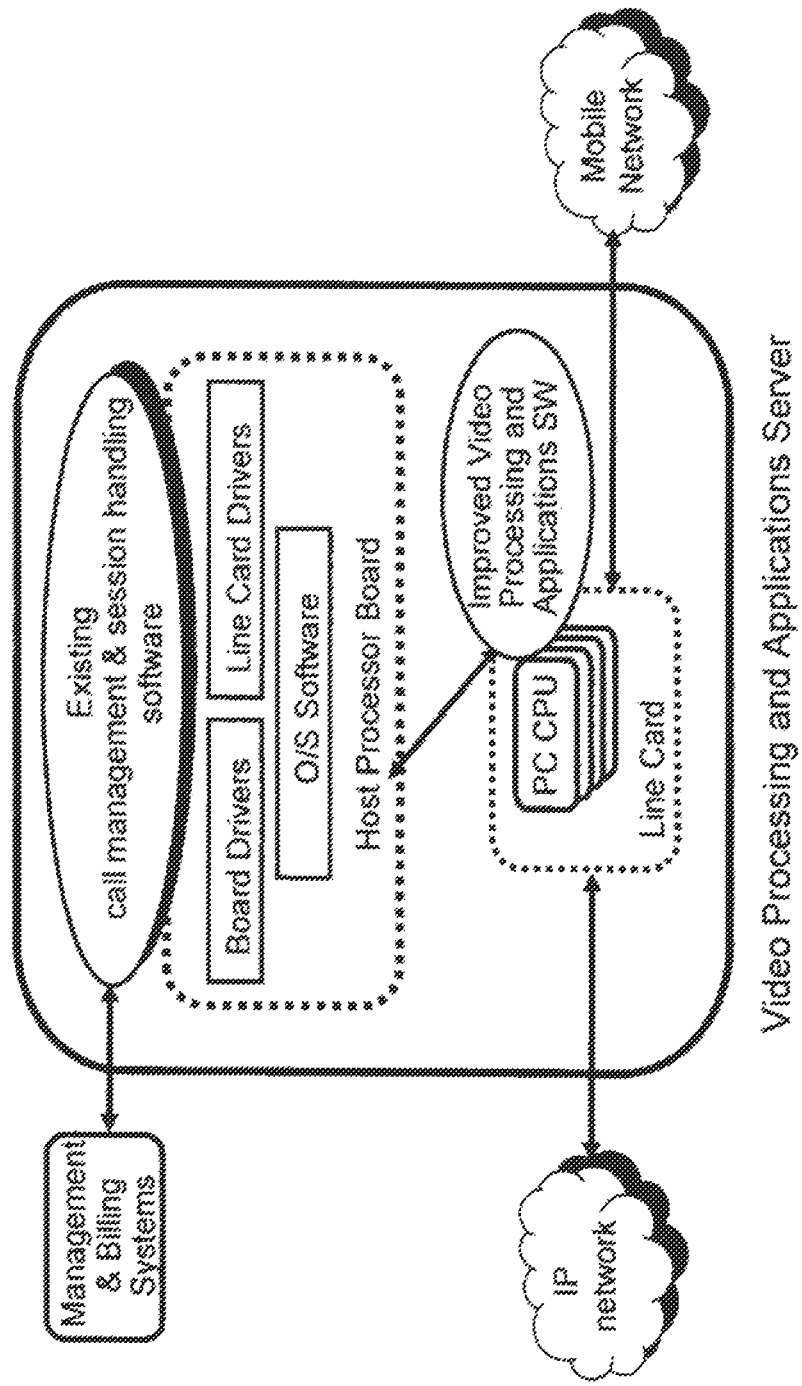
FIG. 11 depicts an improved video processing and applications server architecture, according to one embodiment.

FIG. 11 depicts a video processing and applications server architecture, in Which separate line cards containing specialized data processing elements, including, but not restricted to: digital signal processors (DSPs), application specific integrated circuits (ASICs), multimedia processors, and reconfigurable processing devices (RPDs), are replaced by general-purpose personal computer (PC) central processing units (CPUs), according to one embodiment.

Figure 12:
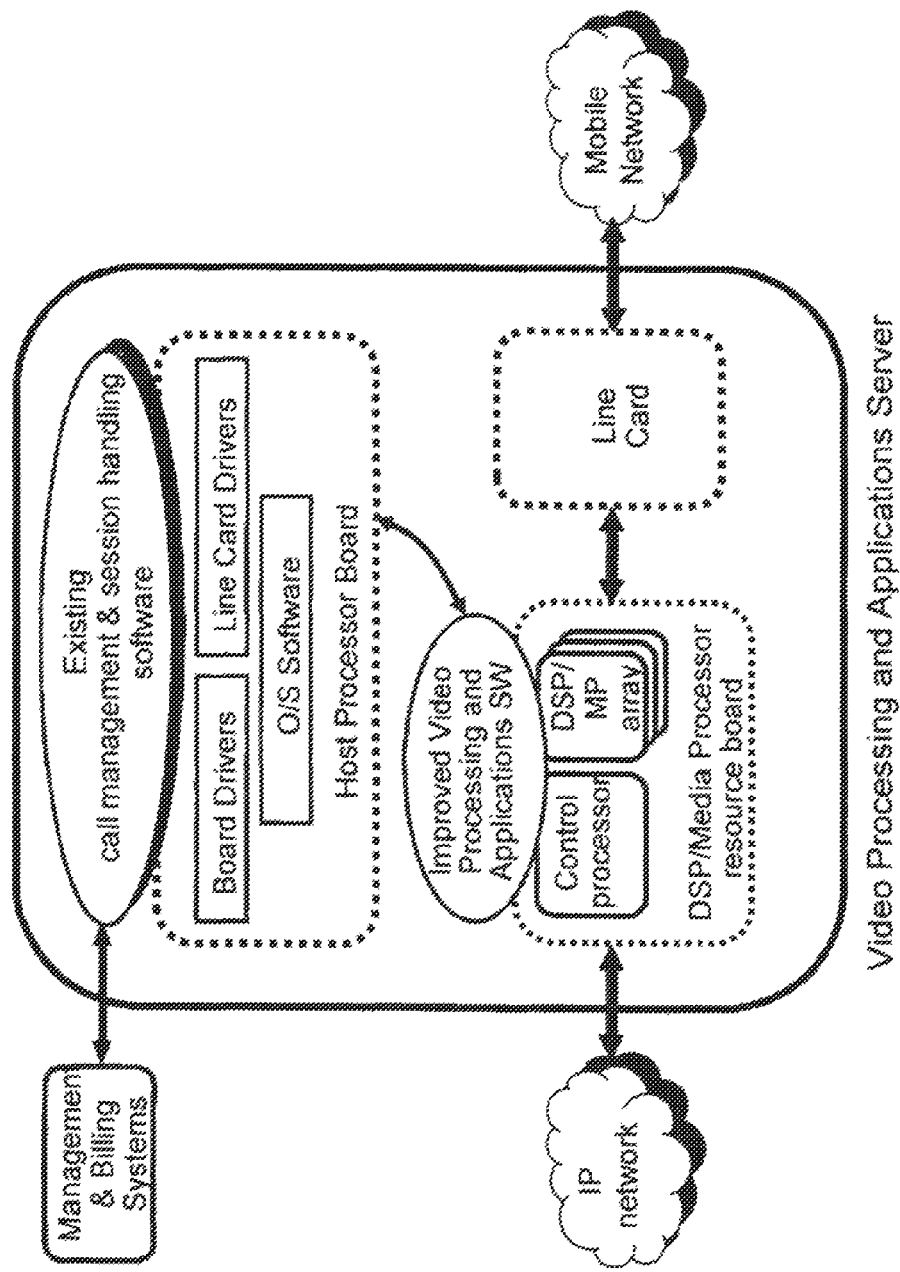
FIG. 12 depicts an alternative improved video processing and applications server architecture, according to one embodiment.

FIG. 12 depicts a video processing and applications server architecture, in which wavelet-based SW video transcoders and editing, storing, searching, retrieval applications according to the present disclosure replace DCT-based video processing running on digital signal processors (DSPs), application specific integrated circuits (ASICs), multimedia processors, and reconfigurable processing devices (RPDs), according to one embodiment.

Figure 13:
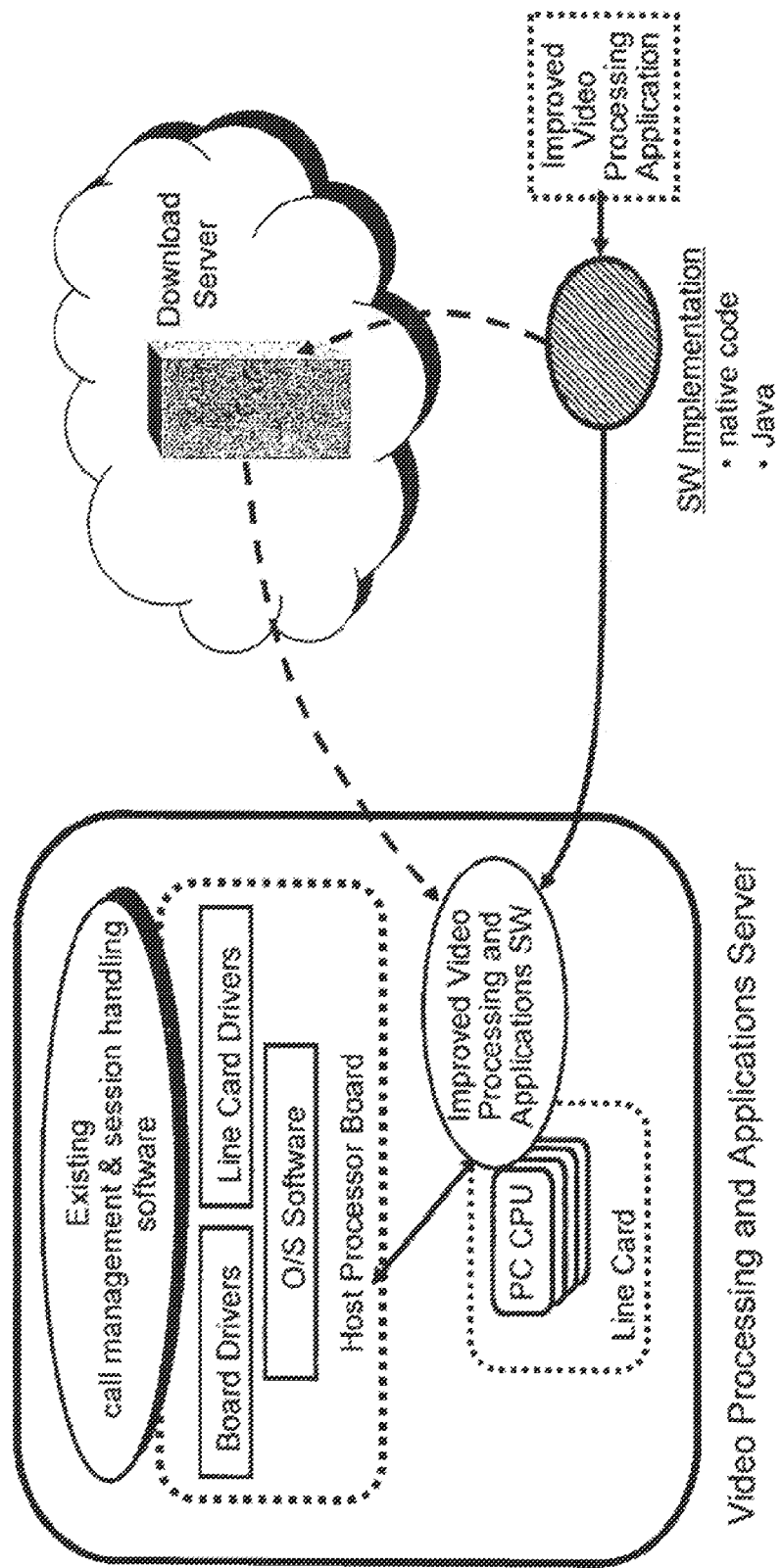
FIG. 13 depicts an all-software implementation of an improved video processing and applications server architecture, according to one embodiment.

Various embodiments of the present disclosure provide enhancements to the MMS applications server architecture. For example, several implementation options can be considered tor the SW wavelet-based video processing and applications in the improved video processing and applications server (see FIG. 13). The imaging application can be installed via OTN download to the multimedia processing section of the server. The imaging application can also be installed during manufacturing, at point-of-sale, or during installation, to the multimedia processing section of the server. Additional implementation options are also possible.

Figure 14:
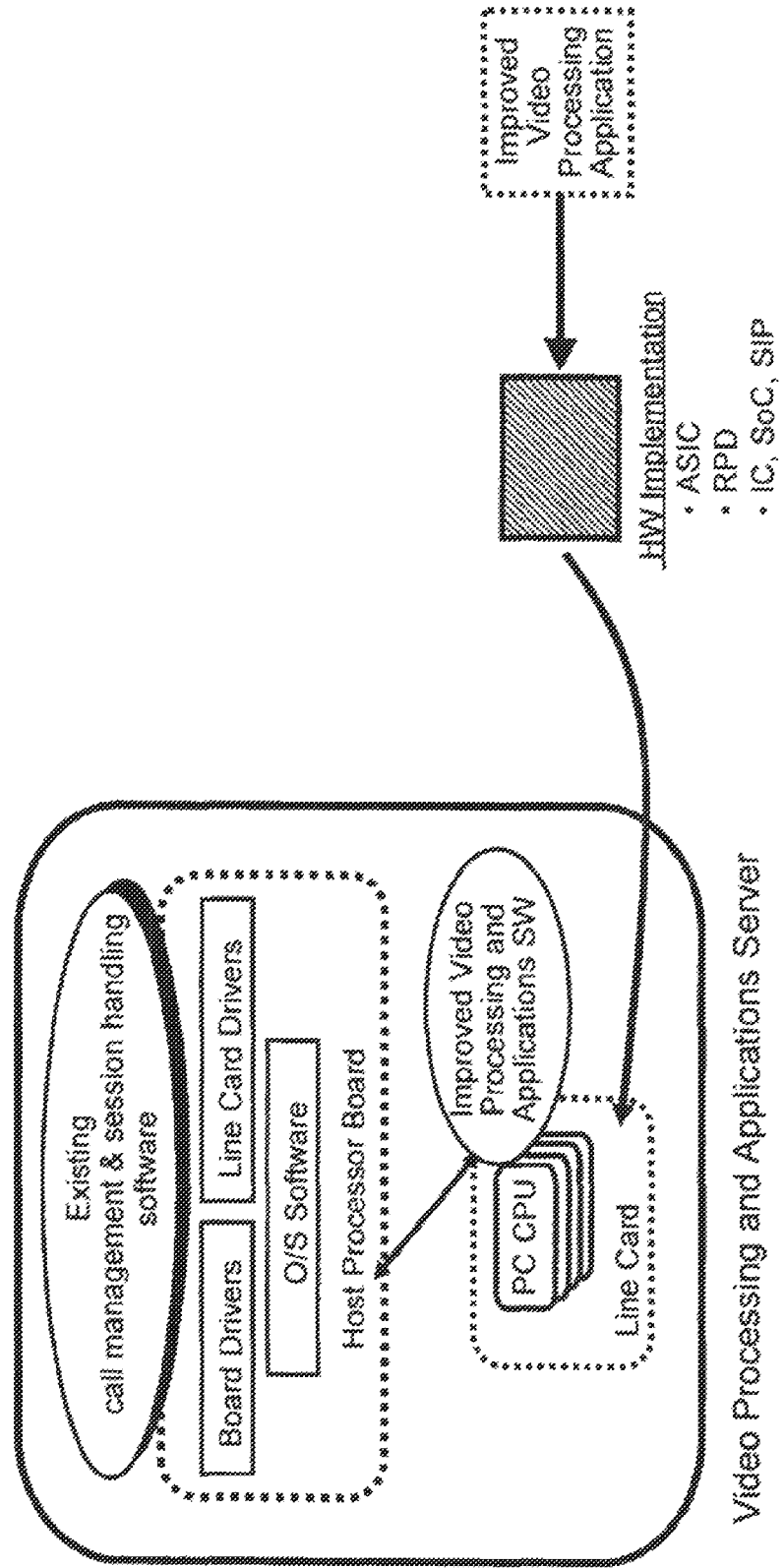
FIG. 14 depicts an all-hardware implementation of an improved video processing and applications server architecture, according to one embodiment.

According to aspects of the present disclosure, performance of the video processing and applications server may be improved, and costs and power consumption may be reduced, by accelerating some computational elements via HW-based processing resources in order to take advantage of ongoing advances in mobile device computational HW (ASIC, DSP, RPD) and integration technologies (SoC, SIP). Several all-HW options can be implemented for integrating these hardware-based processing resources in the server (see FIG. 14).

Figure 15:
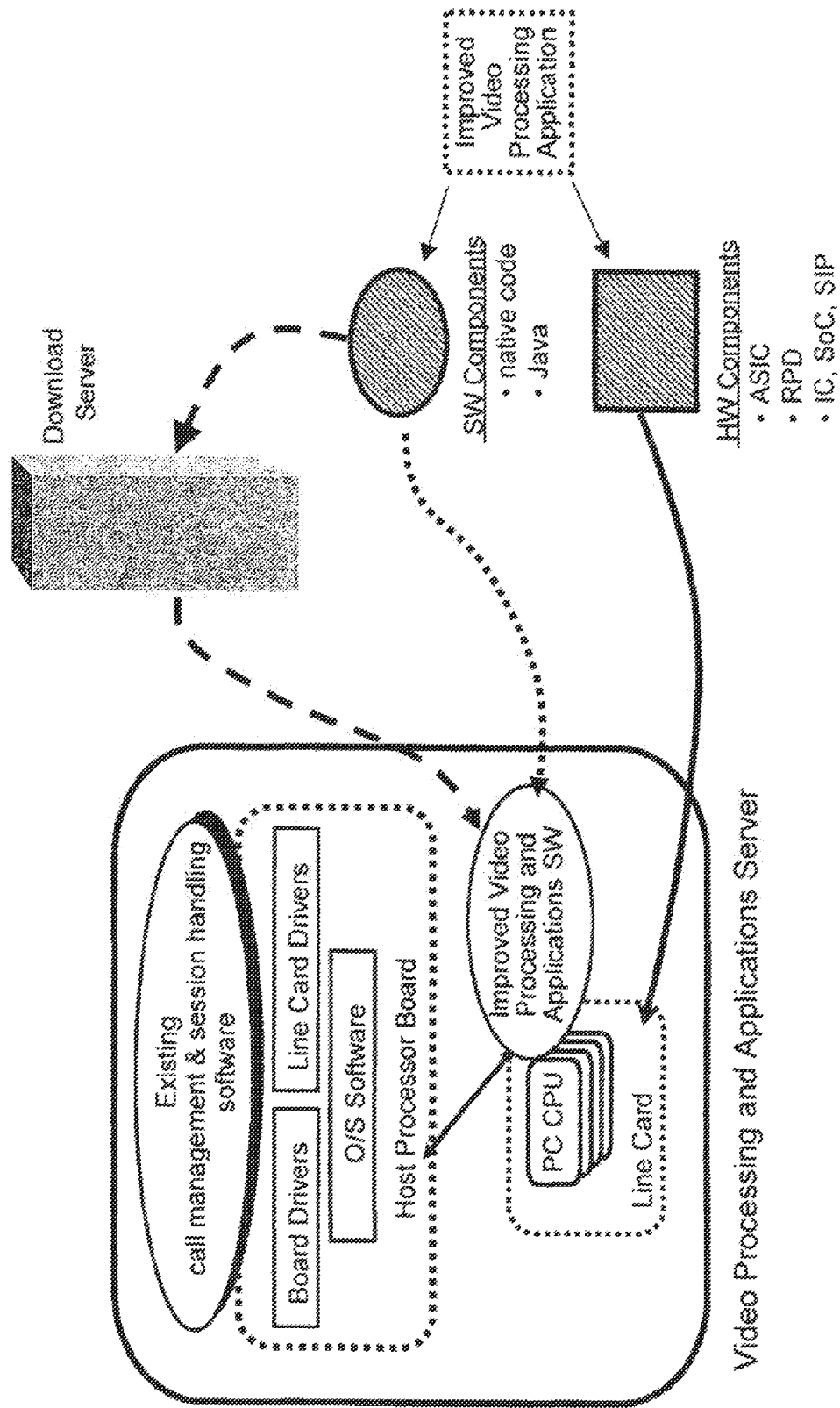
FIG. 15 depicts a hybrid software and hardware implementation of an improved video processing and applications server architecture, according to one embodiment.

As shown in FIG. 15, hybrid architectures offered by aspects of the present disclosure for the video processing applications may offer enhancements by implementing some computationally intensive, repetitive, fixed functions in HW, and implementing in SW those functions for which post-manufacturing and post-installation modification may be desirable or required, according to one embodiment.

Improved Video Editing, Archiving, and Retrieval System

Figure 16:
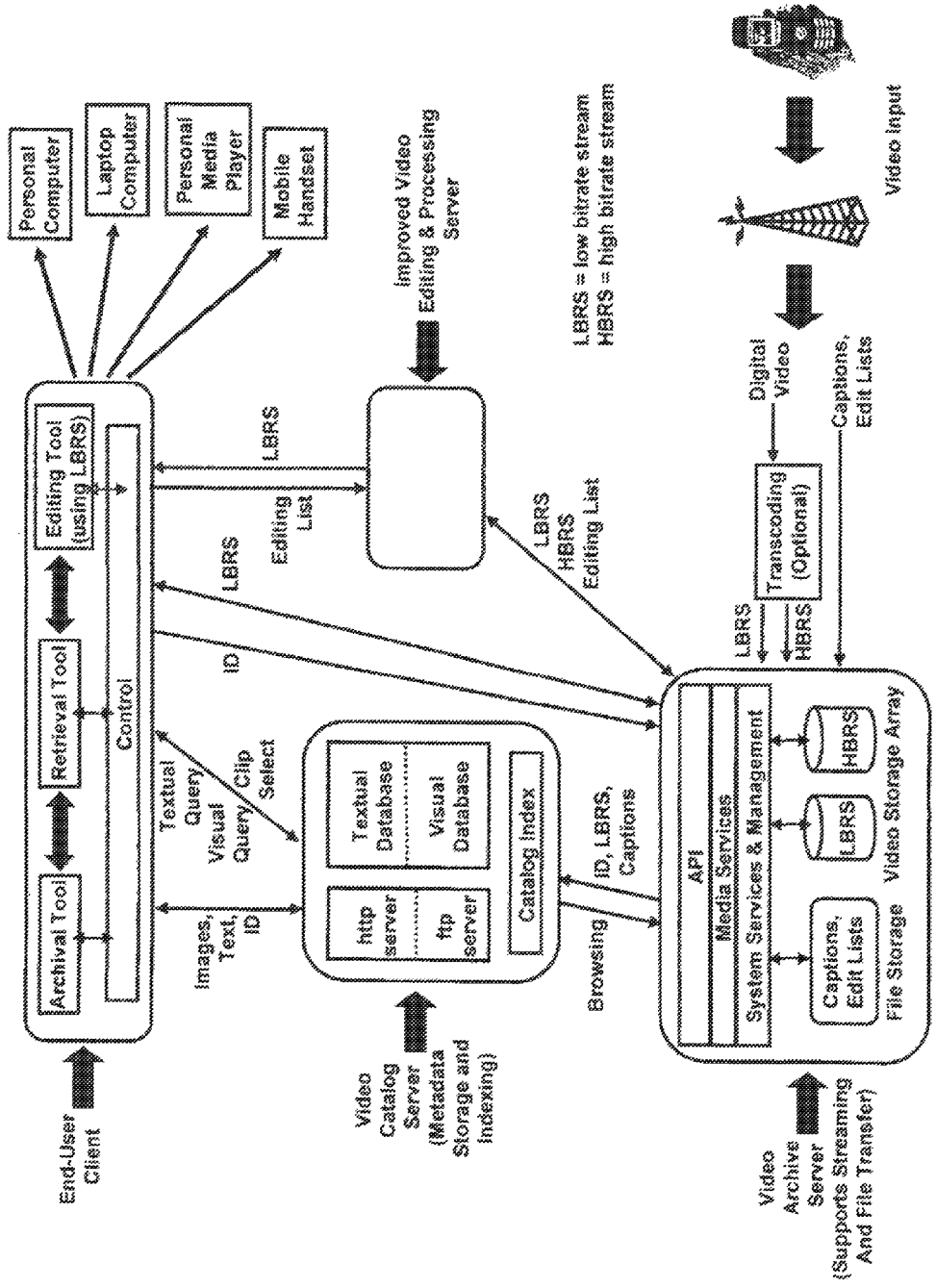
FIG. 16 depicts an improved distributed video editing system architecture, according to one embodiment.

FIG. 16 illustrates the functions and elements of distributed video editing system for broadcast applications, including elements that support video archival and retrieval functions, according to one embodiment. Aspects of the current disclosure simplify and accelerate the design and deployment of such distributed virtual studio systems that can support mobile personal "media producer" services, rather than just commercial broadcast services. Embodiments of the present disclosure further include, one or more of:

1. Reduced computational complexity for video encode, decode, and editing;
2. Performing video editing steps or operations in the wavelet transformed domain, thereby saving both the computation of inverse wavelet transforms and forward wavelet transforms, and also saving computation by accessing and modifying fewer data items than would be required for the conventional operations on pixel data values;
3. Allows mobile video applications to run on low-cost, low-power, PC CPUs, rather than specialized, expensive, power-hungry DSPs or ASICs;
4. Fewer, less expensive, PC-based servers can replace larger number of specialized video application servers, reducing deployment & operational cost per subscriber;
5. Reduces the computing power required to execute all of the real-time functions of an online editing system, and allows a software implementation of these real-time editing functions;
6. Enables end user support for automated video editing and other processing via a SW client on mobile handsets, personal media players, laptop computers, and personal computers, in addition to end-user workstations;
7. Enables an end-to-end functionality and performance of mobile video services; These are enabled by passing information, such as anti-shake camera motion compensation information, that is captured in the imager module in a mobile device, to one or more of: a subsequent video codec in the handset devices, a video processing applications server in the mobile network, and/or a receiving video playback device. Such information can then be used to further reduce the computational requirements of the video codec, for example by providing additional motion compensation information that must otherwise be extracted by the video codec from the input video data.

Such information can also be used to further compensator camera motion, which occurs during video capture in the mobile device, during editing and further video processing that is subsequently carried out in a video processing applications server in the mobile network. Such information can also be used to recreate the effects of camera motion, which may have been previously removed via video preprocessing in the camera module in the mobile device, during editing and further video processing that is subsequently carried out in a video processing applications server in the mobile network, and/or in a receiving video playback device, in one embodiment.

Improved Mobile Imaging Service Platform Architecture

Figure 17:
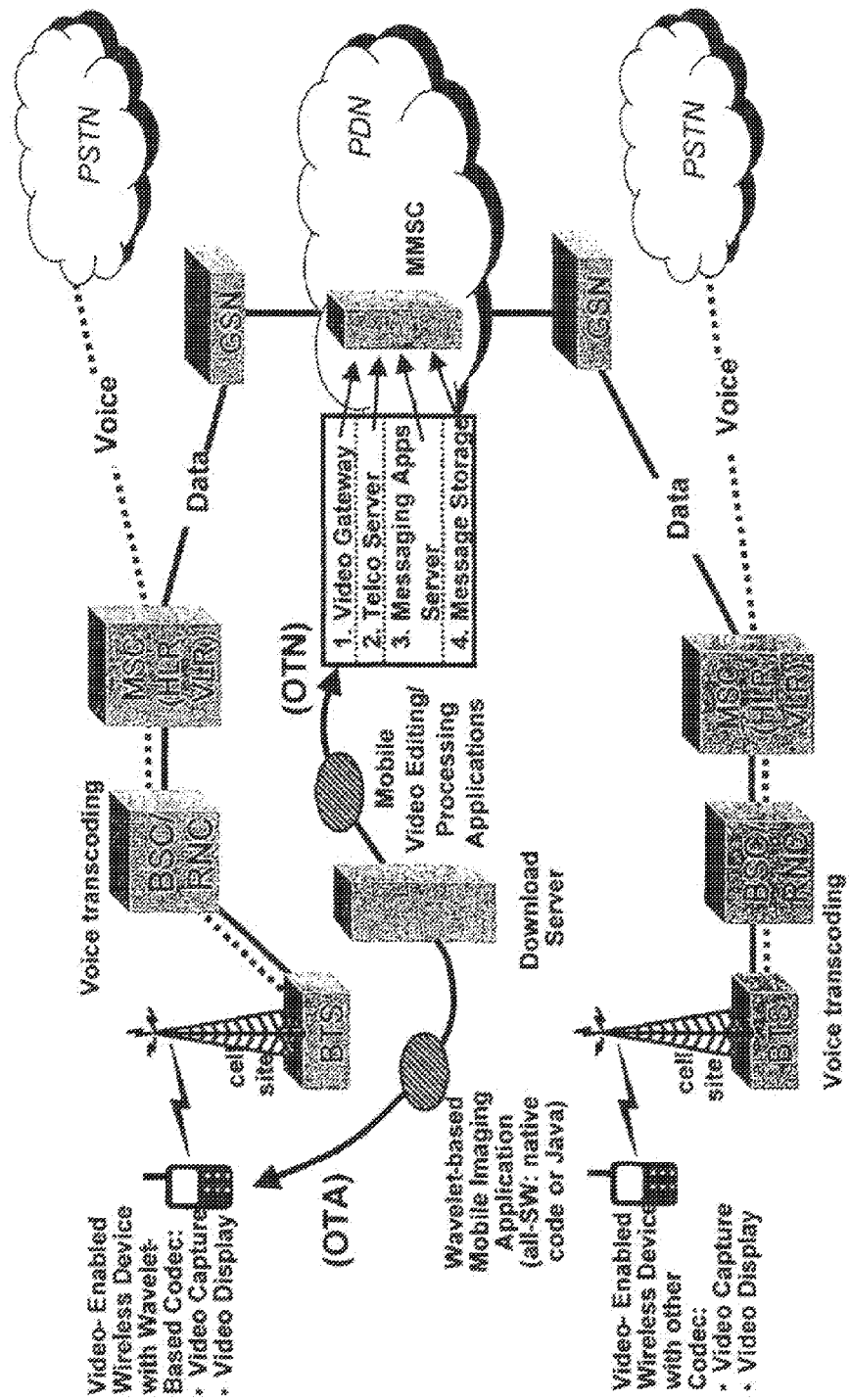
FIG. 17 depicts an improved mobile imaging service platform architecture, according to one embodiment.

Components of an improved mobile imaging service platform architecture according to embodiments of the present disclosure (see FIG. 17) include, one or more of:

Mobile Handsets
Mobile Base stations (BTS)
Base station Controller/Radio Network Controller (BSC/RNC)
Mobile Switching Center (MSG)
Gateway Service Node (GSN)
Mobile Multimedia Service Controller (MMSC)
Imaging Service Download Server Functions included in the MMSC (see FIG. 17) include, one or more of:

Video Gateway
Telco Server
MMS Applications server
Storage Server

Figure 18:
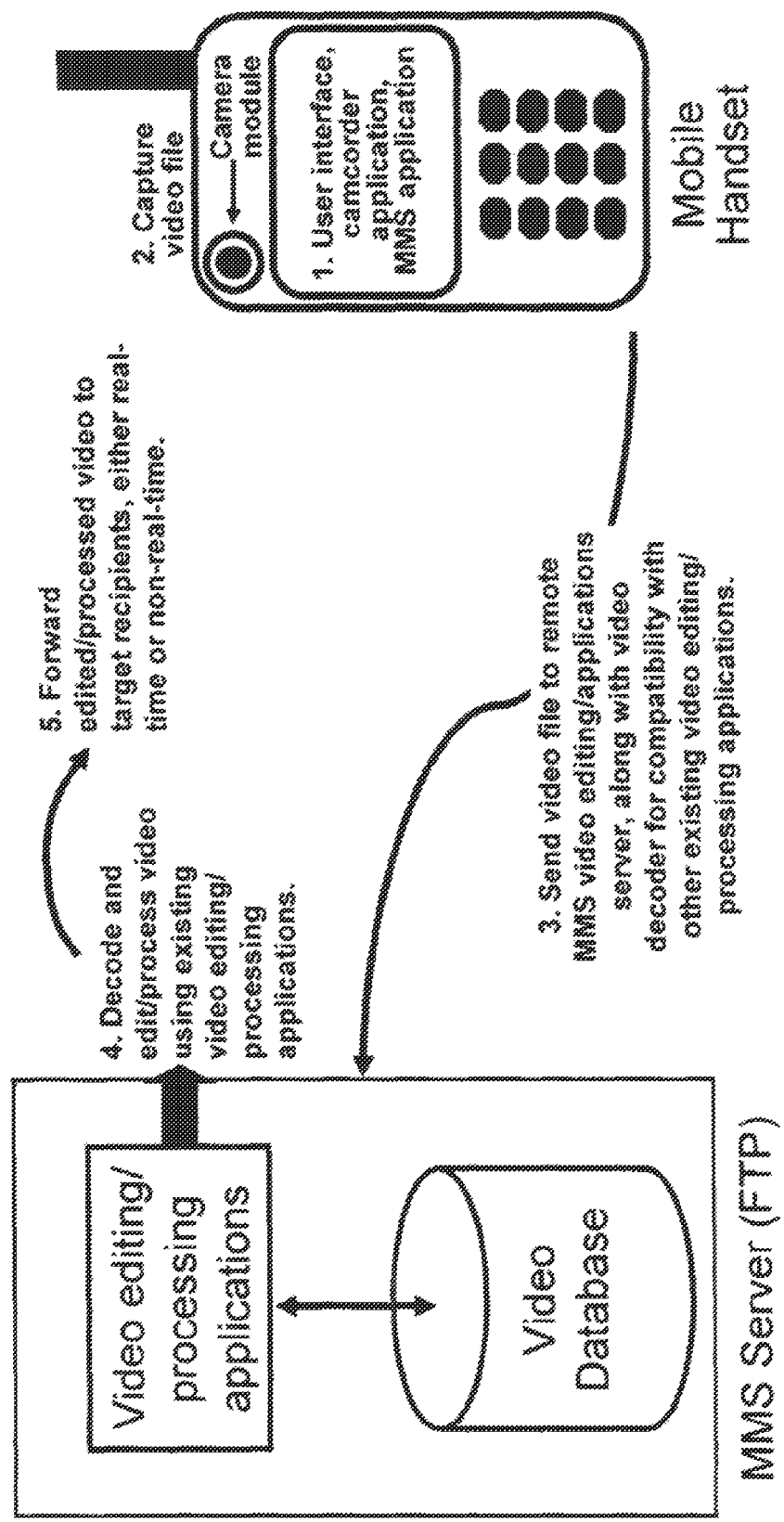
FIG. 18 depicts a self-decoding video MMS that eliminates the need for transcoding and allows existing video processing/applications servers to process the video format, according to one embodiment.

Embodiments of the present disclosure includes processes for deploying the improved imaging service platform include, one or more of:

Process 1.
Signal network that video editing/processing applications are available for updating deployed MMSCs. The update can be installed via automated OTN deployment or via manual procedures;

Process 2.
Install and configure video editing/processing SW applications via automated OTN deployment or via manual procedures (see FIG. 17);

Process 3.
Signal subscriber handset that Mobile Video Imaging Application is available for download and installation;

Process 4.
If accepted by subscriber, and transaction settlement is completed successfully, download and install Mobile Video Imaging Application;

Process 5.
Signal network that handset upgrade is complete. Activate service and related applications. Update subscriber monthly billing records to reflect new charges for Mobile Video Imaging Application;

According to one embodiment of the present disclosure. FIG. 18 shows "self-decoding" video MMS functionality achieved by integrating the SW decoder with the transmitted video stream, that eliminates the need for transcoding and allows existing video processing/applications servers to process the video format provided by the current disclosure.

Figure 19:
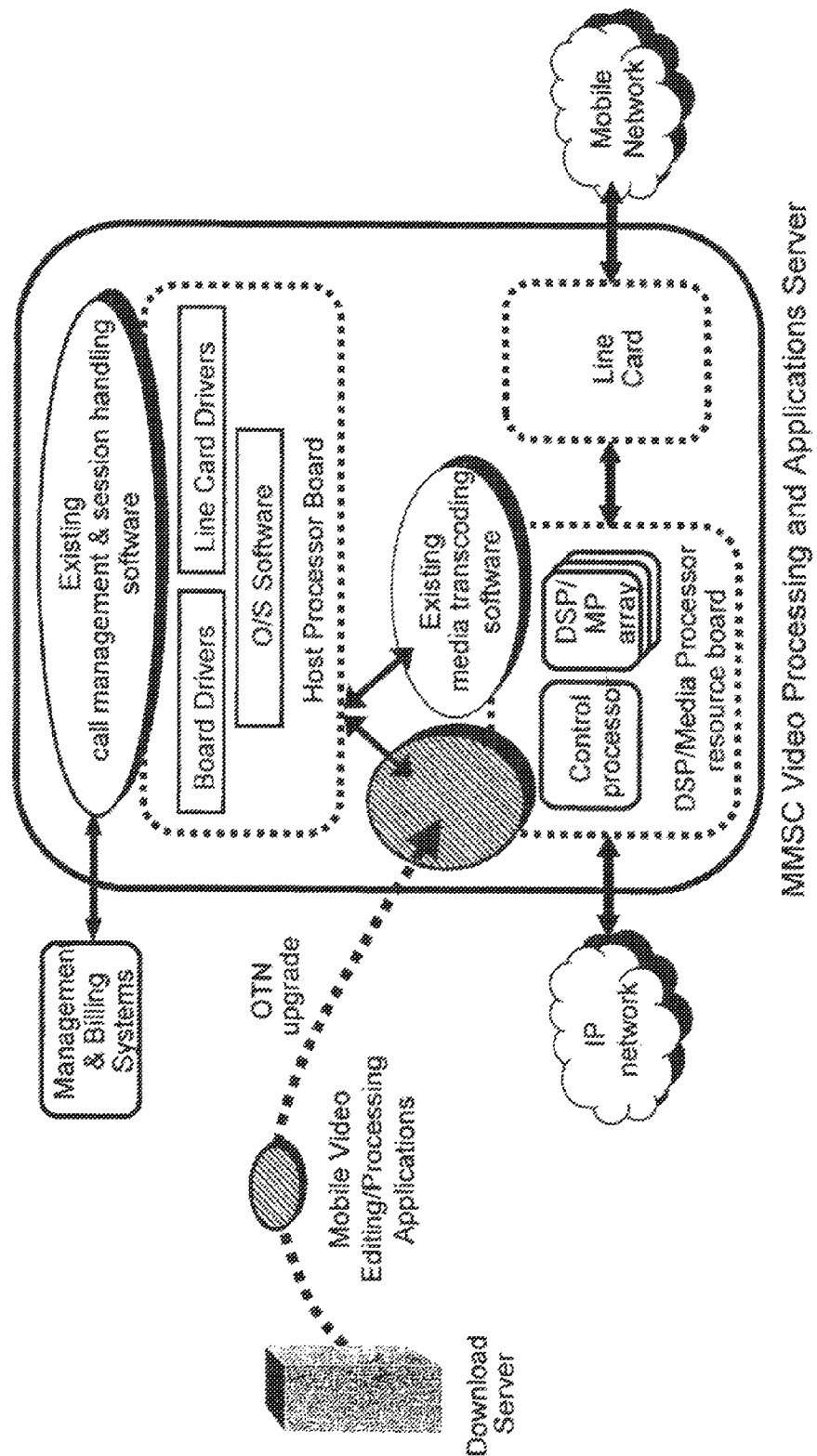
FIG. 19 depicts OTN upgrade of deployed video processing and applications server, according to one embodiment.

According to aspects of the currant disclosure, FIG. 19 depicts OTN upgrade of deployed video processing and applications server.

Figure 20:
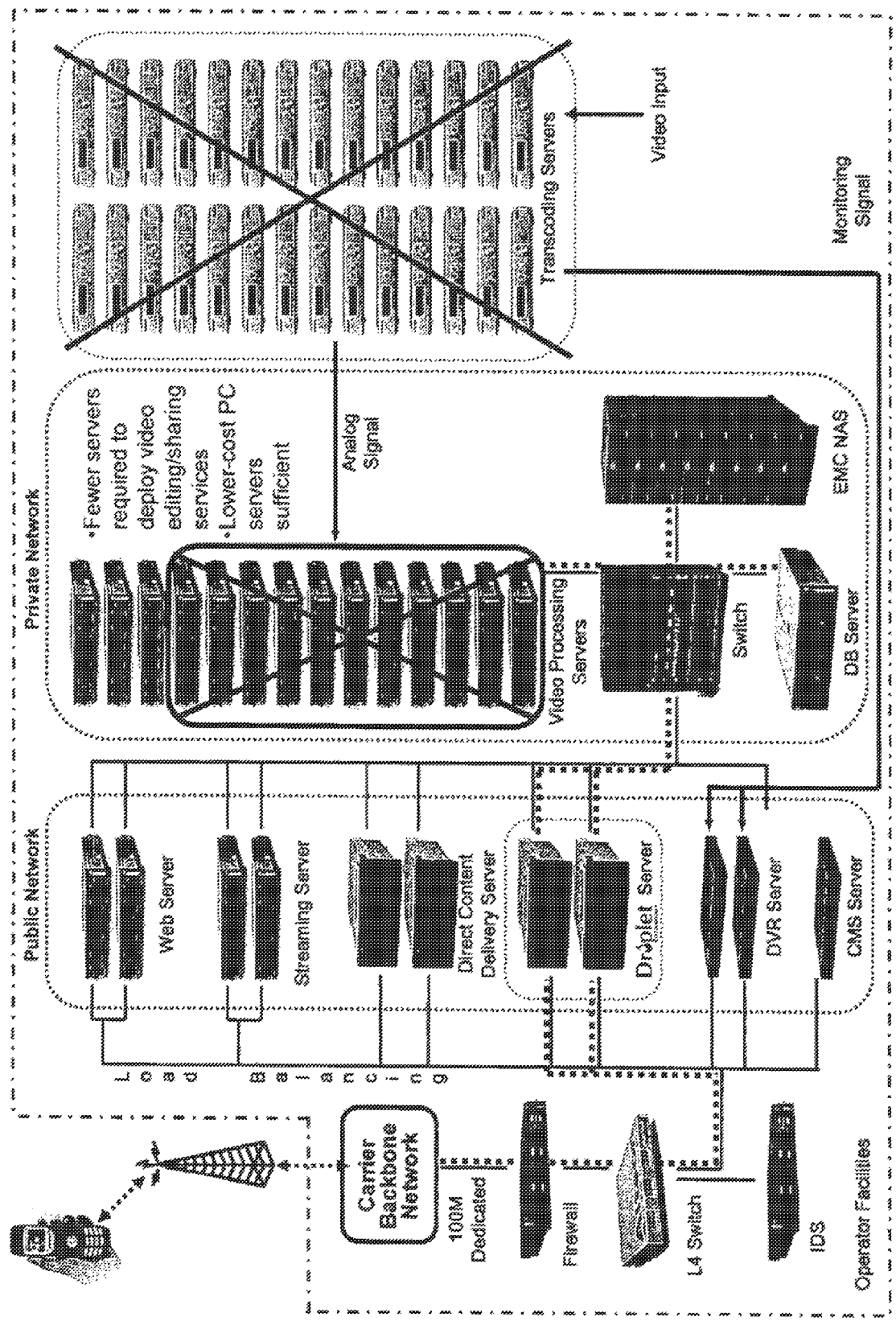
FIG. 20 depicts deduction in complexity, cost, and number of video editing servers required to deploy media producer services, according to one embodiment.

According to one embodiment of the present disclosure, FIG. 20 shows the reduction in complexity, cost, and number of video application servers required to deploy media producer services such as automated or manual editing of user-created video, as well as database storage, search, and retrieval of user-created video.

Figure 21:
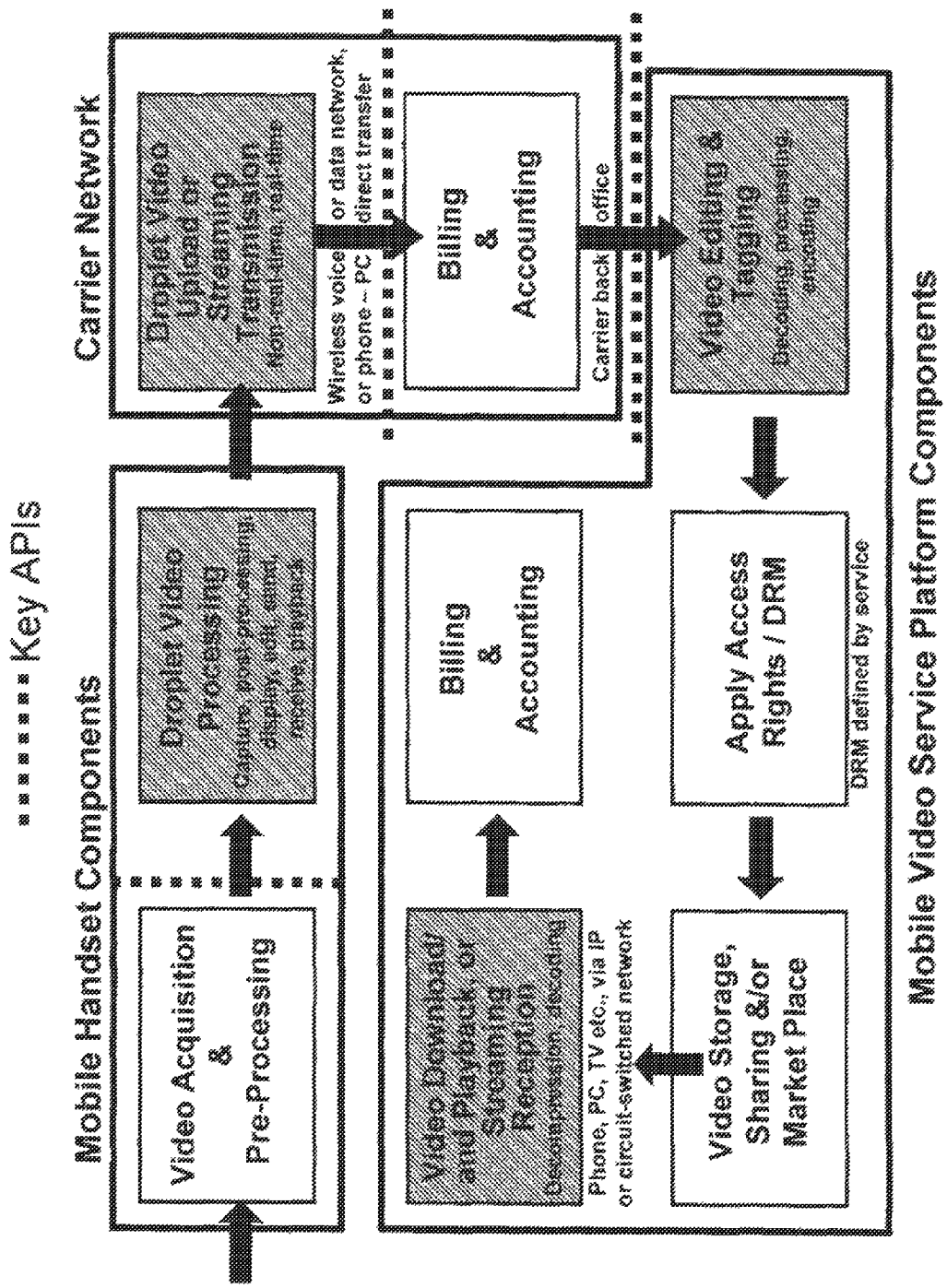
FIG. 21 depicts the functional elements of an improved video messaging/sharing/calling platform, according to one embodiment.

According to one embodiment of the present disclosure, FIG. 21 shows the functional processes of a video messaging/sharing/calling platform incorporating the improved wavelet-based codec/camcorder application, and improved video editing/processing, and database storage, search, and retrieval.

Figure 22:
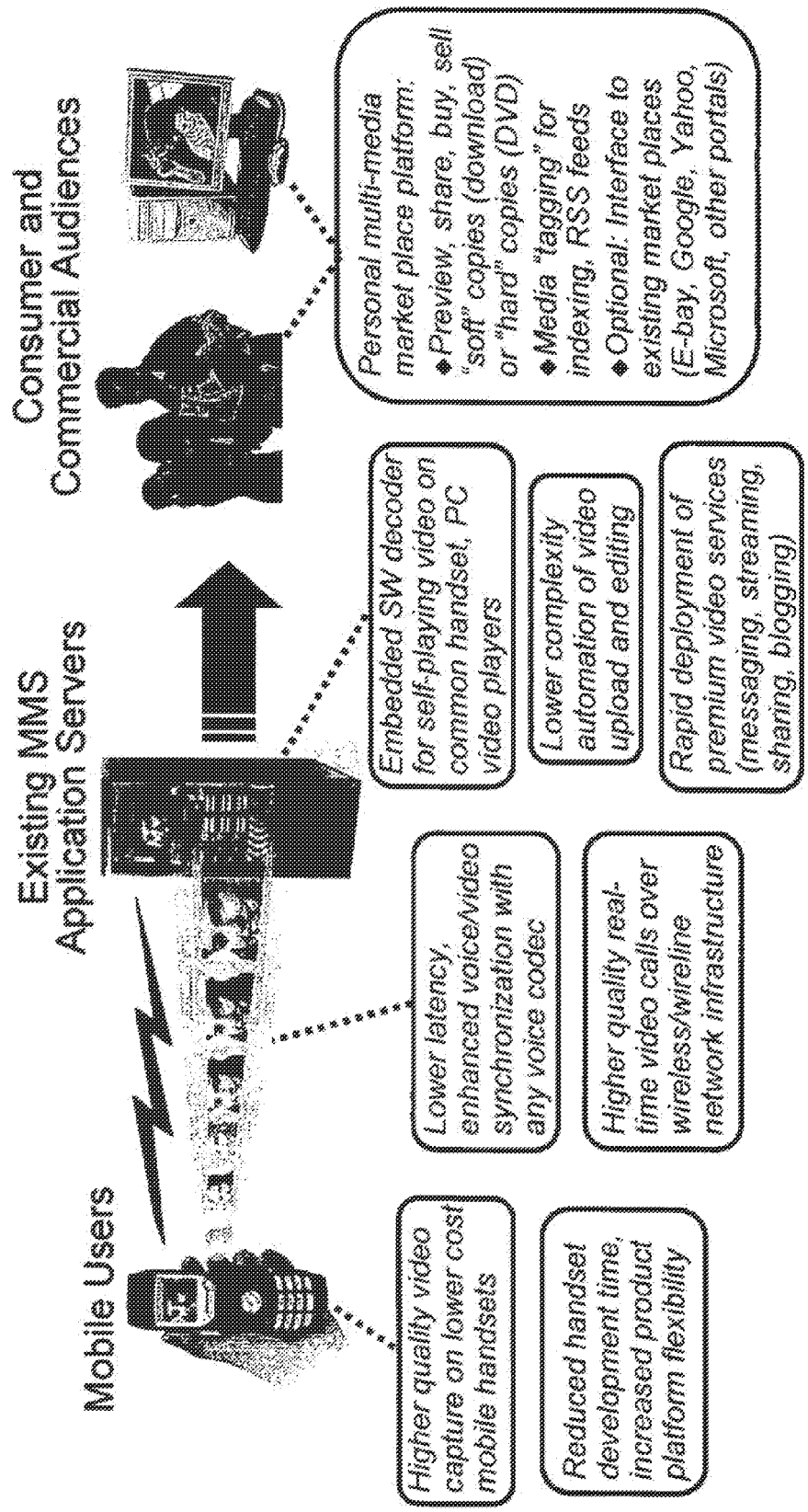
FIG. 22 depicts faster, lower cost development and deployment of higher quality multimedia handsets & services, according to one embodiment.

According to one embodiment of the present disclosure, FIG. 22 shows the benefits in terms of faster, lower cost development and deployment of higher quality multimedia handsets & services, including the ability to deploy an innovative personal multi-media market place platform in which users can preview, share, buy, and sell "soft" copies (download) or "hard" copies (DVD) of user-created audio/video content. The present disclosure also allows for more efficient video "tagging" for database indexing and network (RSS) feeds, and supports interfaces to existing web-based market places such as E-bay, Google, Yahoo, Microsoft, and other portals.

Figure 23:
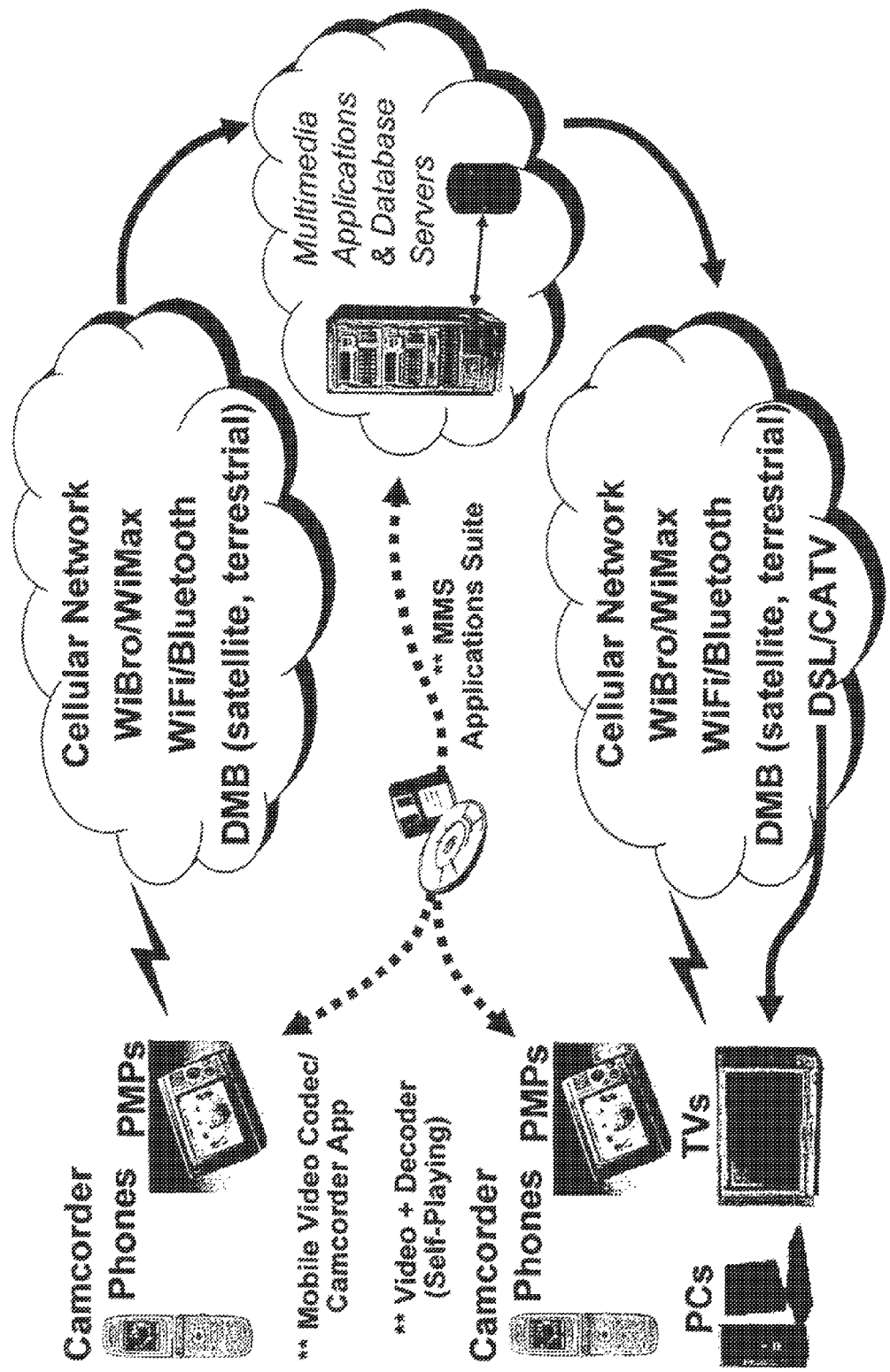
FIG. 23 depicts applications to broadband multimedia devices and services, according to one embodiment.

According to one embodiment of the present disclosure, FIG. 23 shows applications of the above video messaging/sharing/calling platform incorporating the improved wavelet-based codec/camcorder application and improved video editing/processing and database storage, search, and retrieval, to deploy new video services on fixed wireless, mobile wireless, and wireline networks, as well as "converged" networks combining elements of fixed wireless, mobile wireless, and wireline architectures.

The present disclosure, with its wavelet-based mobile video imaging application, handset architecture, and service platform architecture achieves the goal of higher mobile video image quality, lower handset cost and complexity, and reduced service deployment costs, in one embodiment.

The imaging solution of the present disclosure substantially reduces processor costs and requirements in video editing servers. Combined with the ability to install and upgrade the video editing application post-production via OTN download, this SW solution can substantially reduce the complexity, risk, and cost of video messaging and sharing service deployment.

The present disclosure provides mobile operators with the first mobile video messaging and sharing platform that delivers the video qualify and service deployment costs required for mass-market adoption by consumer and enterprise customers. The present disclosure provides a SW camcorder phone application capable of real-time capture of full (VGA)-size images (640×480 pixels) at 30 frames per second (fps), using only a single standard RISC processor already incorporated in the vast majority of multimedia handsets. For mobile carriers, the present disclosure's low-complexity video processing and distribution technologies are integrated into a powerful software platform that enables turnkey deployment using existing mobile handsets and mobile Multimedia Messaging Service (MMS) infrastructure.

Complementing the above SW mobile camcorder application, the present disclosure's content management platform provides earners with modules for integrating compressed images and videos, according to the present technology, together with sounds and text into complete mobile multimedia messages and "ring-tones", along with on-the-fly editing, thumbnail previews, multimedia mailboxes, on-line repository, sharing, and marketing services, and subscription management, according to one embodiment.

A typical video data segment may also typically include or incorporate other types of data. Such other data, may include audio data captured concurrently with the video. It may also include other data including metadata comprising time of capture, location information (derived from CPS, mobile cell tower location, from scene recognition from camera image data, wireless transmitter (e.g., WiFi) identification, etc), user identification, mobile device identification, user added information (including user responses to service queries, including video service queries, titling, naming, later added annotation audio data).

The data may also include metadata derived from the video and audio data being captured or derived from the process of video capture. It may also include metadata derived from additional sensor devices for example jitter data derived from a gyroscope or angular rate sensor. This additional data can be used in various ways in the video editing, storing, search, retrieval, location identification, integration with advertising, video offerings to camera users and other services described in this application.

In one embodiment, video delivery is based on the location of a user. For example, mobile devices (e.g., a cellular phone, a BlackBerry, etc.) may include GPS tracking functionalities thus the location of the mobile device user can be identified for delivering geographic specific video data to the user.

The location based videos can be of scenic tours as determined by the user's location. For example, a tourist in Italy who is unfamiliar with Vienna, may request information specific to Vienna from a mobile device. Streaming video of a live tour may be delivered to the user, for example, upon request, and/or automatically based on user settings. Similarly, video templates that are geographic specific can be suggested and/or provided to users based on an identified geographic location of the user.

Such dynamic template suggestions can be automatically provided or provided upon request based on user settings. For example, if the user is in shooting videos in New York City, templates of for example, the Empire State Building, the Statue of Liberty, etc. may be provided to the user.

In addition, enhancements for videos could be provided based on a geographic location of the user. For example, pre-recorded videos could be provided on demand or automatically, of a current location of a user, for enhancing the videos taken by a user. In one embodiment, targeted advertising could be provided, for example, user data.

The user data can include geographical data, age data, subscription data. User data may be gathered from various sources, such as information provided by the user, billing information, subscription information, real-time gathered information (e.g., call records, geographic location of the user, etc.).

Such user data may be utilized to determine user preferences and hobbies for example to deliver targeted advertisements. In some embodiments, service fee offsets can be provided for advertisements that are viewed.

One or more embodiments of the present disclosure can be embodied in a system, for example, in an exemplary embodiment, a video editing service system (e.g., an automated video editing service system), described below.

Automated Video Editing Service (AVES) System

Figure 24A:
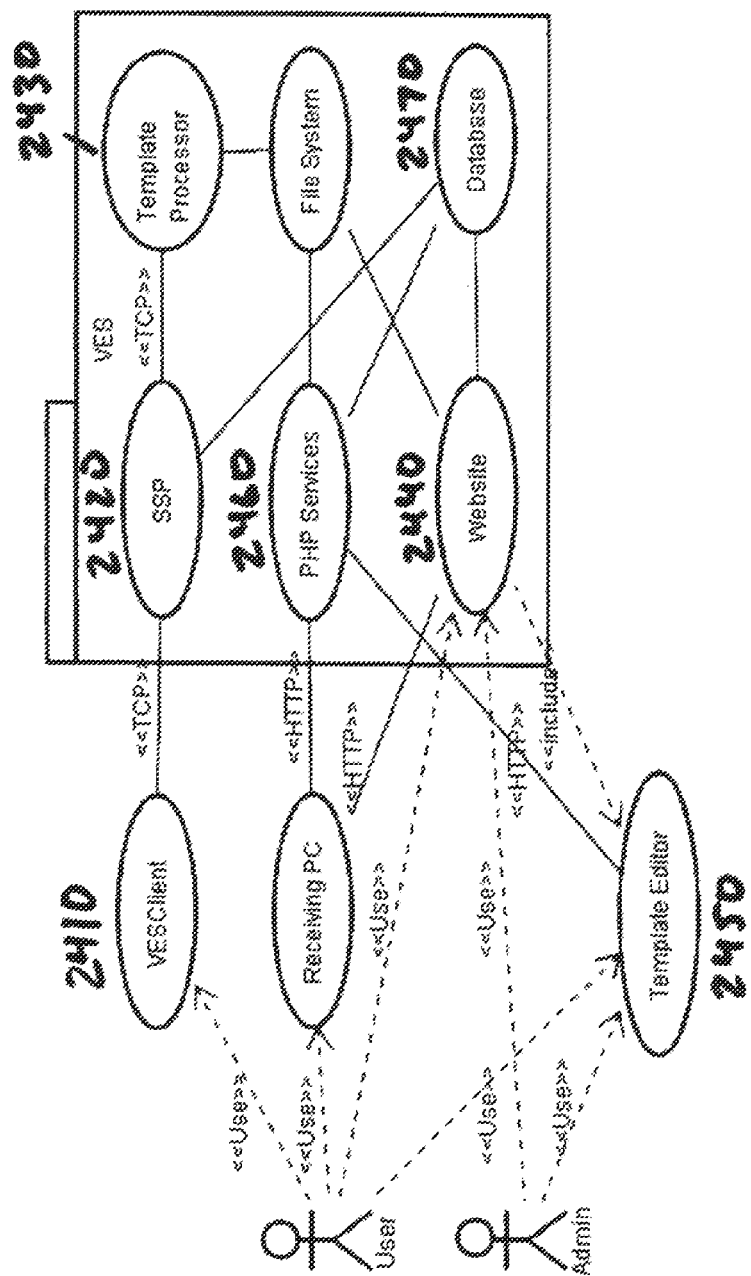
FIG. 24a depicts an example embodiment of a video editing system interacting with a user and a system administrator.

An example of a preferred embodiment of the present disclosure may comprise an automated video editing service (AVES), FIG. 24*a* shows a possible schematic overview of components that may comprise the makeup of AVES, in accordance with the present disclosure.

In one embodiment, the video editing service provides video editing services, in response to a user request, generated for example, via a portable device with video capturing functionalities. The video editing can be provided to multiple users, simultaneously via a routing system, to several video processors.

In one embodiment, a router tracks the operation status of one or more video processors such that new processing tasks are routed to video processors that are not in operation, or routed to a processor that has a smaller queue of tasks. Thus, multiple video processing tasks can be conducted simultaneously.

In one embodiment, the video editing service provides one or more templates to a user via a mobile device. The one or more templates can be pre-stored on the mobile device, in some embodiments, the templates can be downloaded via the mobile device, either for example, based on user request, or automatically based on user settings, etc. In some embodiments, the templates can be provided based on user-specific data, the data can be collected via one of many processes, such as, for example, GPS functionalities, triangulate data obtained via towers, user subscription data, etc. In one embodiment, the templates are provided to users for a fee.

A request for video edit may include a video clip and a template, as chosen by the user. The video may be clipped by the user prior to sending the request. Upon receiving the request for video edit, the video server processes the request and performs the edits specified by the user. The edits may comprise using the video edits associated with the template chosen by the user.

At least a portion of the edited video can be sent back to the user such that real-time reviewing of the edits is facilitated. Upon user indication of approval of edits, the full length version of the edited video can be sent back to the mobile device. In one embodiment, the edited video can be sent to multiple recipients to be received via a mobile device, at the request of the user. In some embodiments, the edited video can be offered to multiple users, based on user settings, for example, to receive videos of relating to videos of a particular subject matter.

With reference to FIG. 24a, AVES may comprise a Video Editing Service Client (VESClient) 2410. The VESClient may comprise a mobile application that may run on any designated mobile operating system. Preferably, the VESClient may comprise an application that interfaces the AVES to send and edit video that is encoded, in accordance with an embodiment of this invention, the VESClient may connect with AVES via WiFi. If should be noted that any known method or any other method developed in the future may be used to connect the VESClient with AVES.

The VESClient may comprise many features. The features comprise, but are not limited to, one or more of, a title screen (which may comprise options such as, for example, sent/edit video, My Friends, My Studio, My Videos), ability to select one or more videos, support AVI containers with MP3 or WMA audio tracks, ability to trim (i.e., crop a video to a certain length) video, ability to preview trimmed (i.e., cropped) video, ability to redo trimming, ability to title video, show activated templates, splice multiple videos together, send video and/or audio sequences to AVES, preview edited video resultant file (in some embodiments, this preview may start, within 10 seconds of video upload commencement), display recipient list based on users contacts (which may be managed through a website), functions to receive input of an intended recipient's phone number and/or email address directly, and show a summary of the last N videos sent from VESClient to AVIS (where N can be any integer). In one embodiment, a wavelet codec (e.g., a 3D wavelet codec) can be used for video compression.

Figure 24B:
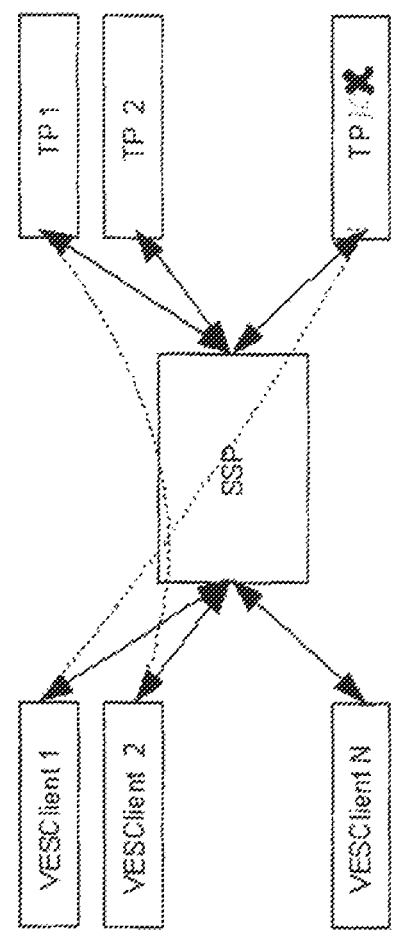
FIG. 24b depicts an example embodiment of a VESClient to communicate with the TIP via an SSP.

In one embodiment, the AVES includes one or more Services Switch Points (SSP) 2420. FIG. 24b depicts an exemplary embodiment of the SSP in connection with N VESClients and X TPs (where N and X are integers that may or may not be equal to one another). The SSP may comprise a switch that handles incoming client connections and assigns them to a Template Processor that is available for video editing. The SSP may perform load balancing and may be able to form a distributed network in order to scale the number of concurrent VESClients that can be connected at any time, to the template processor or an array of template processors, for example.

The SSP may compose many features. The features may comprise, but are not limited to one or more of, processing one or more VESClients and one or more Template Processors connections to one or more SSP. The SSP can be configured by specifying parameter values in a configuration file.

In one embodiment, the system can accept a user login and determine if the login is legal in the AVES database. In one embodiment, the system can determine if there is an available Template Processor to process a VESClient edit request. In one embodiment, the system can communicate a busy status to a VESClient based on a determined Template Processor status. In one embodiment, the system may be able to get contacts and/or template information from the AVES database and send this information to VESClient. In one embodiment, the system receives editing requests from VESClient and stores this information into a database. In one embodiment, the system is further able to merge template and editing information, and to receive data chunks from VESClient and forward the data chunks to a Template Processor.

In one embodiment, the system may be able to obtain a summary of a predetermined number of videos (e.g., the last 10 videos) uploaded by this user from the AVES database and send this information to the VESClient, the system may further be able to receive a preview request from VESClient and forward the request to a Template Processor, can receive a data stream (e.g. AVI data stream) for preview from Template Processor and forward to VESClient, the system may further receive a preview 'skip' from VESClient and notify Template Processor. In one embodiment, the system may further receive preview 'cancel' from VESClient and notify the Template Processor.

In one embodiment, the system may be able to scan the AVES database to identify new scheduled jobs, for example, to manage the Template Processor processes (e.g. launching or destroying) In one embodiment, the system may be able to send new video notifications to recipients after the video is edited.

The AVES may also comprise one or more Template Processors (TP) 2430. The TP may receive editing requests from the SSP. For example, editing requests may be sent to the TP for processing and the TP may also provide a scaled down preview version of the video for streaming back to the VESClient in real-time as the edited video is being composed. In one embodiment, the TP may further be able to monitor the disk usage of each user to prevent users from consuming too much storage.

The TP may comprise a software system particularly configured to accomplish the, or a part of the, video editing processes of the AVES. A plurality of discrete TPs may simultaneously operate on the same hardware platform and share the same processor or set of processors. The TPs may be configured in an array so that the SSP can direct VESClient needs to one of the available TPs. Thus, this architecture is highly scalable and can be built using relatively low cost generic platforms (i.e., not custom video editing hardware platforms) that have the plurality of software TP engines available on each platform. Each hardware platform may have its own SSP or, in some embodiments, an SSP on one hardware platform can functionally operate with TPs on different hardware platforms.

The TP may comprise many features. The features may compose but are not limited to, one or more of, receiving editing information from SSP (e.g., the editing information may contain the XML description of a video editing template, in addition to other meta data used to generate the edited video), parsing editing information in order to determine how to compose the resultant video.

In an embodiment of the present disclosure, the uploaded data stream can be received (which may be AVI) from SSP, In one embodiment, the original raw data file can be stored for uploaded videos. In addition video and audio from an AVI file may be de-multiplexed. Additional embodiments may include receiving edited video and audio (the TP may be directed by information contained in the associated template), and re-multiplexing the edited video and audio on the server, and/or storing the edited data as an AVI file.

One embodiment further comprises one or more of the ability to splice videos into the beginning or end of uploaded feeds, to splice multiple videos together, to center or stretch-to-fit still pictures which have a different resolution than the target edited video, to mix audio tracks, to produce some transition effects between video segments according to the selected template or by analyzing scene transitions (the transition effects may comprise wipe, cross-fade, dissolve, fly, magnify, blinds, checker, and appear, among other possibilities), to convert, the video segments to black & white or sepia, to add a time stamp, date stamp, and/or location stamp to the video, to create a slide show from the edited video, to produce a preview AVI stream (the video may comprise a reduced frame size and reduced frame rate).

Embodiments of the present disclosure further comprise one or more of the ability to, receive 'Preview' request from SSP and then send back a preview video data stream, to receive 'Preview skip' request from SSP and then stop producing the preview stream, to merge several media objects into an AVI according to which template the user has selected, to apply video and audio effects (which may be based on the user selected template), to apply color morphing on video segments, to apply a black and white transform on video segments, to support animation and background overlays for video segments, and/or may be able to insert text captions for video segments.

The AVES may also comprise a website 2440. The website may be used by users to see a list of their videos. For example, the videos may be created by the user or sent to the user by other users. The website may also be used to by users to edit contact information, activate templates, and activate media. In one embodiment, the website may also provide the user with one or more of the ability to invite friends to view videos, to launch the template editor, to activate audio tracks, to display videos by locations, to display a list of videos uploaded by or sent to the user, purchase new templates, and allow user to maintain the contact list. It should be noted that this is not an exhaustive list of features available to user via the website. Other features can be included.

The AVES may also comprise a template editor (TE) 2450. In one embodiment, the TE is a tool used to create custom templates. The template editor may be Flashed based and run in the user's browser. In one embodiment, the TE may interact with AVES over the internet, or any other type of network, such as a LAN, WAN.

In some embodiments, the TE may further provide one or more user services, such as: create a template that may combine video segments comprising transition components, background music, and/or still pictures; add media into the template; insert transitions between two video segments; mix audio tracks; preview pictures, audio tracks, and/or video elements; set properties on pictures (such as, for example, if the pictures need to be centered or stretch-to-fit); set the duration for showing still pictures and transitions; insert video slots into the template; upload the produced templates to the AVES; preview how templates would work; set properties for each video and audio element; set the properties for video segments, for example: color morphing, animation, background overlays, and/or text captions; set the weight of an audio track relative to other tracks it overlays; and show the user's activated templates.

The AVES may also comprise PHP Services 2460, which may comprise a set of PHP tries used by the Website and/or the TE to allow access to the AVES database. These PHP files may also provide supped for the Receiving PC Application to get notifications about when a new video has become available.

The AVES may also comprise a Receiving PC Application (ReceivingApp). The Receiving PC application may be an application that periodically polls the servers to see if a user has new videos sent to them. It may be set up to require a user id and password to login. It may also be able to be used to launch the website when new videos arrive, and it may also be able to defect if the wavelet codec (e.g., 3D wavelet codec) is installed. In addition, if the codec is not present, the Receiving PC may install the codec if it is not present. The codec may be obtained from the server.

The AVES may also compose a Database 2470. The AVES database may be configured to hold information about, among other items, user accounts, uploaded videos, edited videos, media, templates, and scheduled jobs from the TE. It should be noted that the Database may be configured to stem any information desired.

Example of AVES Setup

This example illustrates an example of the architectural setup and usage patterns of an exemplary embodiment of the present invention.

VESClient

1. VESClient gets server information from a local config file and uses this information to connect to the AVES. Preferably, the user should not have to configure the server IP address information, as this may be handled automatically.

2. If the user logs into AVES for the first time, he/she has to input his/her cell phone number. Later the VESClient can use this stored number to login automatically.

3. Login is successful if the cell phone number is known to AVES.

4. After logging into AVES, AVES will return back a template list and recipient list to the VESClient.

5. The user may select an activated template from the template list, select some videos in local system, and has the option to trim some of them. (Trimming operations may be implemented in another sub-window, in which the user can set the start point and end point of the selected video, and the video will be trimmed using the two selected points.) The user can trim the selected video repeatedly until user is satisfied.

6. For a given template, the user may select an equal number of videos as the number of slots in the template. There will be an indicator in brackets to suggest how many clips a slot should contain.

7. The user may also provide a title for the video before uploading.

8. The VESClient may upload selected trimmed videos to the AVES.

9. The user may preview the edited video while upload is occurring. The user may also cancel the preview directly or skip the preview.

10. After uploading is finished or if the user skips previewing, the user may decide who will receive the edited video by selecting contacts from their contact list. The user may also manage their contacts from the phone.

11. After sending the edited video to receivers, VESClient may present the last 10 videos uploaded by this user.

12. The user may return to the Home screen within the VESClient.

SSP (Services Switch Point)

For VESClient

1. VESClient connects to the SSP and sends its cell phone number. SSP may check to see if the cell phone number exists in the database.

2. If the number does not exist, the user will be informed that they need to signup for an account.

3. After logging in, SSP may retrieve the user's list of templates and contact information from the AVES database and send them to the VESClient.

4. SSP may then receive editing information from the VESClient.

5. SSP may retrieve the details for the selected template from the AVES database. SSP may then merge the template and the editing information and save this editing information info the AVES database.

6. SSP may then send the merged information to the corresponding TP.

7. SSP then may receive an incoming data stream from VESClient and forward the data directly to a TP.

8. SSP may receive a request for preview from VESClient. The SSP may then tell the corresponding TP to send back a video data stream.

9. SSP then may receive the video data stream from TP and forward it to VESClient.

10. TP may notify SSP when it has finished the editing process. SSP may tell VESClient that the editing process has finished and annotate the database.

11. SSP may receive title and recipient information from VESClient, and stores this information into the database.

12. SSP may receive a request for history from VESClient, and then may return the last 10 videos created by the corresponding user.

13. After entire process has finished, SSP may clean all relative information in AVES (such as temporary video files and database entries used during the editing process.)

For TE

1. SSP may check the scheduled "Try it now" job table regularly.

2. If there are jobs waiting, SSP may check if there is an available TP for the job. If there is not an available TP, the job may be held until there is an available TP.

3. SSP may read information about the job and retrieve the newly created template from the database. SSP may then merge the template and job meta-data.

4. SSP may send the merged job information to TP.

5. After the TP completes the process, the TP may notify SSP. SSP may then notify the Website that the process has been completed by updating the database.

6. After entire process has finished, SSP may clean all relative information in AVES.

TP (Template Processor)

1. TP may receive the merged template and parse it.

2. TP may receive the uploaded video data stream and store it as an original file.

3. TP may edit the data stream according to the parsed template.

4. TP may save the result as an edited file.

5. TP may produce a video for preview (the preview will be stored in memory).

6. TP may receive a preview request and then send the preview stream back to SSP.

7. If the TP receives a request to skip preview, then TP may stop producing the preview data stream and delete all preview chunks in memory.

8. After TP has finished, TP may notify SSP.

Website

The website may have different options depending on whether the site is being accessed by an user or administrator. The website may have the ability to login and logout out both a user and administrator.

For a user the website may offer the ability to register, manage contacts, manage video (for example, see sent videos, received videos, uploaded videos, etc.), manage media (for example, view music, purchase music, view background images, purchase background images, view templates, purchase templates, etc.), and create new templates.

For an administrator the website may offer the ability to manage media (for example, create music, delete music, create background images, delete background images, etc.), and manage templates (for example, create and delete templates).

TE (Template Editor)

1. User may launch TE from the website.

2. User may add still pictures, videos, transitions, etc. to the time line.

3. User may set background music (and its duration) to video slots in the time line.

4. After the user finishes editing the template, the user may upload the template to AVES.

5. After uploading the template, the user may preview the effect by clicking 'Try it now'.

6. 'Try it now' may instruct the met to select videos already uploaded to AVES for each of the template's empty slots.

7. 'When a Try it now' job has been completed, the user may watch the final result from the Website.

ReceivingApp

1. ReceivingApp may be launched when Windows starts.

2. A login dialog box may pop up when ReceivingApp launches (this may only occur the first time, after that the user login information may be cached).

3. The user enters their Droplet Id and Password to login.

4. ReceivingApp then connects to the Website.

5. ReceivingApp may periodically check to see if there are some edited videos for current user.

6. If there are some edited videos for current user, ReceivingApp may pop up a balloon notification.

7. If the user clicks on the balloon, the Website may be launched.

8. The user can right click on the ReceivingApp icon in the status bar of Windows to open the Website.

Connections

As a distributed system, AVES components may be connected in two ways; one is based on TCP, and the other is based on HTTP.

VESClient & SSP

The connections between the VESClient and SSP may be socket and TCP based. There may be two connections between any VESClient and SSP. One connection is for commands, which may be based on a private binary protocol. The other connection is for the preview data stream.

SSP & TP

The connections between SSP and TP may be socket and TCP based. There may be two connections between the SSP and any given TP. One connection is for sending messages from the SSP to the TP. The other connection is for receiving the preview data stream from TP to SSP. These messages may be based on a private binary protocol.

TE & PHP Services

The connections between TE and PHP Services may be HTTP based. These connections may be based on private HTTP protocols.

ReceivingApp & PHP Services

The connections between the ReceivingApp and PHP Services may be HTTP based. These connections may be based on private HTTP protocols.

Login and Upload Process

Figure 25:
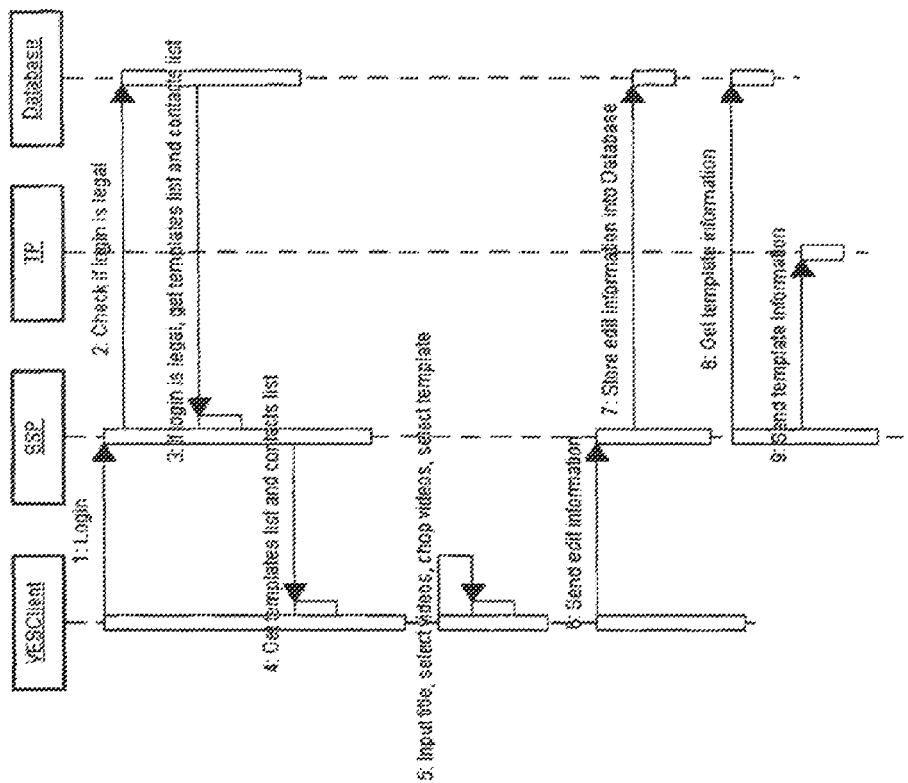
FIG. 25 depicts an example embodiment of a process flow of a VESClient to communicate with the TIP via an SSP.

With reference to FIG. 25, the following is an example of a workflow of an exemplary embodiment of the present invention as it relates to the login and upload processes of the AVES.

1. VESClient sends login message with cell phone number to SSP.
2. SSP checks database to see if there is a record that matches the cell phone number.
3. SSP checks if there is an available TP for the VESClient.
4. Login successfully occurs if the cell phone number is matched end there is an available TP. Then SSP gets template and contact information from the database.
5. SSP returns template and contact information back to VESClient.
6. User may select template, select videos, and trim selected videos.
7. VESClient sends edit information to SSP.
8. SSP gets the corresponding template details for the request from the database, merges the template with the editing information, and saves the editing information into database.
9. SSP sends merged template to TP.

Uploading and Preview

Figure 26:
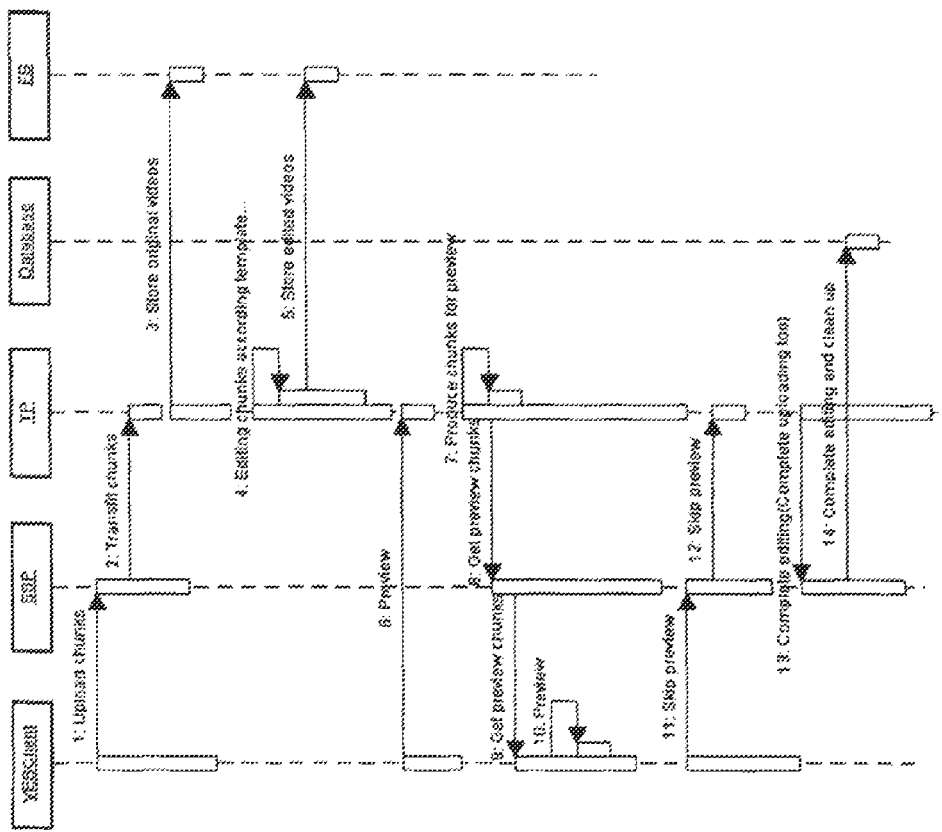
FIG. 26 depicts an example embodiment of another process flow of a VESClient to communicate with the TIP via an SSP.

With reference to FIG. 26, the following is an example of a workflow of an exemplary embodiment of the present invention as it relates to the uploading and preview processes of the AVES.

1. SSP sends received video chunks to TP.
2. TP stores these chunks as original video flies.
3. TP edits these chunks according to the corresponding template.
4. TP stores edited chunks as edited video flies.
5. TP produces chunks for preview.
6. User may decide when preview will start. SSP receives preview request from User and then communicates to TP to begin the preview.
7. TP transmits preview chunks to SSP.
8. SSP transmits preview chunks to VESClient.
9. VESClient displays these chunks as a video within Windows Media Player.
10. User may skip the preview or wait for it to end.
11. If the user skips the preview, SSP tells TP to stop preview.
12. After complete editing, TP tells SSP editing is finished.
13. SSP stores necessary information into database, and cleans up the database.

After Uploading

Figure 27:
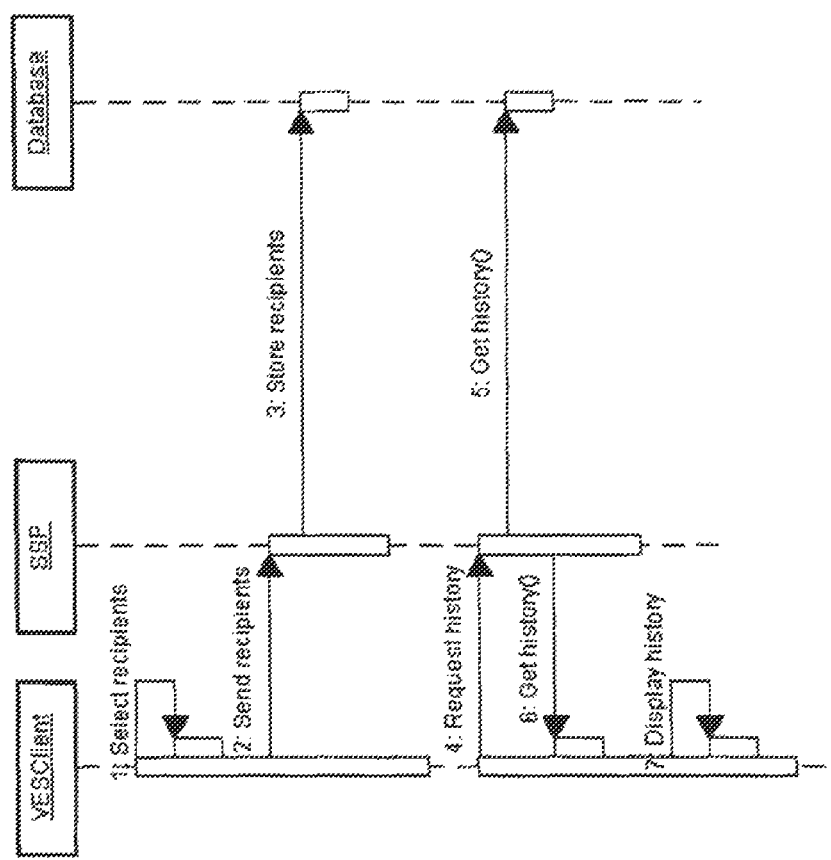
FIG. 27 depicts an example embodiment of a process flow of a VESClient to communicate with a database via an SSP.

With reference to FIG. 27, the following is an example of a workflow of an exemplary embodiment of the present invention as it relates to processes of the AVES that occur after uploading.

1. User may select recipients that will receive the edited video.
2. VESClient sends selected title and recipients to SSP.
3. SSP stores these recipients into the database.
4. VESClient requests history of last 10 files uploaded.
5. SSP gets history from database.
6. SSP returns history back to VESClient.
7. VESClient displays history.

Receiving

Figure 28:
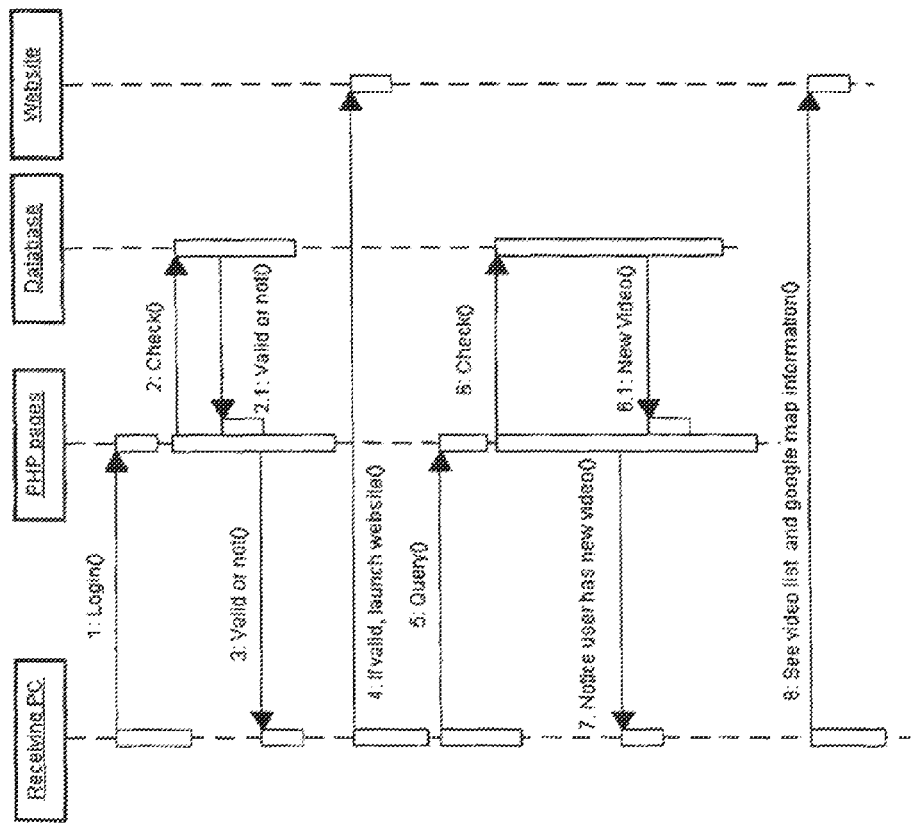
FIG. 28 depicts an example embodiment of a process flow of a receiving PC to communicate with a website.

With reference to FIG. 28, the following is an example of a workflow of an exemplary embodiment of the present invention as it relates to the receiving process of the AVES.

1. Login dialog box pops up when Receiving Application launches.
2. The user enters id and password to login.
3. The Receiving Application queries the PHP pages.
4. PHP pages check the database to see if there is any video sent to the user.
5. If login is successful, Website will be launched.
6. If there is a new video sent to user, an indicator will pop up.
7. The user can click on the indicator to go to the website.
8. In the website the user can see the video list or a map with the available videos.
9. User may also click the application on the computer desktop to go to the website.

Login, Edit, & Upload of Templates

Figure 29:
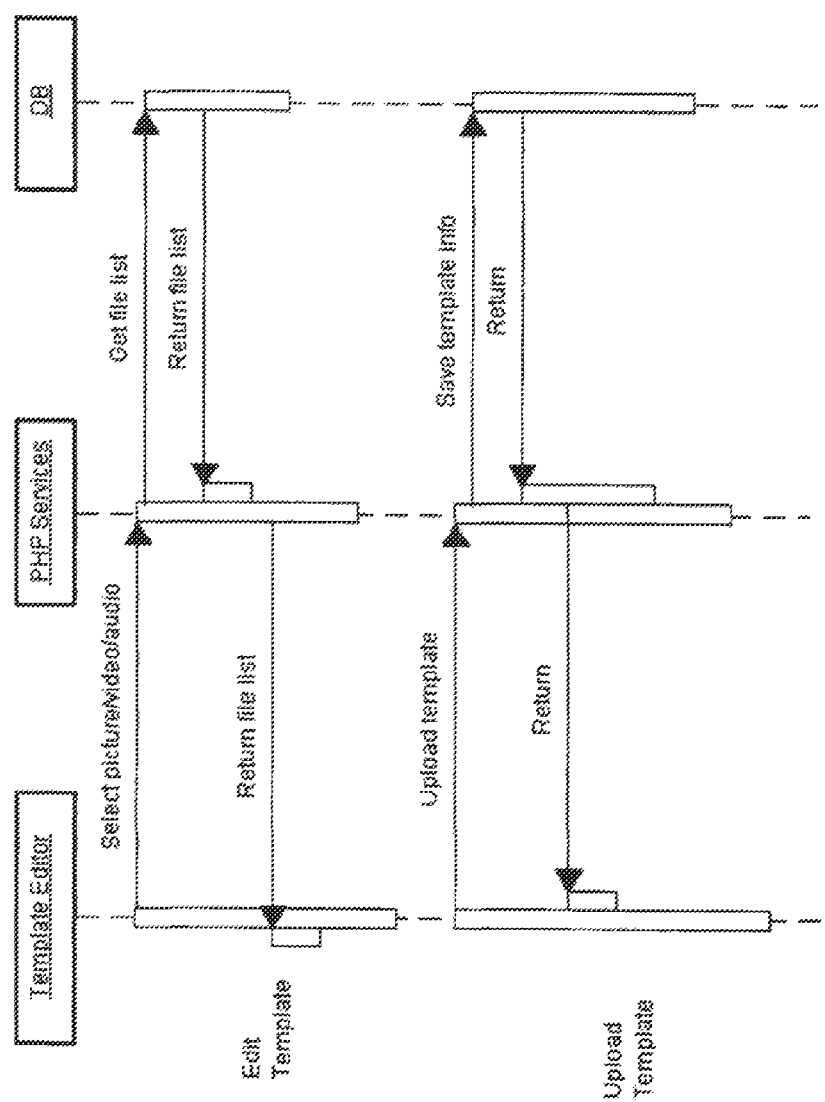
FIG. 29 depicts an example embodiment of a process flow of a template editor.

With reference to FIG. 29, the following is an example of a workflow of an exemplary embodiment of the present invention as it relates to the processes of logging in, editing, and uploading templates of the AVES.

Edit

1. When the user is creating templates, they can insert media elements into the templates. These elements may include a title, still pictures, videos, audio tracks, transition effects, etc.
2. When the user wants to specify media resources (e.g. picture files) for elements, TE will send a request to the PHP Services for the available resource list.
3. PHP Services receives the request and queries the database to find available resources. PHP Services then sends this list back list to TE.
4. The user can select resources from this list.

Upload Templates

1. After the user finishes creating a template, they may click the "Upload" button to upload the template.
2. An uploading request will be sent to PHP Services.
3. PHP Services receives the template script and records the template script into the database.

Try It Now

Figure 30:
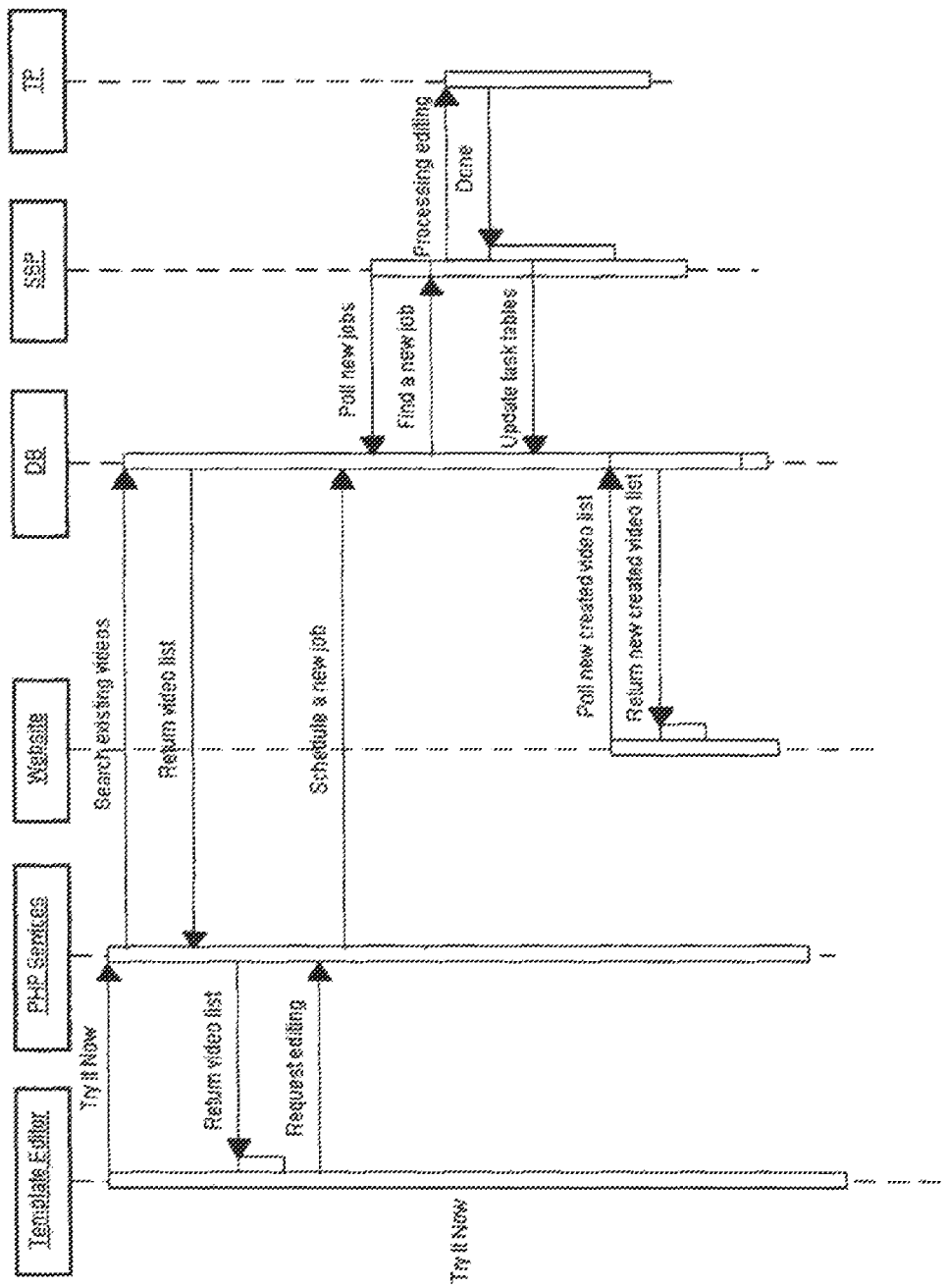
FIG. 30 depicts an example embodiment of another process flow of a template editor.

With reference to FIG. 30, the following is an example of a workflow of an exemplary embodiment of the present invention as it relates to the Try It Now function for templates of the AVES.

1. The user may try out a newly created template by clicking the "Try It Now" button.
2. A request is sent to the PHP Service to query for the available videos which are on the server. The PHP Service returns the video information list to TE.
3. A pop-up window lists these videos. The user selects the appropriate number of videos files from the list for the slots in template.
4. TE submits an editing request to PHP Service.
5. PHP Service schedules a new job by adding this job to database.
6. SSP polls the database regularly to check whether there are newly scheduled jobs. If it finds a newly scheduled job, it will look for an available TP to execute it. If an available TP is found, this TP will process the job, otherwise, TE will have to wait until a TP is available. After TP finishes processing, SSP may remove this new job and add a new record to the results table.
7. The user may determine when the video is available by checking the video list on the webpage.
8. After the editing process is completed, the user may click the corresponding link for the edited video in the video list page. This will cause the preview to be launched.

Example of User Experience

With reference to FIGS. 31-55, this example illustrates an example of a user's experience with a preferred embodiment of the present invention.

Figure 31:
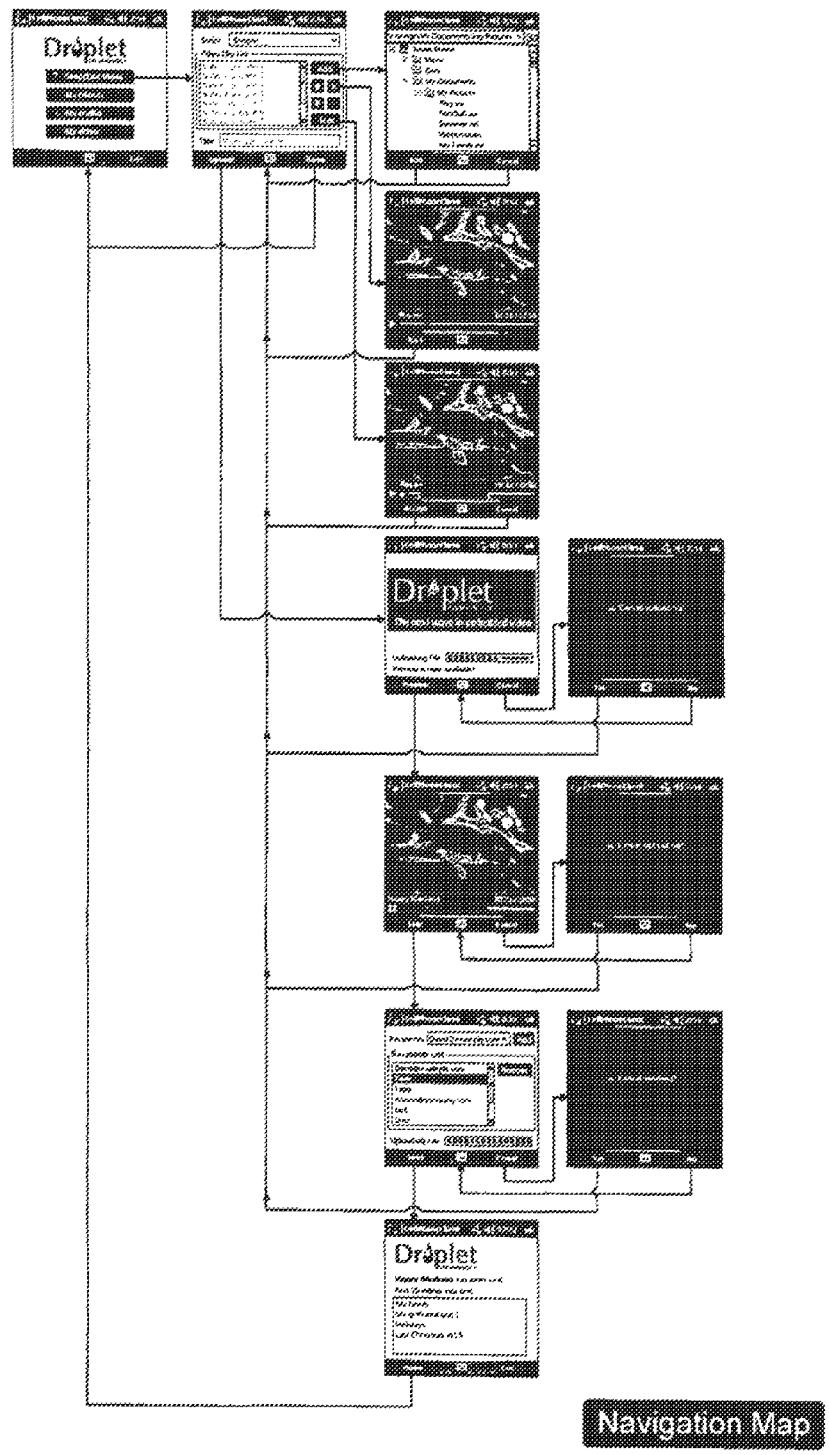
FIG. 31 depicts an example embodiment of a screenshot.

FIG. 31 illustrates an example of a user navigation map in accordance with an embodiment of the present invention.

Figure 32:
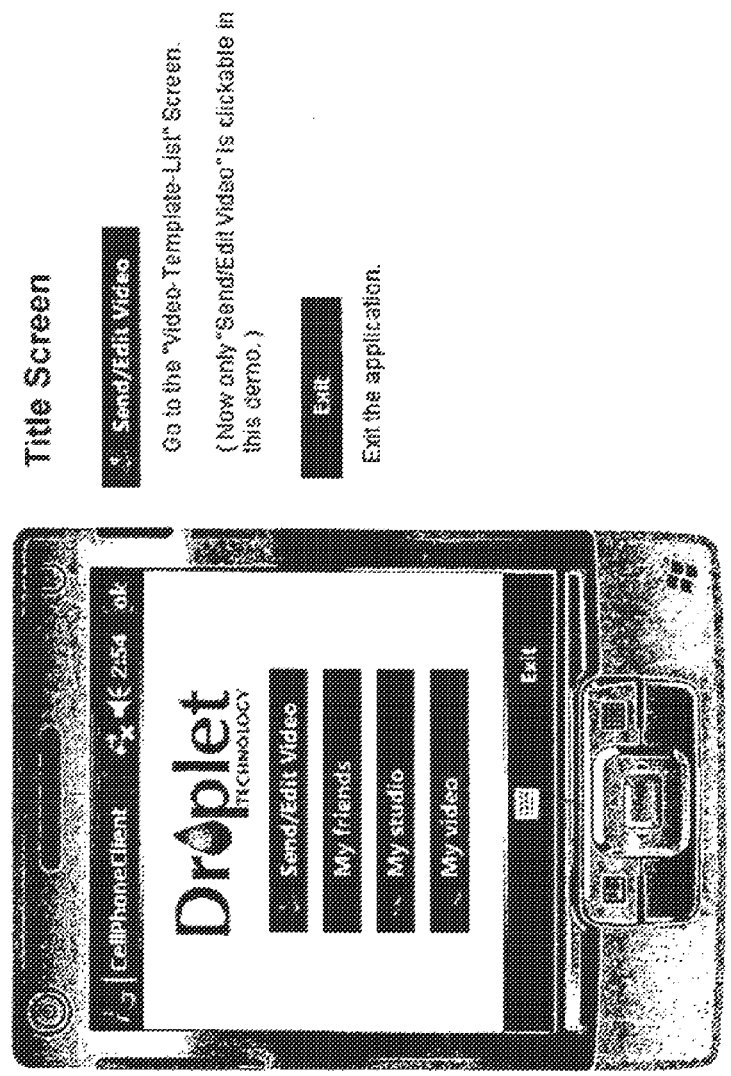
FIG. 32 depicts an example embodiment of a screenshot.

FIG. 32 depicts an example of a title screen or home page of the VESClient. In the embodiment depicted in FIG. 32, the home screen has 4 buttons: Send/Edit Video, My friends, My studio, and My videos.

Figure 33B:
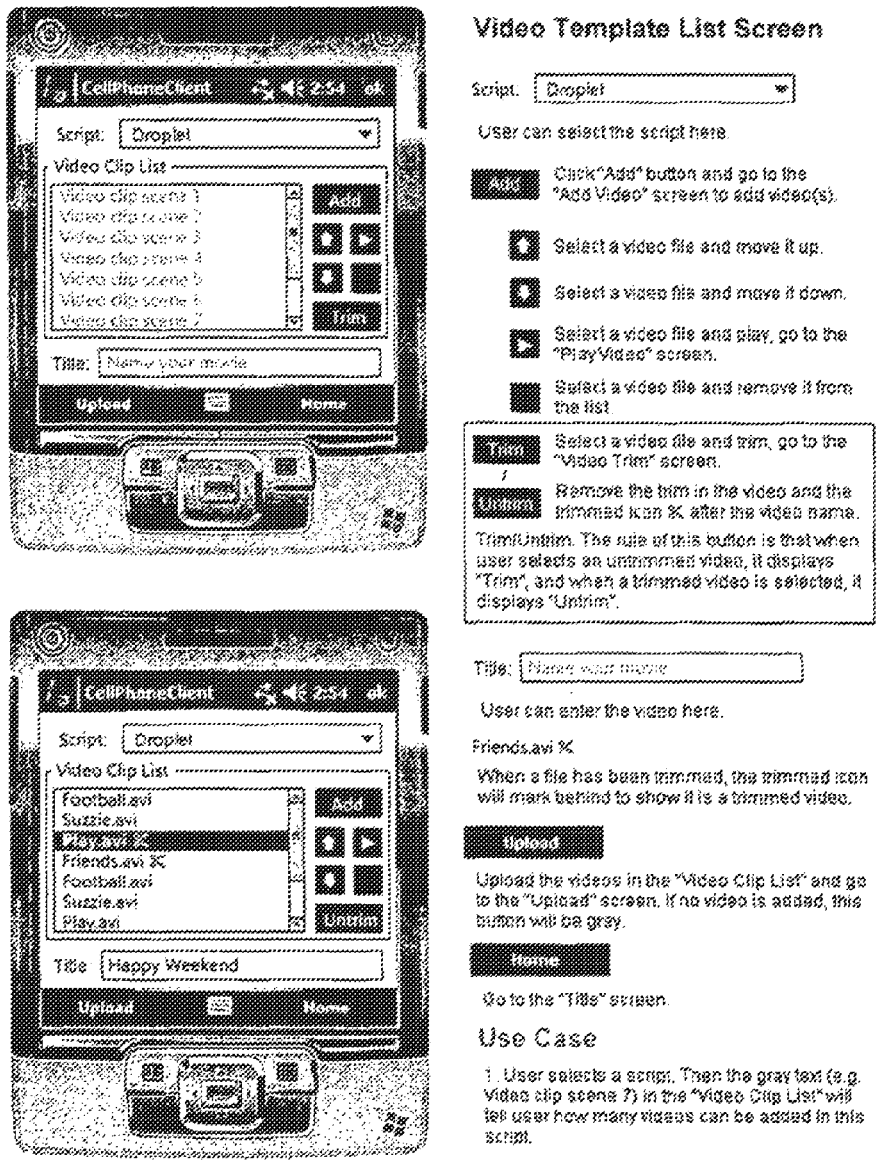
FIG. 33b depicts an example embodiment of a screenshot.

Clicking on the Send/Edit Video button guides the user to the "Video-Template Select" Page, an example of which is depicted in FIGS. 33a and 33b. This page may allow a user to select videos and a template. Possible descriptions of the buttons depicted in FIGS. 33a and 33b are as follows:

Script: Select a script to use.
Video List: List all the selected videos.
Add: Add a video to the list.
Title: Add a title tor the video.
Up: Move up one position.
Down: Move down one position.
Remove: Remove a video from the "Video List".
Trim Button: Starts the Video Trim screen to trim the selected video. A trimmed video has a trim icon next to it.
Untrim Button: Reset the frame pointer to begin at 0 and end at the last frame.
Play: Preview the video.

Possible scenarios from the screen depicted in FIGS. 33a and 33b are illustrated as follows:

1. User may select a script.
2. User may click file "Add" button to add a video.
3. User may set the order of selected videos. (The user may select a video from the "Video List" and then click the "Up" button to move up a position. The user may also select a video from the "Video List" and then click the "Down" button to move down a position.)
4. User may select a video from the "Video List" and then click the "Remove" button to remove the video out of the "Video List".
5. User may select a video from the "Video List" and then click the "Trim" button to pop up the "Video Trim" Page in order to trim the video.
6. User may select a trimmed video from the "Video List" and then click the "Untrim" button to cancel the trim.
7. User may select a video from the "Video List" and then click the "Preview" button to preview the video.
8. User may select a template from the "Template" drop down list.
9. User may return to the VESClient Home screen by clicking the "Home" menu.
10. After selecting videos and a template, the user may click the "Upload" menu item. This will take the user to the "Preview" page.

Figure 34:
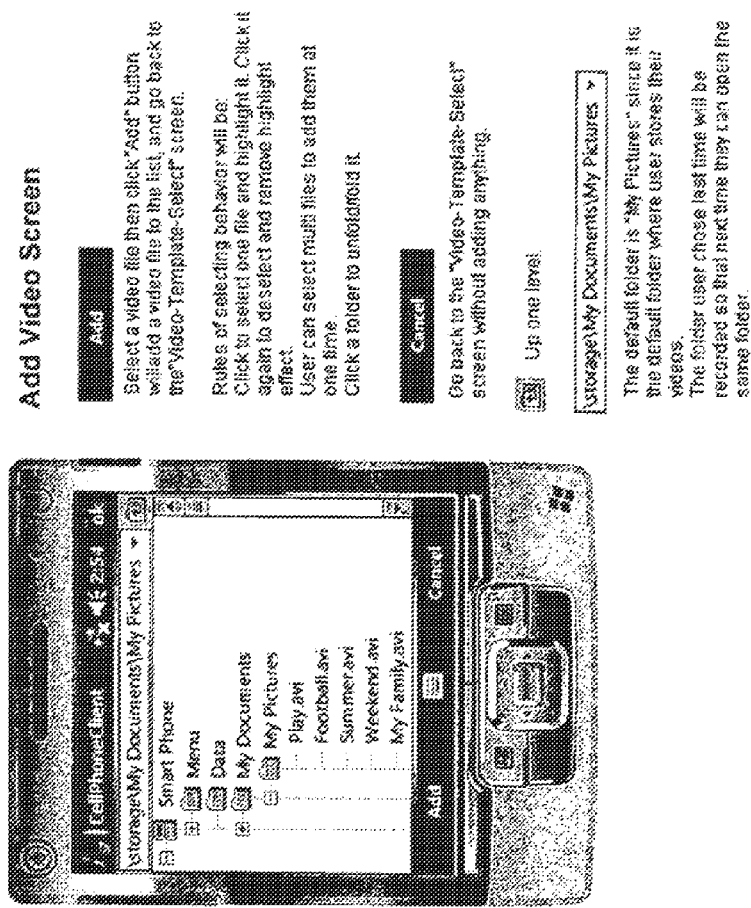
FIG. 34 depicts an example embodiment of a screenshot.

FIG. 34 depicts an example of the screen a user would see if the user chose to add a video.

Figure 35:
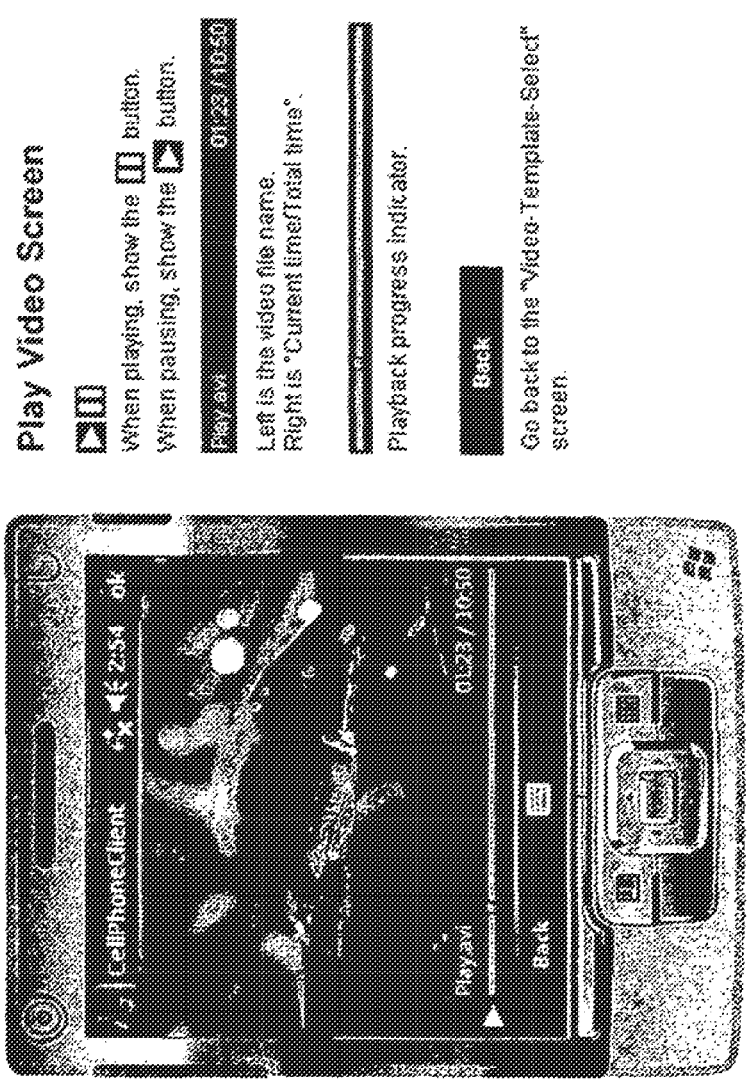
FIG. 35 depicts an example embodiment of a screenshot.

FIG. 35 depicts an example of the screen a user would see if the user chose to preview a video.

Figure 36:
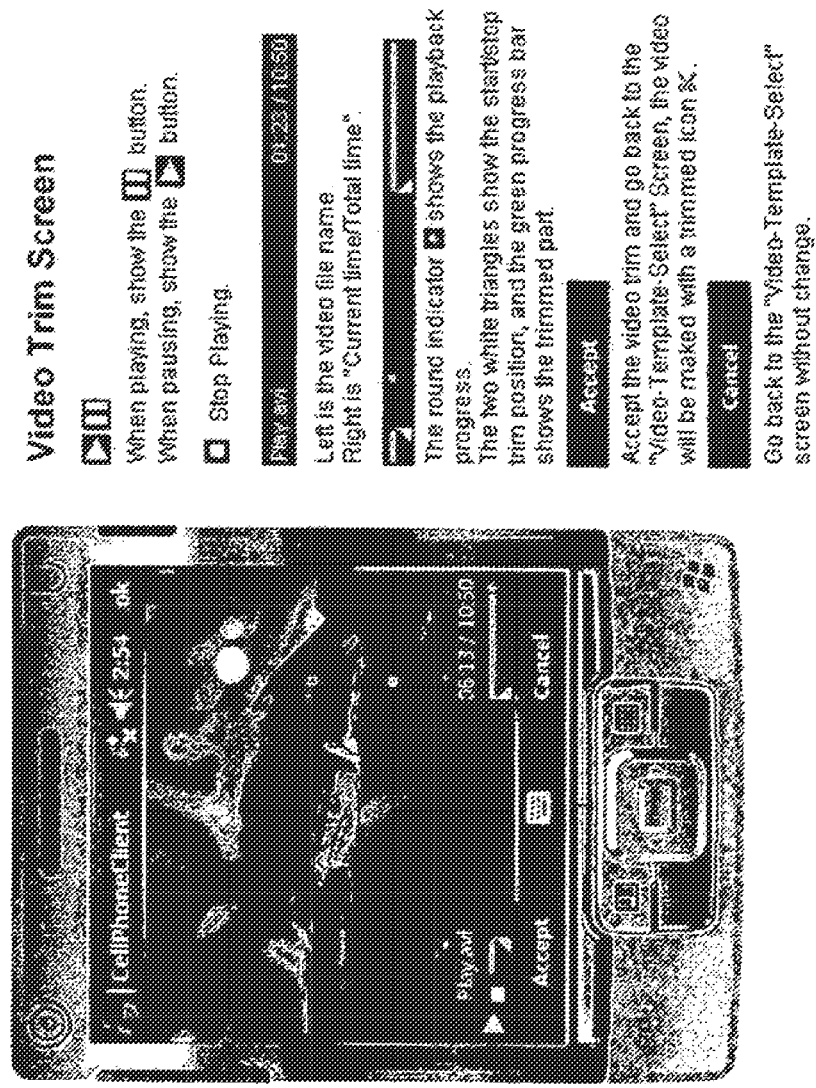
FIG. 36 depicts an example embodiment of a screenshot.

FIG. 36 depicts an example of a screen a user may see if the user chose to trim a video. When you select "Trim" to trim a video, the video may begin to play. The left menu item may be "Cancel", and the right menu item may be "Set Start". If you click "Set Start" the right menu item may change to "Set Stop". When the video is done playing or the user clicks "Set Stop" the video may pause and the left menu item may change to "Accept". The Video Trim page may be divided into three pages: Set Start Pos, Set End Pos, and Play Complete.

Figure 37:
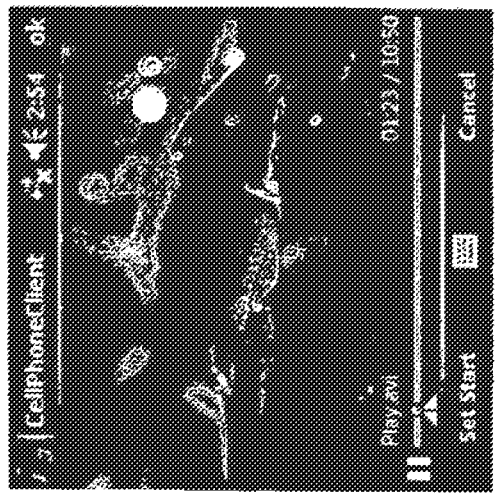
FIG. 37 depicts an example embodiment of a screenshot.

FIG. 37 depicts an example of the Set Start Pos page. In this example, if the user selects the "Cancel" menu item, the user may be returned to the Video-Template select screen. If the user selects the "Set Start" menu item, the start trim position is set and the right menu item may automatically change to "Set Stop".

Figure 38:
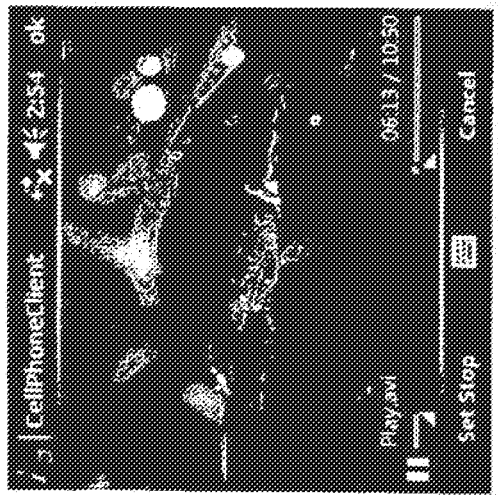
FIG. 38 depicts an example embodiment of a screenshot.

FIG. 38 depicts an example of the Set Stop Pos page. In this example, the user may click the "Set Stop" menu item to set the video end position, if the user does not select the Set Stop item, the end of the video may be set as the end position. The user may select the "Cancel" button to replay video and to reset the start and end positions.

Figure 39:
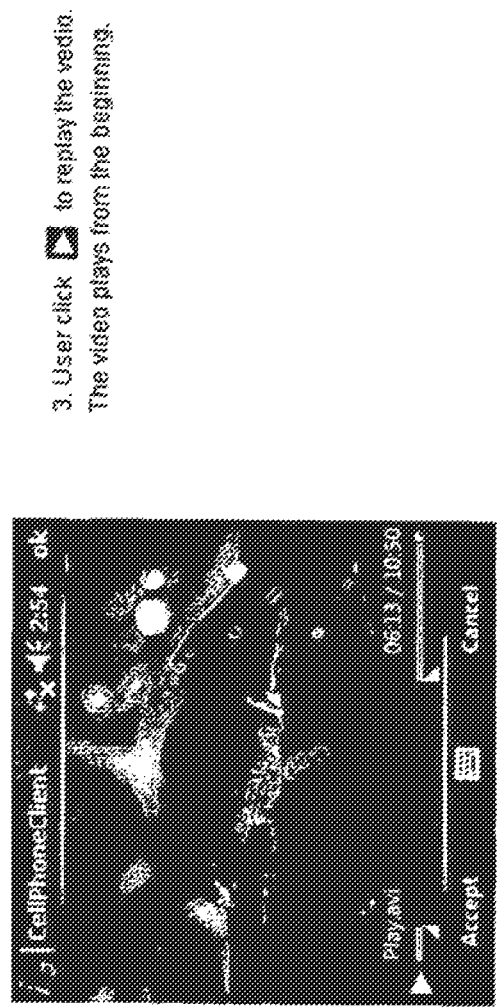
FIG. 39 depicts an example embodiment of a screenshot.

FIG. 39 depicts an example of the Accept Trim page. The user may click the "Cancel" menu item to return back to Video-Template Select page. The user then may be able to choose to trim the video again or play the currently trimmed selection. The user may click the "Accept" menu item to accept the cropped video and go back to Video-Template Select page.

Figure 40:
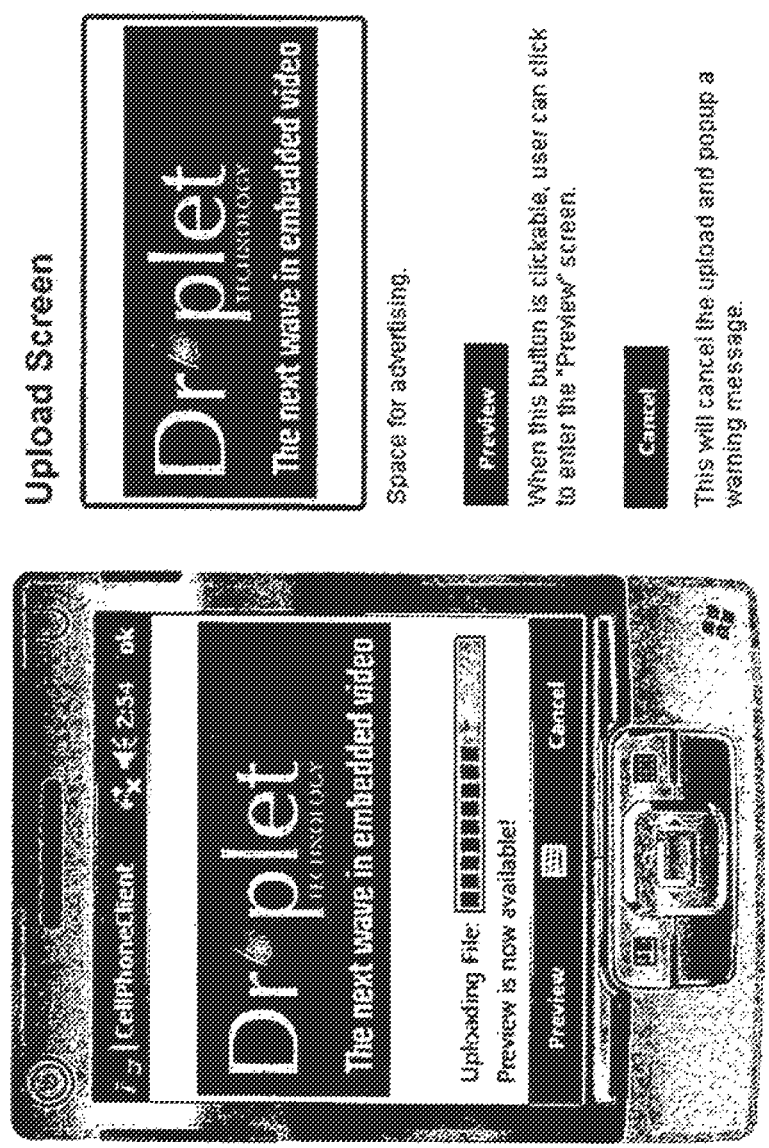
FIG. 40 depicts an example embodiment of a screenshot.

If the user selects to preview a video, a series of three pages may be displayed. FIG. 40 depicts the Uploading page, which the VESClient may display first. The "Preview" button may be disabled at first, but become enabled for the user to choose once a preview is available. An advertisement may be displayed for some period of time while the video is being uploaded.

Figure 41:
FIG. 41 depicts an example embodiment of a screenshot.

FIG. 41 depicts screens showing that the video is being uploaded and the a preview is "now available" while uploading continues.

Figure 42:
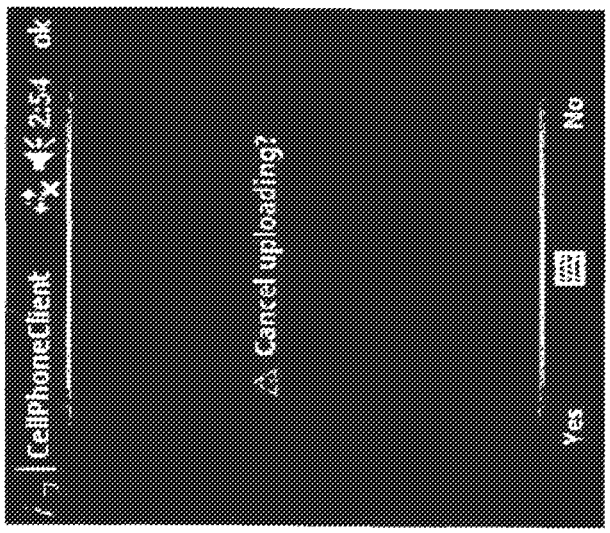
FIG. 42 depicts an example embodiment of a screenshot.

If "Cancel" is chosen, the user may be returned to the "Video-Template Select" page. FIG. 42 depicts and example of a screen when the user chooses to cancel an upload. The user may be prompted to ensure that the user intends to cancel the uploading and previewing of the video. If the user chooses to preview the video, the "Preview" button may be changed to "Skip".

Figure 43:
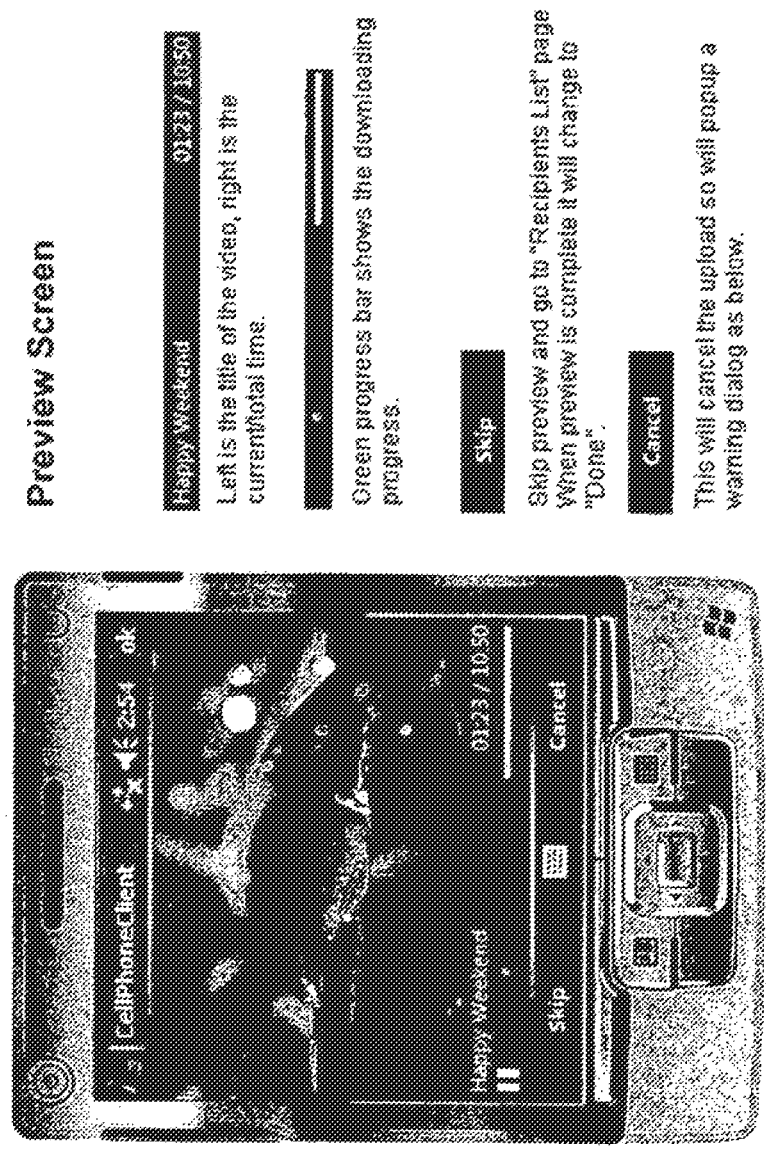
FIG. 43 depicts an example embodiment of a screenshot.

FIG. 43 depicts an example of a screen that shows the user a preview of a video. If the user chooses to skip the preview, the user may be directed to the "Recipients Select" page.

Figure 44:
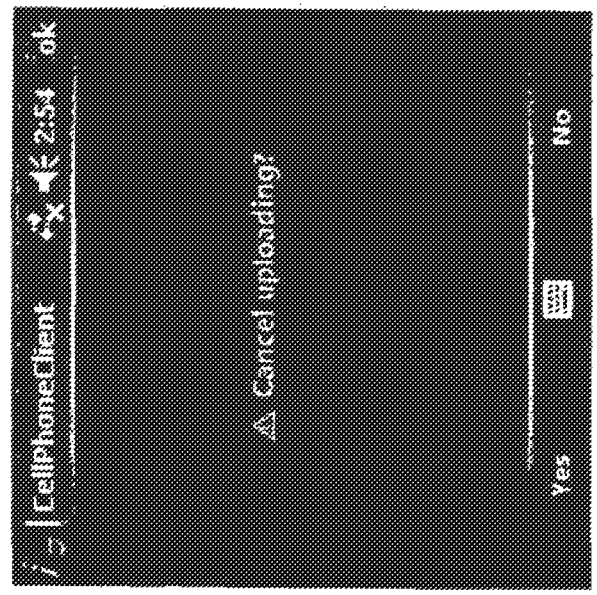
FIG. 44 depicts an example embodiment of a screenshot.

FIG. 44 depicts an example of a screen if the user chooses to cancel the uploading.

Figure 45:
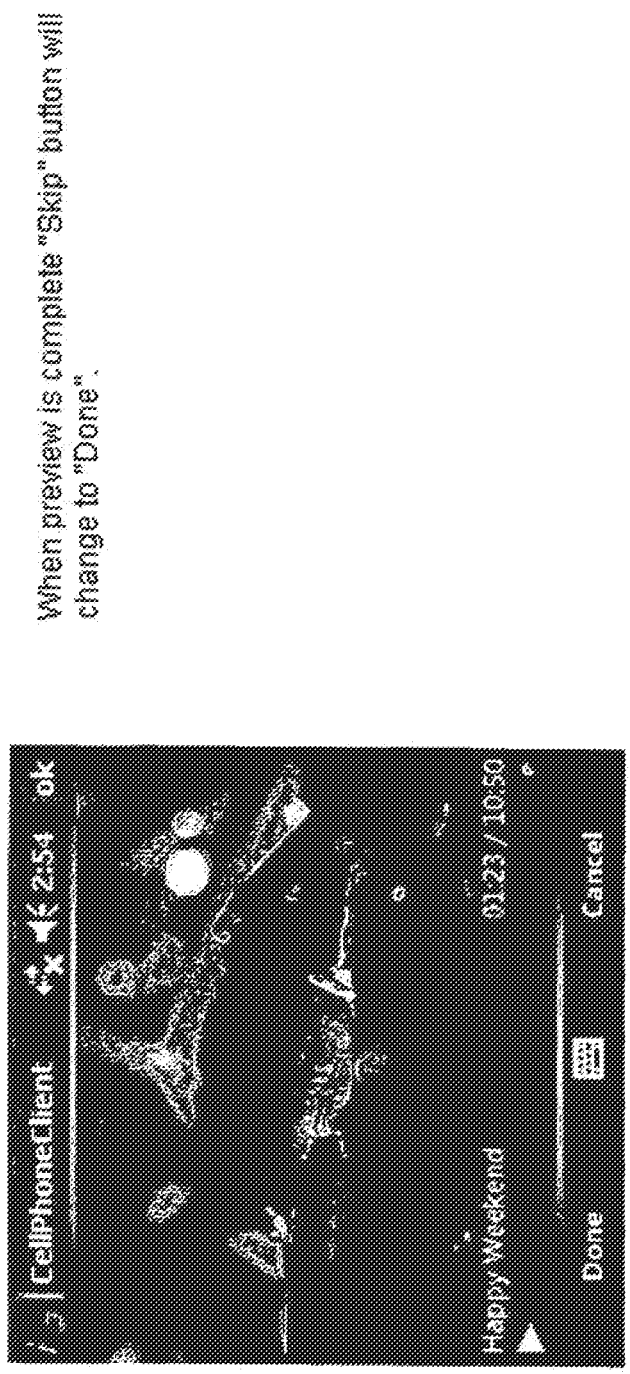
FIG. 45 depicts an example embodiment of a screenshot.

FIG. 45 depicts an example of a screen in which the preview has completed playing. The "Skip" button may change to "Done". The user may select "Cancel" item to cancel the upload, cancel the preview, and return to "Video-Template Select" page. User may select "Done" to go to the "Recipients Select" page.

FIG. 46 depicts examples of a screen in which a user can select a recipient to receive a video. If the user chooses to send a video to a recipient, the user may select recipients from the recipients drop down list and then click the "Add" button to add the recipients to the "Recipients List". The user may select a recipient from the "Recipients List" and then click "Remove" button to remove if from the "Recipients List". The user may click the "Cancel" menu item to go back to "Video-Template Select" page. After selecting recipients, the user may click the "Send" menu item to send the edited video.

A description of the screen items depicted in FIG. 46 are as follows:

Send: If the upload hasn't completed, this item will be disabled.
Cancel: Back to the Video-Template Select page.
Recipients: List all the recipients.
Recipients List: List all the selected recipients.
Send: When upload completes, this item will become enable.

Figure 47:
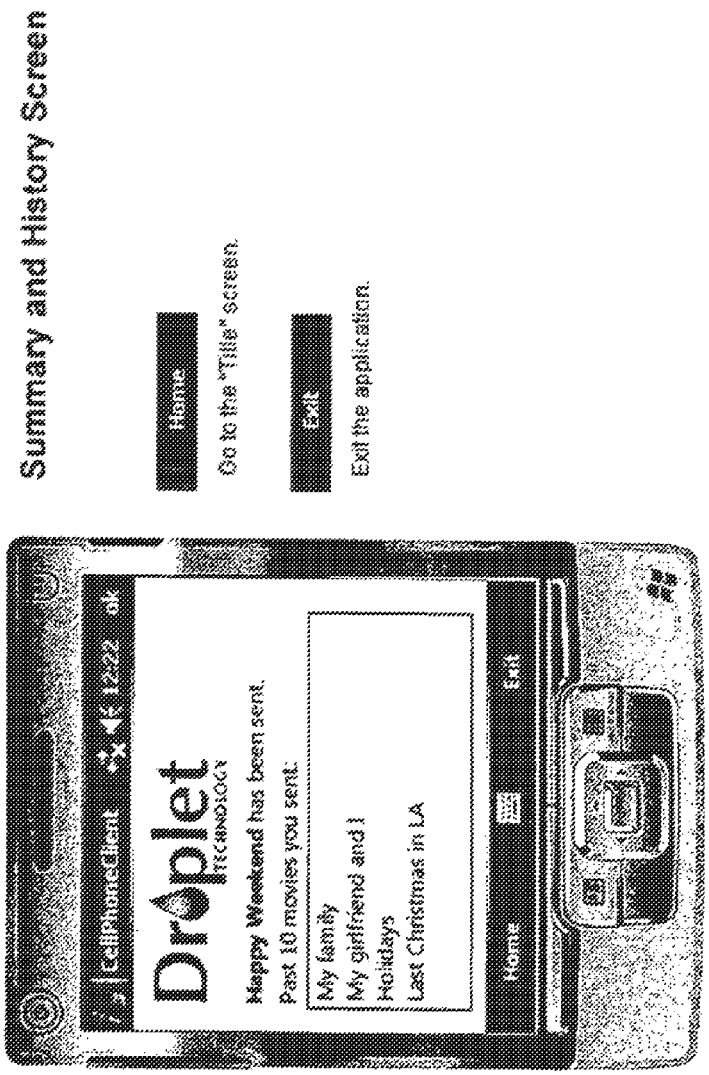
FIG. 47 depicts an example embodiment of a screenshot.

FIG. 47 depicts an example of the Summary and History page. In this embodiment the Summary and History pages shows the title of the last 10 edited videos that were sent by the user. If the user should, select the "Home" menu item, the video editing program may be restarted, and the user may be sent to the "Video-Template Select" page. The user may also select "Exit" to exit the VESClient application.

Figure 48:
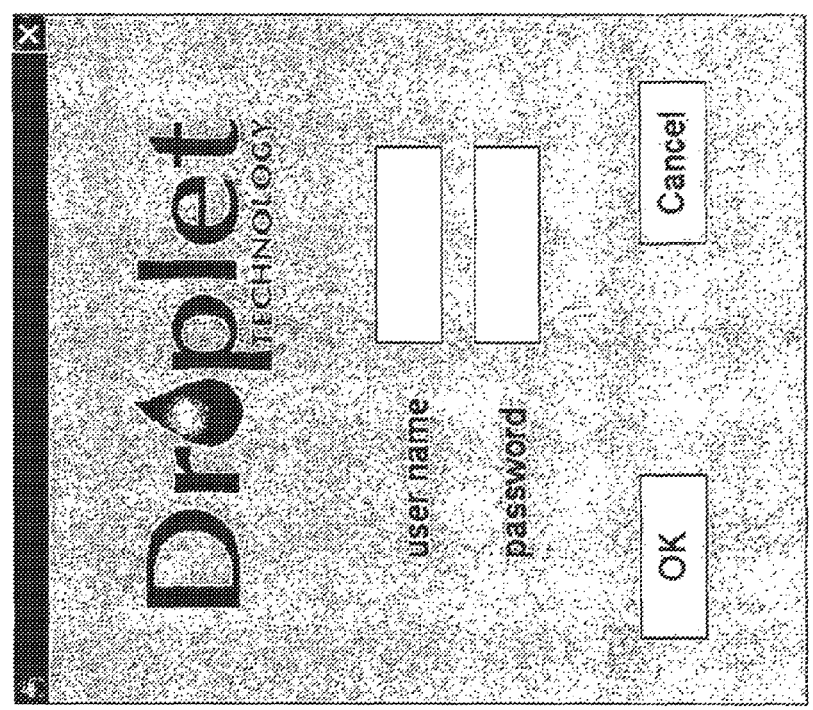
FIG. 48 depicts an example embodiment of a screenshot.

FIG. 48 depicts an example of a login page for the Receiving PC application. In the example of this exemplary embodiment, the Receiving PC application is a Microsoft Foundation Class (MFC) application that resides in the Windows application tray.

Figure 49:
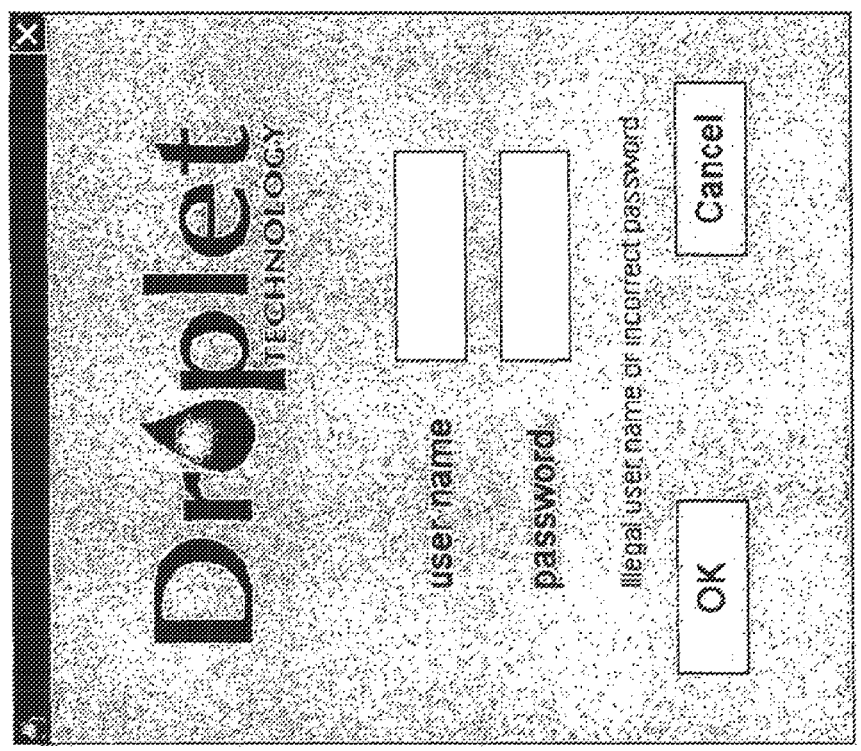
FIG. 49 depicts an example embodiment of a screenshot.
Figure 50:
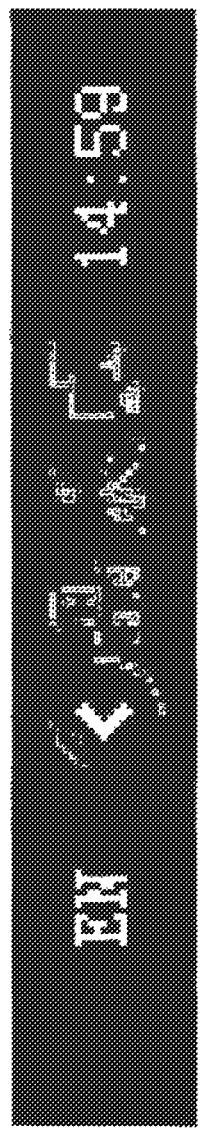
FIG. 50 depicts an example embodiment of a screenshot.

FIG. 49 depicts an example of a screen shot if the user login fails. A warning message will be issued and the user may reenter the user name and password.

Figure 51:
FIG. 51 depicts an example embodiment of a screenshot.

If the login is successful, an icon (as depicted inside the highlighted square of FIG. 50) appears on the task bar, and the website may be launched. Preferably the website is launched automatically. If the user double clicks the left mouse button on the icon, the application opens the website automatically. If the user right clicks on the icon a menu may pop up, as depicted in FIG. 51. The user may select "Web" to launch the website, select, (or deselect) "Auto Start" to decide if the application auto runs within Windows, or select "Exit" to end the application.

Figure 52:
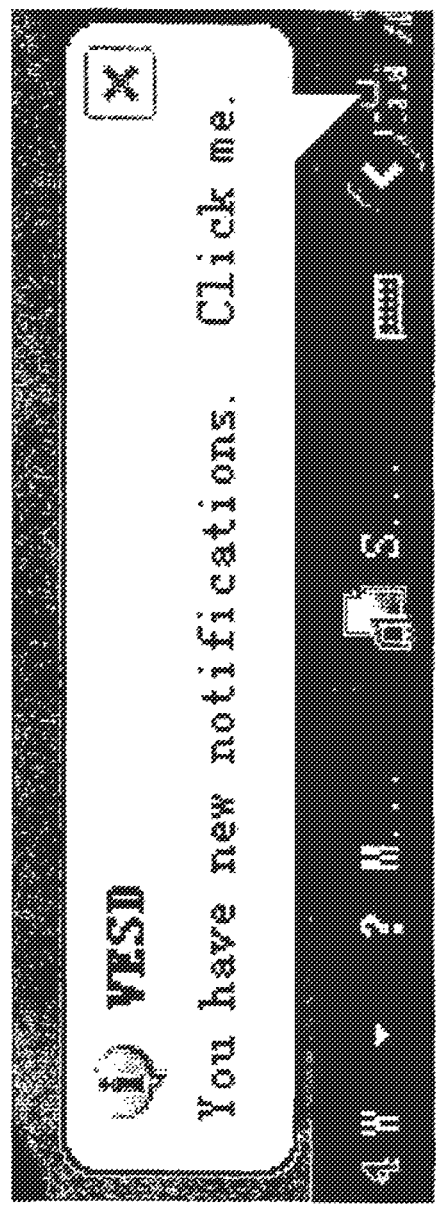
FIG. 52 depicts an example embodiment of a screenshot.

FIG. 52 depicts a bubble that may pop up to alert the user that a newly edited video is available. If the user left clicks on this icon, the application may launch the website automatically.

Figure 53:
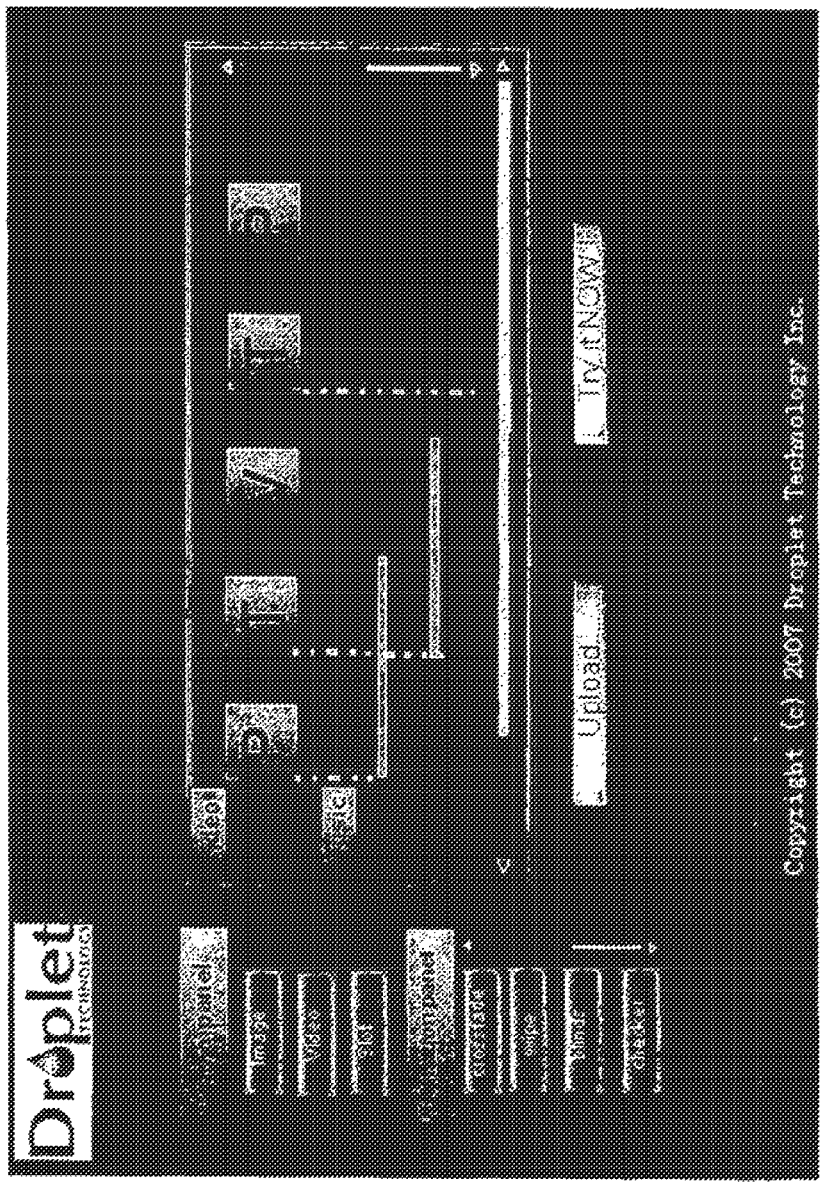
FIG. 53 depicts an example embodiment of a screenshot.
Figure 54:
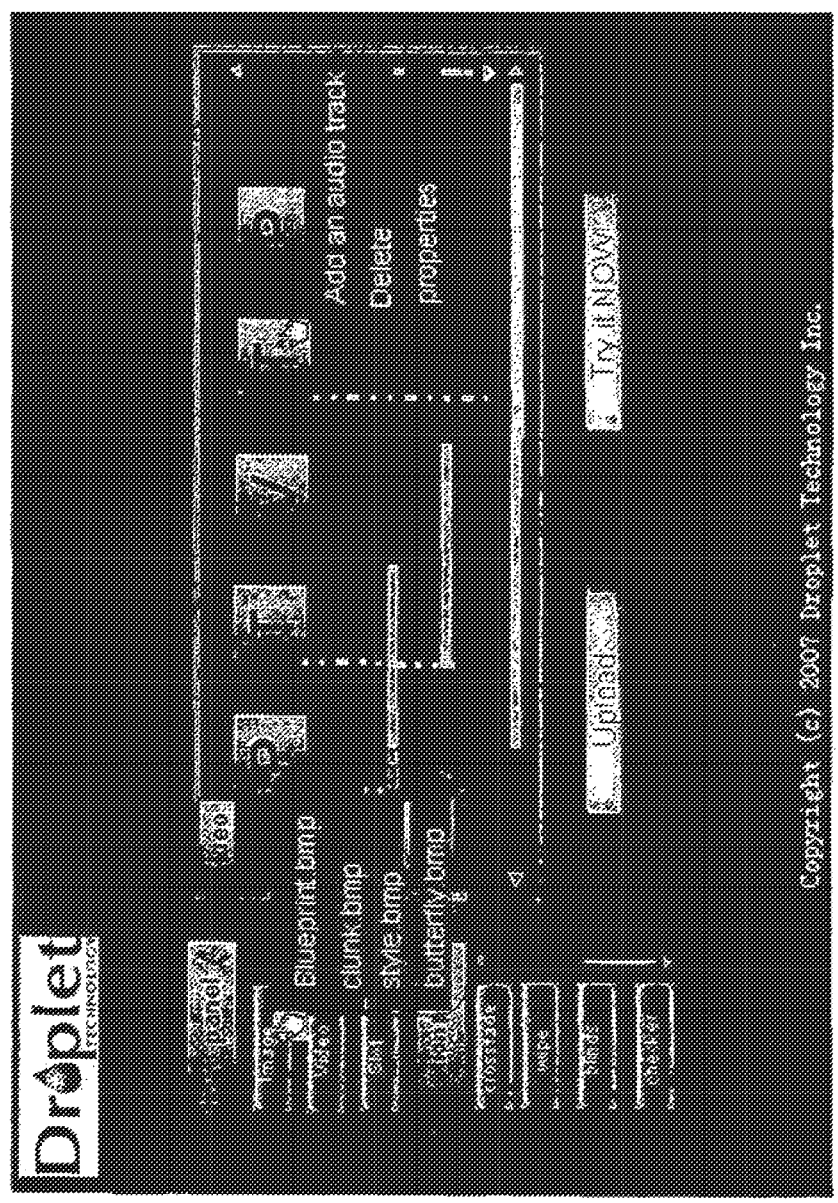
FIG. 54 depicts an example embodiment of a screenshot.
Figure 55:
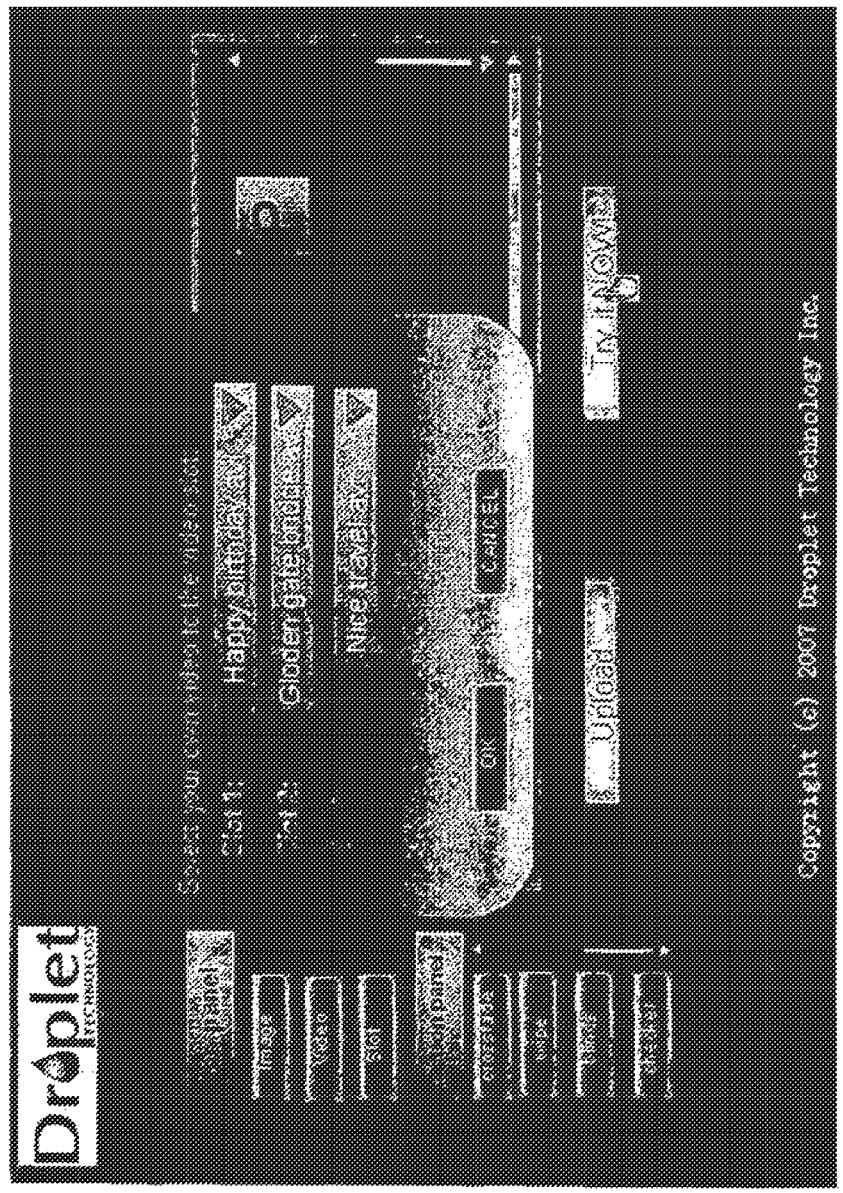
FIG. 55 depicts an example embodiment of a screenshot.

FIGS. 53, 54, and 55 depict different examples of screen shots of the template editor. Examples of certain components and features of this exemplary embodiment of the template editor page are as follows:

Video Panel

This panel may include images, videos, and slots.

1. Image—the list of still pictures may be downloaded from the server. After selecting an image the actual picture data may be downloaded from the server and shown to the user.

2. Video—the list of videos may be downloaded from the server.

3. Slots—clicking on the slot button may cause a slot item to be created.

Transition Components Panel

This panel includes different examples of transition components (as buttons). The user may click on a transition button and create the transition item in the video timeline.

Video Line

The video time line may consist of elements that represent still pictures, video on the server, original video, and transition components. The elements are ordered by time. After an element or transition component is added to the timeline, right clicking on the element may allow the user to modify the properties of this video element, add background music, or delete the element. If the user selects to add background music, an audio line may be created. The user may be able to set the weight of the volume for each audio element added. These weights may be used to mix overlapping audio in the final video.

Audio Line

Each video element may have at least one audio track added to it for this version. An example of the template editor in use is shown below:

1. The user launches the TE application on the Website.

2. The user moves the mouse over the "Picture" button. (The list of pictures on the server may be shown in a pop up window.)

3. The user clicks one of the pictures in the list. (A picture element may be created on the video line.)

4. The user clicks the transition button in the "Transition panel". (A transition element may be created on the video line.)

5. The user clicks the "Slot" button. (An empty slot may be created on the video line.)

6. Right clicking on a slot element may cause a menu to be shown. Selecting "Add background music" may display a list of available music tracks to add. Background music may play to completion, across multiple slots.

7. The user may repeat steps 2-6

8. The user clicks the "Upload" button to upload the template to the server. (This may enable the "Try it now" button).

9. The user clicks the "Try it now" button after uploading a template. (A panel may be shown for the user to select his or her previously uploaded videos for the empty slots in the template, if the user has not previously uploaded clips for this use, AVES may use default "try if now" clips from AVES.)

10. If "Try it now" is executed, the user may watch the resulting video on the Website after the TP has finished creating it.

In one embodiment, a machine in the exemplary form of a computer system within which a set of instructions, for causing the machine to perform any one or more of the methodologies discussed herein, may be executed. In alternative embodiments, a machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method for editing video data, comprising:
receiving a video data from a mobile device at greater than 30 frames per second;
receiving at a server editing instructions from the mobile device, wherein receiving editing instructions comprises receiving from the mobile device a video clip and a template used by a user of the mobile device to create the editing instructions;
editing the video data using the editing instructions to create an edited video;
sending back a portion of the edited video to the user wherein the user reviews the portion of the edited video in real-time; and
upon user indication of approval of the portion of the edited video, delivering from the server a full length version of the edited video to a recipient
and
wherein the receiving of video data from the mobile device is through at least one wireless access modem.

2. The method of claim 1, wherein: the recipient comprises a mobile device.

3. The method of claim 1, wherein the recipient comprises a mobile phone.

4. The method of claim 1, wherein the recipient is a server.

5. The method of claim 1, wherein the recipient is a webpage.

6. The method of claim 1, wherein the editing instructions include at least one of a transition, a cut, and an overlay.

7. The method of claim 1, wherein the mobile device is video-enabled and the video data was originally recorded on the mobile device.

* * * * *